United States Patent
Hannuksela et al.

(10) Patent No.: US 12,425,571 B2
(45) Date of Patent: Sep. 23, 2025

(54) APPARATUS, A METHOD AND A COMPUTER PROGRAM FOR VIDEO CODING AND DECODING

(71) Applicant: Nokia Technologies Oy, Espoo (FI)

(72) Inventors: Miska Hannuksela, Tampere (FI); Alireza Aminlou, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/203,961

(22) Filed: May 31, 2023

(65) Prior Publication Data

US 2023/0308639 A1    Sep. 28, 2023

Related U.S. Application Data

(63) Continuation of application No. 17/419,534, filed as application No. PCT/FI2019/050893 on Dec. 16, 2019, now Pat. No. 11,778,171.

(Continued)

(51) Int. Cl.
*H04N 19/105* (2014.01)
*H04N 19/167* (2014.01)
(Continued)

(52) U.S. Cl.
CPC ......... *H04N 19/105* (2014.11); *H04N 19/167* (2014.11); *H04N 19/172* (2014.11);
(Continued)

(58) Field of Classification Search
CPC .... G06T 9/001; H04N 19/105; H04N 19/119; H04N 19/167; H04N 19/172;
(Continued)

(56) References Cited

U.S. PATENT DOCUMENTS

2012/0007992 A1    1/2012   Zhou
2013/0202051 A1    8/2013   Zhou
(Continued)

FOREIGN PATENT DOCUMENTS

CN    105027567 A    11/2015
CN    105325003 A    2/2016
(Continued)

OTHER PUBLICATIONS

Versatile Video Coding, Series H: Audiovisual And Multimedia Systems, Infrastructure of audiovisual services—Coding of moving Video, Recommendation ITU-T H.266, Aug. 2020, 516 pages.
(Continued)

*Primary Examiner* — Maria E Vazquez Colon
(74) *Attorney, Agent, or Firm* — McCarter & English, LLP

(57) ABSTRACT

There is disclosed a method, an apparatus and a computer program product for video encoding and decoding. In accordance with an embodiment the method comprises obtaining coded data of a sub-picture, the sub-picture belonging to a picture, and the sub-picture belonging to a sub-picture sequence and determining whether to use the sub-picture as a source for a manipulated reference sub-picture. If the determining reveals that the sub-picture is to be used as the source for the manipulated reference sub-picture, the manipulated reference sub-picture is generated from the sub-picture to be used as a reference for a subsequent sub-picture of the sub-picture sequence.

19 Claims, 17 Drawing Sheets

Related U.S. Application Data

(60) Provisional application No. 62/787,483, filed on Jan. 2, 2019.

(51) Int. Cl.
| | |
|---|---|
| *H04N 19/169* | (2014.01) |
| *H04N 19/172* | (2014.01) |
| *H04N 19/174* | (2014.01) |
| *H04N 19/597* | (2014.01) |
| *H04N 19/70* | (2014.01) |

(52) U.S. Cl.
CPC ......... *H04N 19/174* (2014.11); *H04N 19/188* (2014.11); *H04N 19/597* (2014.11); *H04N 19/70* (2014.11)

(58) Field of Classification Search
CPC .. H04N 19/174; H04N 19/188; H04N 19/597; H04N 19/70
See application file for complete search history.

(56) References Cited

U.S. PATENT DOCUMENTS

| | | | | |
|---|---|---|---|---|
| 2015/0264404 | A1* | 9/2015 | Hannuksela | H04N 19/30 |
| | | | | 375/240.16 |
| 2017/0085917 | A1* | 3/2017 | Hannuksela | H04N 19/70 |
| 2017/0336705 | A1* | 11/2017 | Zhou | G01S 3/00 |
| 2018/0376126 | A1 | 12/2018 | Hannuksela | |
| 2021/0112246 | A1* | 4/2021 | Aono | H04N 19/172 |
| 2021/0409733 | A1* | 12/2021 | Wang | H04N 19/196 |

FOREIGN PATENT DOCUMENTS

| | | | | |
|---|---|---|---|---|
| EP | 3349467 | A1 | 7/2018 | |
| WO | WO-2014001573 | A1 * | 1/2014 | G06F 15/173 |
| WO | WO-2015104451 | A1 | 7/2015 | |
| WO | WO-2017051072 | A1 | 3/2017 | |
| WO | WO-2017093611 | A1 | 6/2017 | |
| WO | WO-2018178507 | A1 | 10/2018 | |
| WO | WO-2018222996 | A1 | 12/2018 | |
| WO | WO-2019073113 | A1 | 4/2019 | |
| WO | WO-2019158812 | A1 | 8/2019 | |
| WO | WO-2020008106 | A1 | 1/2020 | |
| WO | WO-2020008107 | A1 | 1/2020 | |
| WO | WO-2020020705 | A1 * | 1/2020 | G02F 1/3532 |
| WO | WO-2020050705 | A1 * | 3/2020 | H04N 19/119 |

OTHER PUBLICATIONS

Advanced Video Coding For Generic Audiovisual services, Series H: Audiovisual And Multimedia Systems, 2 Infrastructure of audiovisual services—Coding of moving Video, Recommendation ITU-T H.264, Apr. 2017, 812 pages.

High Efficiency Video Coding, Series H: Audiovisual And Multimedia Systems, Infrastructure of audiovisual service—Coding of moving video, Recommendation ITU-T H.265, Feb. 2018, 692 pages.

Video Coding For Low Bit Rate Communication, Series H: Audiovisual And Multimedia Systems, Infrastructure of Audiovisual services—Coding of moving Video, ITU-T Recommendation H.263, Jan. 2005, 226 pages.

Sjoberg et al., "Tile groups for WC", Joint Video Experts Team (JVET) of ITU-T SG 16 WP 3 and ISO/IEC JTC 1/SC 29/WG 11, JVET-L0415, 12th Meeting, Oct. 3-12, 2018, pp. 1-4.

Information Technology—Coding Of Audio-Visual Objects—Part 15: Advanced Video Coding (AVG) File Format, ISO/EC 14496-15, First edition, Apr. 15, 2004, 29 pages.

Parameter Values for the HDTV Standards for Production and International Programme Exchange, Recommendatior TU-R BT.709-6, Jun. 2015, 19 pages.

Parameter Values for Ultra-High Definition Television Systems for Production And International Programme Exchange, Recommendation ITU-R BT.2020, Aug. 2012, 7 pages.

Mammou, "PCC Test Model Category 2 v0", ISO/IEC JTCI/SC29/WG11 N17248, 3DG, Oct. 2017, 11 pages.

Information Technology—Coding of Audio-visual Objects—Part 12; ISO Base Media File Format, ISO/IEC 14496-12, Fifth Edition, Dec. 15, 2015, 248 pages.

Information Technology—Coding Of Audio-Visual Objects—Part 14: MP4 File Format, ISO/IEC 14496-14, First Edition, Nov. 15, 2003, 18 pages.

3rd Generation Partnership Project; Technical Specification Group Services and System Aspects; Transparent end-to-end packet switched streaming service (PSS); 3GPP file format (3GP) (Release 15), 3GPP TS 26.244, V15.0.0, Jun. 2018, pp. 1-67.

3rd Generation Partnership Project; Technical Specification Group Services and System Aspects; Transparent end-to-end Packet-switched Streaming Service (PSS); Protocols and codecs (Release 15), 3GPP TS 26.234, V15.1.0, Sep. 2018, pp. 1-174.

Information technology—Dynamic Adaptive Streaming over http (DASH)—Part 1: Media Presentation Description and Segment Formats, ISO/IEC 23009-1, Second Edition, May 15, 2014, 152 pages.

3rd Generation Partnership Project; Technical Specification Group Services and System Aspects; Transparent end-to-end Packet-switched Streaming Service {PSS); Progressive Download and Dynamic Adaptive Streaming over HTTP 3GP-DASH) {Release 16), 3GPP TS 26.247, V16.1.0, Dec. 2018, pp. 1-138.

International Search Report and Written Opinion received for corresponding Patent Cooperation Treaty Application No. PCT/FI2019/050893, dated Mar. 18, 2020, 16 pages.

Fan et al., "[OMAF] Reconstructing bilslream from sub-picture bilslreams and motion constraint information signaling", SO/IEC JTC1/SC29/WG11 MPEG2017/M41465, Huawei, Oct. 2017, 4 pages.

Lai et al., "[OMAF] [ISOBMFF]: Spatial Relationship Signalling for Sub-picture Tracks", ISO/IEC JTC1/SC29/WG11 MPEG2017/M40365, MediaTek Inc, Apr. 2017, 4 pages.

Zhou, Minhua, "AHG4: Enable parallel decoding with tiles", Joint Collaborative Team on Video Coding (JCT-VC) of ITU-T SG16 WP3 and ISO/IEC JTC1/SC29/WG11, M24357, 9th Meeting, Apr. 27-May 7, 2012, 9 pages.

Sjoberg, Rickard, et al., "Overview of HEVC High-Level Syntax and Reference Picture Management", IEEE, vol. 22, No. 12, Dec. 2012, 13 pages.

Jeon, Yong-Joon et al. "Editorial Comment on JD" Joint Video Team (JVT) of ISO/IEC MPEG & ITU-T VCEG (ISO/IEC JTC1/SC29/WG11 and ITU-T SG16 Q.6) 28th Meeting: Hannover, DE, Jul. 20-25, 2008.

* cited by examiner

US 12,425,571 B2

APPARATUS, A METHOD AND A COMPUTER PROGRAM FOR VIDEO CODING AND DECODING

RELATED APPLICATION

This application is a continuation of U.S. patent application Ser. No. 17/419,534, filed Jun. 29, 2021, which is a National Stage Entry of International Application No. PCT/FI2019/050893, filed Dec. 16, 2019, which claims priority under 35 U.S.C. 119(e)(1) to U.S. Provisional Patent Application No. 62/787,483, filed Jan. 2, 2019. These applications are hereby incorporated by reference in their entirety.

TECHNICAL FIELD

The present disclosure relates to an apparatus, a method and a computer program for video coding and decoding.

BACKGROUND

This section is intended to provide a background or context to the example embodiments that are recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video coding system may comprise an encoder that transforms an input video into a compressed representation suited for storage/transmission and a decoder that can uncompress the compressed video representation back into a viewable form. The encoder may discard some information in the original video sequence in order to represent the video in a more compact form, for example, to enable the storage/transmission of the video information at a lower bitrate than otherwise might be needed.

Various technologies for providing three-dimensional (3D) video content are currently investigated and developed. Especially, intense studies have been focused on various multiview applications wherein a viewer is able to see only one pair of stereo video from a specific viewpoint and another pair of stereo video from a different viewpoint. One of the most feasible approaches for such multiview applications has turned out to be such wherein only a limited number of input views, e.g. a mono or a stereo video plus some supplementary data, is provided to a decoder side and all required views are then rendered (i.e. synthesized) locally by the decoder to be displayed on a display.

In the encoding of 3D video content, video compression systems, such as Advanced Video Coding standard (H.264/AVC), the Multiview Video Coding (MVC) extension of H.264/AVC or scalable extensions of HEVC (High Efficiency Video Coding) can be used.

Two-dimensional (2D) video codecs can be used as basis for novel usage scenarios, such as point cloud coding and 360-degree video. The following challenges have been faced. It may be needed to make a trade-off between selecting projection surfaces optimally for a single time instance vs. keeping projection surfaces constant for a time period in order to facilitate inter prediction. Also motion over projection surface boundary might not be handled optimally. When projection surfaces are packed onto a 2D picture, techniques like motion-constrained tile sets have to be used to avoid unintentional prediction leaks from one surface to another. In 360-degree video coding, geometry padding have been shown to improve compression but would require changes in the core (de)coding process.

SUMMARY

Now in order to at least alleviate the above problems, an enhanced encoding and decoding method is introduced herein.

A method according to a first aspect comprises:
obtaining coded data of a sub-picture, the sub-picture belonging to a picture, and the sub-picture belonging to a sub-picture sequence;
determining whether to use the sub-picture as a source for a manipulated reference sub-picture;
if the determining reveals that the sub-picture is to be used as the source for the manipulated reference sub-picture; the method further comprises
generating the manipulated reference sub-picture from the sub-picture to be used as a reference for a subsequent sub-picture of the sub-picture sequence.

An apparatus according to a second aspect comprises at least one processor and at least one memory including computer program code, the memory and the computer program code configured to, with the at least one processor, cause the apparatus to perform at least the following:
obtain coded data of a sub-picture, the sub-picture belonging to a picture, and the sub-picture belonging to a sub-picture sequence;
determine whether to use the sub-picture as a source for a manipulated reference sub-picture;
generate the manipulated reference sub-picture from the sub-picture to be used as a reference for a subsequent sub-picture of the sub-picture sequence, if the determining reveals that the sub-picture is to be used as the source for the manipulated reference sub-picture.

A computer program product according to a third aspect comprises computer program code configured to, when executed on at least one processor, cause an apparatus or a system to:
obtain coded data of a sub-picture, the sub-picture belonging to a picture, and the sub-picture belonging to a sub-picture sequence;
determine whether to use the sub-picture as a source for a manipulated reference sub-picture;
generate the manipulated reference sub-picture from the sub-picture to be used as a reference for a subsequent sub-picture of the sub-picture sequence, if the determining reveals that the sub-picture is to be used as the source for the manipulated reference sub-picture.

An encoder according to a fourth aspect comprises:
an input for obtaining coded data of a sub-picture, the sub-picture belonging to a picture, and the sub-picture belonging to a sub-picture sequence;
a determinator configured to determine whether to use the sub-picture as a source for a manipulated reference sub-picture;
a manipulator configured to generate the manipulated reference sub-picture from the sub-picture to be used as a reference for a subsequent sub-picture of the sub-picture sequence, if the determining reveals that the sub-picture is to be used as the source for the manipulated reference sub-picture.

A decoder according to a fifth aspect comprises:
an input for receiving coded data of a sub-picture, the sub-picture belonging to a picture, and the sub-picture belonging to a sub-picture sequence;

a determinator configured to determine whether to use the sub-picture as a source for a manipulated reference sub-picture;

a manipulator configured to generate the manipulated reference sub-picture from the sub-picture to be used as a reference for a subsequent sub-picture of the sub-picture sequence, if the determining reveals that the sub-picture is to be used as the source for the manipulated reference sub-picture.

A method according to a sixth aspect comprises:

decoding coded data of a first sub-picture, the first sub-picture belonging to a first picture, and the first sub-picture belonging to a first sub-picture sequence;

decoding coded data of a second sub-picture, the second sub-picture belonging to a first picture, and the second sub-picture belonging to a second sub-picture sequence, the decoding being independent of the decoding of the coded data of the first sub-picture; and decoding coded data of a third sub-picture, the third sub-picture belonging to a second picture, the third sub-picture belonging to the first sub-picture sequence, the decoding using the first sub-picture as a reference for prediction.

A method for encoding a video sequence according to a seventh aspect comprises:

encoding data of a first sub-picture, the first sub-picture belonging to a first picture, and the first sub-picture belonging to a first sub-picture sequence;

encoding data of a second sub-picture, the second sub-picture belonging to a first picture, and the second sub-picture belonging to a second sub-picture sequence, the encoding being independent of the encoding of the coded data of the first sub-picture; and encoding data of a third sub-picture, the third sub-picture belonging to a second picture, the third sub-picture belonging to the first sub-picture sequence, the encoding using the first sub-picture as a reference for prediction.

An apparatus according to an eighth aspect comprises at least one processor and at least one memory including computer program code, the memory and the computer program code configured to, with the at least one processor, cause the apparatus to perform at least the following:

to decode coded data of a first sub-picture, the first sub-picture belonging to a first picture, and the first sub-picture belonging to a first sub-picture sequence;

to decode coded data of a second sub-picture, the second sub-picture belonging to a first picture, and the second sub-picture belonging to a second sub-picture sequence, the decoding being independent of the decoding of the coded data of the first sub-picture; and to decode coded data of a third sub-picture, the third sub-picture belonging to a second picture, the third sub-picture belonging to the first sub-picture sequence, the decoding using the first sub-picture as a reference for prediction.

An apparatus according to a ninth aspect comprises at least one processor, memory including computer program code, the memory and the computer program code configured to, with the at least one processor, cause the apparatus to perform at least the following:

encode data of a first sub-picture, the first sub-picture belonging to a first picture, and the first sub-picture belonging to a first sub-picture sequence;

encode data of a second sub-picture, the second sub-picture belonging to a first picture, and the second sub-picture belonging to a second sub-picture sequence, the encoding being independent of the encoding of the coded data of the first sub-picture; and encode data of a third sub-picture, the third sub-picture belonging to a second picture, the third sub-picture belonging to the first sub-picture sequence, the encoding using the first sub-picture as a reference for prediction.

The further aspects relate to apparatuses and computer readable storage media stored with code thereon, which are arranged to carry out the above methods and one or more of the embodiments related thereto.

BRIEF DESCRIPTION OF THE DRAWINGS

For better understanding of the present disclosure, reference will now be made by way of example to the accompanying drawings in which.

DETAILED DESCRIPTION OF SOME EXAMPLE EMBODIMENTS

Figure 1:
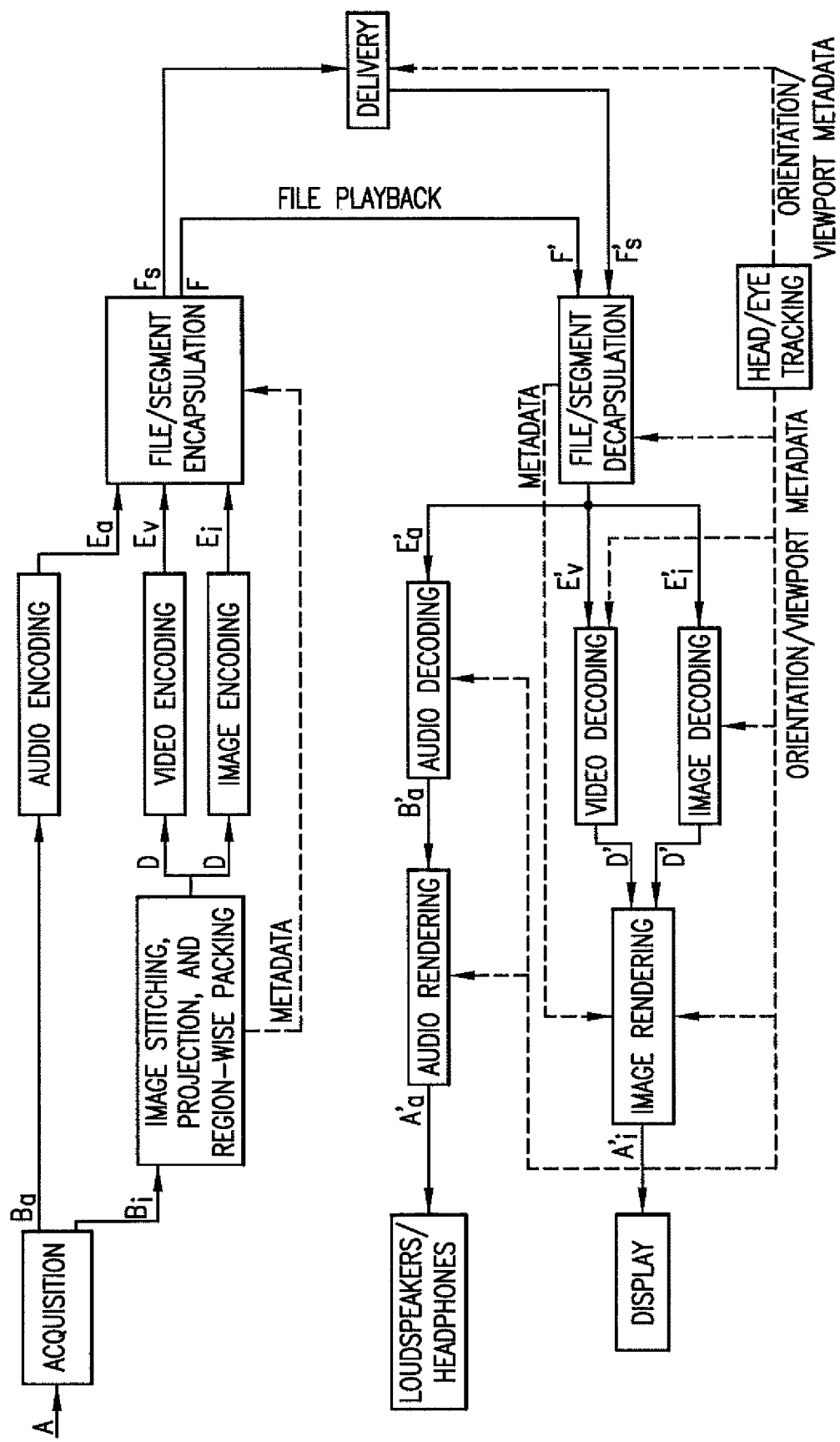
FIG. 1 shows an example of MPEG Omnidirectional Media Format (OMAF)

In the following, several embodiments will be described in the context of one video coding arrangement. It is to be noted, however, that the example embodiments are not limited to this particular arrangement. For example, the example embodiments may be applicable to video coding systems like streaming system, DVD (Digital Versatile Disc) players, digital television receivers, personal video recorders, systems and computer programs on personal computers, handheld computers and communication devices, as well as network elements such as transcoders and cloud computing arrangements where video data is handled.

In the following, several embodiments are described using the convention of referring to (de)coding, which indicates that the embodiments may apply to decoding and/or encoding.

The Advanced Video Coding standard (which may be abbreviated AVC or H.264/AVC) was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organization for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, each integrating new extensions or features to the specification. These extensions include Scalable Video Coding (SVC) and Multiview Video Coding (MVC).

The High Efficiency Video Coding standard (which may be abbreviated HEVC or H.265/HEVC) was developed by the Joint Collaborative Team-Video Coding (JCT-VC) of VCEG and MPEG. The standard is published by both parent standardization organizations, and it is referred to as ITU-T Recommendation H.265 and ISO/IEC International Standard 23008-2, also known as MPEG-H Part 2 High Efficiency Video Coding (HEVC). Extensions to H.265/HEVC include scalable, multiview, three-dimensional, and fidelity range extensions, which may be referred to as SHVC, MV-HEVC, 3D-HEVC, and REXT, respectively. The references in this description to H.265/HEVC, SHVC, MV-HEVC, 3D-HEVC and REXT that have been made for the purpose of understanding definitions, structures or concepts of these standard specifications are to be understood to be references to the latest versions of these standards that were available before the date of this application, unless otherwise indicated.

The Versatile Video Coding standard (VVC, H.266, or H.266/VVC) is presently under development by the Joint Video Experts Team (WET), which is a collaboration between the ISO/IEC MPEG and ITU-T VCEG.

Some key definitions, bitstream and coding structures, and concepts of H.264/AVC and HEVC and some of their extensions are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC standard—hence, they are described below jointly. The aspects of various embodiments are not limited to H.264/AVC or HEVC or their extensions, but rather the description is given for one possible basis on top of which the present embodiments may be partly or fully realized.

Video codec may comprise an encoder that transforms the input video into a compressed representation suited for storage/transmission and a decoder that can uncompress the compressed video representation back into a viewable form. The compressed representation may be referred to as a bitstream or a video bitstream. A video encoder and/or a video decoder may also be separate from each other, i.e. need not form a codec. The encoder may discard some information in the original video sequence in order to represent the video in a more compact form (that is, at lower bitrate).

Hybrid video codecs, for example ITU-T H.264, may encode the video information in two phases. At first, pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Then, the prediction error, i.e. the difference between the predicted block of pixels and the original block of pixels, is coded. This may be done by transforming the difference in pixel values using a specified transform (e.g. Discreet Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction or current picture referencing), prediction is applied similarly to temporal prediction, but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

Video coding standards may specify the bitstream syntax and semantics as well as the decoding process for error-free bitstreams, whereas the encoding process might not be specified, but encoders may just be required to generate conforming bitstreams. Bitstream and decoder conformance can be verified with the Hypothetical Reference Decoder (HRD). The standards may contain coding tools that help in coping with transmission errors and losses, but the use of the tools in encoding may be optional and decoding process for erroneous bitstreams might not have been specified.

A syntax element may be defined as an element of data represented in the bitstream. A syntax structure may be defined as zero or more syntax elements present together in the bitstream in a specified order.

An elementary unit for the input to an encoder and the output of a decoder, respectively, is typically a picture. A picture given as an input to an encoder may also be referred to as a source picture, and a picture decoded by a decoded may be referred to as a decoded picture or a reconstructed picture.

The source and decoded pictures are each comprised of one or more sample arrays, such as one of the following sets of sample arrays:
  Luma (Y) only (monochrome).
  Luma and two chroma (YCbCr or YCgCo).
  Green, Blue and Red (GBR, also known as RGB).
  Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of HEVC or alike. A component may be defined as an array or single sample from one of the three sample arrays (luma and two chroma) or the array or a single sample of the array that compose a picture in monochrome format.

A picture may be defined to be either a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays.

Some chroma formats may be summarized as follows:
  In monochrome sampling there is only one sample array, which may be nominally considered the luma array.
  In 4:2:0 sampling, each of the two chroma arrays has half the height and half the width of the luma array.
  In 4:2:2 sampling, each of the two chroma arrays has the same height and half the width of the luma array.
  In 4:4:4 sampling when no separate color planes are in use, each of the two chroma arrays has the same height and width as the luma array.

Coding formats or standards may allow to code sample arrays as separate color planes into the bitstream and respectively decode separately coded color planes from the bitstream. When separate color planes are in use, each one of them is separately processed (by the encoder and/or the decoder) as a picture with monochrome sampling.

When chroma subsampling is in use (e.g. 4:2:0 or 4:2:2 chroma sampling), the location of chroma samples with respect to luma samples may be determined in the encoder side (e.g. as pre-processing step or as part of encoding). The chroma sample positions with respect to luma sample positions may be pre-defined for example in a coding standard, such as H.264/AVC or HEVC, or may be indicated in the bitstream for example as part of WI of H.264/AVC or HEVC.

Generally, the source video sequence(s) provided as input for encoding may either represent interlaced source content or progressive source content. Fields of opposite parity have been captured at different times for interlaced source content. Progressive source content contains captured frames. An encoder may encode fields of interlaced source content in two ways: a pair of interlaced fields may be coded into a coded frame or a field may be coded as a coded field. Likewise, an encoder may encode frames of progressive source content in two ways: a frame of progressive source content may be coded into a coded frame or a pair of coded fields. A field pair or a complementary field pair may be defined as two fields next to each other in decoding and/or output order, having opposite parity (i.e. one being a top field and another being a bottom field) and neither belonging to any other complementary field pair. Some video coding standards or schemes allow mixing of coded frames and coded fields in the same coded video sequence. Moreover, predicting a coded field from a field in a coded frame and/or predicting a coded frame for a complementary field pair (coded as fields) may be enabled in encoding and/or decoding.

Partitioning may be defined as a division of a set into subsets such that each element of the set is in exactly one of the subsets.

In H.264/AVC, a macroblock is a 16×16 block of luma samples and the corresponding blocks of chroma samples. For example, in the 4:2:0 sampling pattern, a macroblock contains one 8×8 block of chroma samples per each chroma component. In H.264/AVC, a picture is partitioned to one or more slice groups, and a slice group contains one or more slices. In H.264/AVC, a slice consists of an integer number of macroblocks ordered consecutively in the raster scan within a particular slice group.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples.

In some video codecs, such as High Efficiency Video Coding (HEVC) codec, video pictures may be divided into coding units (CU) covering the area of the picture. A CU consists of one or more prediction units (PU) defining the prediction process for the samples within the CU and one or more transform units (TU) defining the prediction error coding process for the samples in the said CU. The CU may consist of a square block of samples with a size selectable from a predefined set of possible CU sizes. A CU with the maximum allowed size may be named as LCU (largest coding unit) or coding tree unit (CTU) and the video picture is divided into non-overlapping LCUs. An LCU can be further split into a combination of smaller CUs, e.g. by recursively splitting the LCU and resultant CUs. Each resulting CU may have at least one PU and at least one TU associated with it. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It may be signalled at CU level whether prediction error coding is applied or not for each CU. In the case there is no prediction error residual associated with the CU, it can be considered there are no TUs for the said CU. The division of the image into CUs, and division of CUs into PUs and TUs may be signalled in the bitstream allowing the decoder to reproduce the intended structure of these units.

In a draft version of H.266/VVC, the following partitioning applies. It is noted that what is described here might still evolve in later draft versions of H.266/VVC until the standard is finalized. Pictures are partitioned into CTUs similarly to HEVC, although the maximum CTU size has been increased to 128×128. A coding tree unit (CTU) is first partitioned by a quaternary tree (a.k.a. quadtree) structure. Then the quaternary tree leaf nodes can be further partitioned by a multi-type tree structure. There are four splitting types in multi-type tree structure, vertical binary splitting, horizontal binary splitting, vertical ternary splitting, and horizontal ternary splitting. The multi-type tree leaf nodes are called coding units (CUs). CU, PU and TU have the same block size, unless the CU is too large for the maximum transform length. A segmentation structure for a CTU is a quadtree with nested multi-type tree using binary and ternary splits, i.e. no separate CU, PU and TU concepts are in use except when needed for CUs that have a size too large for the maximum transform length. A CU can have either a square or rectangular shape.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF).

The deblocking loop filter may include multiple filtering modes or strengths, which may be adaptively selected based on the features of the blocks adjacent to the boundary, such as the quantization parameter value, and/or signaling included by the encoder in the bitstream. For example, the deblocking loop filter may comprise a normal filtering mode and a strong filtering mode, which may differ in terms of the number of filter taps (i.e. number of samples being filtered on both sides of the boundary) and/or the filter tap values. For example, filtering of two samples along both sides of the boundary may be performed with a filter having the impulse response of (3 7 9−3)/16, when omitting the potential impact of a clipping operation.

The motion information may be indicated with motion vectors associated with each motion compensated image block in video codecs. Each of these motion vectors represents the displacement of the image block in the picture to be coded (in the encoder side) or decoded (in the decoder side) and the prediction source block in one of the previously coded or decoded pictures. In order to represent motion vectors efficiently those may be coded differentially with respect to block specific predicted motion vectors. The predicted motion vectors may be created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signaling the chosen candidate as the motion vector predictor. In addition to predicting the motion vector values, the reference index of previously coded/decoded picture can be predicted. The reference index may be predicted from adjacent blocks and/or co-located blocks in temporal reference picture. Moreover, high efficiency video codecs may employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signaled among a list of motion field candidate list filled with motion field information of available adjacent/co-located blocks.

Video codecs may support motion compensated prediction from one source image (uni-prediction) and two sources (bi-prediction). In the case of uni-prediction a single motion vector is applied whereas in the case of hi-prediction two motion vectors are signaled and the motion compensated predictions from two sources are averaged to create the final sample prediction. In the case of weighted prediction, the relative weights of the two predictions can be adjusted, or a signaled offset can be added to the prediction signal.

In addition to applying motion compensation for inter picture prediction, similar approach can be applied to intra picture prediction. In this case the displacement vector indicates where from the same picture a block of samples can be copied to form a prediction of the block to be coded or decoded. This kind of intra block copying methods can improve the coding efficiency substantially in presence of repeating structures within the frame—such as text or other graphics.

The prediction residual after motion compensation or intra prediction may be first transformed with a transform kernel (like DCT) and then coded. The reason for this is that often there still exists some correlation among the residual and transform can in many eases help reduce this correlation and provide more efficient coding.

Video encoders may utilize Lagrangian cost functions to find optimal coding modes, e.g. the desired Macroblock mode and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C=D+\lambda R \quad \text{(Eq. 1)}$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Some codecs use a concept of picture order count (POC). A value of POC is derived for each picture and is non-decreasing with increasing picture position in output order. POC therefore indicates the output order of pictures. POC may be used in the decoding process for example for implicit scaling of motion vectors and for reference picture list initialization. Furthermore, POC may be used in the verification of output order conformance.

In video coding standards, a compliant bit stream must be able to be decoded by a hypothetical reference decoder that may be conceptually connected to the output of an encoder and consists of at least a pre-decoder buffer, a decoder and an output/display unit. This virtual decoder may be known as the hypothetical reference decoder (HRD) or the video buffering verifier (VBV). A stream is compliant if it can be decoded by the HRD without buffer overflow or, in some cases, underflow. Buffer overflow happens if more bits are to be placed into the buffer when it is full. Buffer underflow happens if some bits are not in the buffer when said bits are to be fetched from the buffer for decoding/playback. One of the motivations for the HRD is to avoid so-called evil bitstreams, which would consume such a large quantity of resources that practical decoder implementations would not be able to handle.

HRD models typically include instantaneous decoding, while the input bitrate to the coded picture buffer (CPB) of HRD may be regarded as a constraint for the encoder and the bitstream on decoding rate of coded data and a requirement for decoders for the processing rate. An encoder may include a CPB as specified in the HRD for verifying and controlling that buffering constraints are obeyed in the encoding. A decoder implementation may also have a CPB that may but does not necessarily operate similarly or identically to the CPB specified for HRD.

A Decoded Picture Buffer (DPB) may be used in the encoder and/or in the decoder. There may be two reasons to buffer decoded pictures, for references in inter prediction and for reordering decoded pictures into output order. Some coding formats, such as HEVC, provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output. An HRD may also include a DPB. DPBs of an HRD and a decoder implementation may but do not need to operate identically.

Output order may be defined as the order in which the decoded pictures are output from the decoded picture buffer (for the decoded pictures that are to be output from the decoded picture buffer).

A decoder and/or an HRD may comprise a picture output process. The output process may be considered to be a process in which the decoder provides decoded and cropped pictures as the output of the decoding process. The output process is typically a part of video coding standards, typically as a part of the hypothetical reference decoder specification. In output cropping, lines and/or columns of samples may be removed from decoded pictures according to a cropping rectangle to form output pictures. A cropped decoded picture may be defined as the result of cropping a decoded picture based on the conformance cropping window specified e.g. in the sequence parameter set that is referred to by the corresponding coded picture.

One or more syntax structures for (decoded) reference picture marking may exist in a video coding system. An encoder generates an instance of a syntax structure e.g. in each coded picture, and a decoder decodes an instance of the syntax structure e.g. from each coded picture. For example, the decoding of the syntax structure may cause pictures to be adaptively marked as "used for reference" or "unused for reference".

A reference picture set (RPS) syntax structure of HEVC is an example of a syntax structure for reference picture marking. A reference picture set valid or active for a picture includes all the reference pictures that may be used as reference for the picture and all the reference pictures that are kept marked as "used for reference" for any subsequent pictures in decoding order. The reference pictures that are kept marked as "used for reference" for any subsequent pictures in decoding order but that are not used as reference picture for the current picture or image segment may be considered inactive. For example, they might not be included in the initial reference picture list(s).

In some coding formats and codecs, a distinction is made between so-called short-term and long-term reference pictures. This distinction may affect some decoding processes such as motion vector scaling. Syntax structure(s) for marking reference pictures may be indicative of marking a picture as "used for long-term reference" or "used for short-term reference".

In some coding formats, reference picture for inter prediction may be indicated with an index to a reference picture list. In some codecs, two reference picture lists (reference picture list 0 and reference picture list 1) are generated for each bi-predictive (B) slice, and one reference picture list (reference picture list 0) is formed for each inter-coded (P) slice.

A reference picture list, such as the reference picture list 0 and the reference picture list 1, may be constructed in two steps: First, an initial reference picture list is generated. The initial reference picture list may be generated using an algorithm pre-defined in a standard. Such an algorithm may use e.g. POC and/or temporal sub-layer, as the basis. The algorithm may process reference pictures with particular marking(s), such as "used for reference", and omit other reference pictures, i.e. avoid inserting other reference pictures into the initial reference picture list. An example of such other reference picture is a reference picture marked as "unused for reference" but still residing in the decoded picture buffer waiting to be output from the decoder. Second, the initial reference picture list may be reordered through a specific syntax structure, such as reference picture list reordering (RPLR) commands of H.264/AVC or reference picture list modification syntax structure of HEVC or anything alike. Furthermore, the number of active reference pictures may be indicated for each list, and the use of the pictures beyond the active ones in the list as reference for inter prediction is disabled. One or both the reference picture list initialization and reference picture list modification may process only active reference pictures among those reference pictures that are marked as "used for reference" or alike.

Scalable video coding refers to coding structure where one bitstream can contain multiple representations of the content at different bitrates, resolutions or frame rates. In these cases, the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A scalable bitstream may include a "base layer" providing the lowest quality video available and one or more enhancement layers that enhance the video quality when received and decoded together with the lower layers. In order to improve coding efficiency for the enhancement layers, the coded representation of that layer may depend on the lower layers. E.g. the motion and mode information of the enhancement layer can be predicted from lower layers. Similarly, the pixel data of the lower layers can be used to create prediction for the enhancement layer.

A scalable video codec for quality scalability (also known as Signal-to-Noise or SNR) and/or spatial scalability may be implemented as follows. For a base layer, a conventional non-scalable video encoder and decoder is used. The reconstructed/decoded pictures of the base layer are included in the reference picture buffer for an enhancement layer. In H.264/AVC, HEVC, and similar codecs using reference picture list(s) for inter prediction, the base layer decoded pictures may be inserted into a reference picture list(s) for coding/decoding of an enhancement layer picture similarly to the decoded reference pictures of the enhancement layer. Consequently, the encoder may choose a base-layer reference picture as inter prediction reference and indicate its use e.g. with a reference picture index in the coded bitstream. The decoder decodes from the bitstream, for example from a reference picture index, that a base-layer picture is used as inter prediction reference for the enhancement layer. When a decoded base-layer picture is used as prediction reference for an enhancement layer, it is referred to as an inter-layer reference picture.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer.

Spatial scalability: Base layer pictures are coded at a lower resolution (i.e. have fewer samples) than enhancement layer pictures. Spatial scalability and quality scalability may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function. Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

Region-of-interest (ROI) scalability: An enhancement layer represents of spatial subset of the base layer. ROI scalability may be used together with other types of scalability, e.g. quality or spatial scalability so that the enhancement layer provides higher subjective quality for the spatial subset.

View scalability, which may also be referred to as multiview coding. The base layer represents a first view, whereas an enhancement layer represents a second view.

Depth scalability, which may also be referred to as depth-enhanced coding. A layer or some layers of a bitstream may represent texture view(s), while other layer or layers may represent depth view(s).

In all of the above scalability cases, base layer information could be used to code enhancement layer to minimize the additional bitrate overhead.

Scalability can be enabled in two basic ways. Either by introducing new coding modes for performing prediction of pixel values or syntax from lower layers of the scalable representation or by placing the lower layer pictures to the reference picture buffer (decoded picture buffer, DPB) of the higher layer. The first approach is more flexible and thus can provide better coding efficiency in most cases. However, the second, reference frame-based scalability, approach can be implemented very efficiently with minimal changes to single layer codecs while still achieving majority of the coding efficiency gains available. Essentially a reference frame-based scalability codec can be implemented by utilizing the same hardware or software implementation for all the layers, just taking care of the DPB management by external means.

An elementary unit for the output of encoders of some coding formats, such as HEVC, and the input of decoders of some coding formats, such as HEVC, is a Network Abstraction Layer (NAL) unit. For transport over packet-oriented networks or storage into structured files, NAL units may be encapsulated into packets or similar structures.

NAL units consist of a header and payload. In HEVC, a two-byte NAL unit header is used for all specified NAL unit types, while in other codecs NAL unit header may be similar to that in HEVC.

In HEVC, the NAL unit header contains one reserved bit, a six-bit NAL unit type indication, a three-bit temporal_id_plus1 indication for temporal level or sub-layer (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming.

Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream. Such temporal scalable layer may comprise VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU. In HEVC, the NAL unit type within a certain range indicates a VCL NAL unit, and the VCL NAL unit type indicates a picture type.

Images can be split into independently codable and decodable image segments (e.g. slices or tiles or tile groups). Such image segments may enable parallel processing, "Slices" in this description may refer to image segments constructed of certain number of basic coding units that are processed in default coding or decoding order, while "tiles" may refer to image segments that have been defined as rectangular image regions. A tile group may be defined as a group of one or more tiles. Image segments may be coded as separate units in the bitstream, such as VCL NAL units in H.264/AVC and HEVC. Coded image segments may comprise a header and a payload, wherein the header contains parameter values needed for decoding the payload.

In the HEVC standard, a picture can be partitioned in tiles, which are rectangular and contain an integer number of CTUs. In the HEVC standard, the partitioning to tiles forms a grid that may be characterized by a list of tile column widths (in CTUs) and a list of tile row heights (in CTUs). Tiles are ordered in the bitstream consecutively in the raster scan order of the tile grid. A tile may contain an integer number of slices.

In the HEVC, a slice consists of an integer number of CTUs. The CTUs are scanned in the raster scan order of CTUs within tiles or within a picture, if tiles are not in use. A slice may contain an integer number of tiles or a slice can be contained in a tile. Within a CTU, the CUs have a specific scan order.

In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL (Network Abstraction Layer) unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

In a draft version of H.266/VVC, pictures are partitioned to tile along a tile grid (similarly to HEVC). Tiles are ordered in the bitstream in tile raster scan order within a picture, and CTUs are ordered in the bitstream in raster scan order within a tile. A tile group contains one or more entire tiles in bitstream order (i.e. tile raster scan order within a picture), and a VCL NAL unit contains one tile group. Slices have not been included in the draft version of H.266/VVC. It is noted that what was described in this paragraph might still evolve in later draft versions of H.2661VVC until the standard is finalized.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. An MCTS sequence may be defined as a sequence of respective MCTSs in one or more coded video sequences or alike. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures. A motion-constrained tile set may be regarded as an independently coded tile set, since it may be decoded without the other tile sets.

It is appreciated that sample locations used in inter prediction may be saturated so that a location that would be outside the picture otherwise is saturated to point to the corresponding boundary sample of the picture. Hence, in some use cases, if a tile boundary is also a picture boundary, motion vectors may effectively cross that boundary or a motion vector may effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI (Supplemental Enhancement Information) message of HEVC can be used to indicate the presence of motion-constrained tile sets in the bitstream.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Some coding formats specify parameter sets that may carry parameter values needed for the decoding or reconstruction of decoded pictures. Parameters that remain unchanged through a coded video sequence may be included in a sequence parameter set (SPS). In addition to the parameters that may be needed by the decoding process, the sequence parameter set may optionally contain video usability information (VUI), which includes parameters that may be important for buffering, picture output timing, rendering, and resource reservation. A picture parameter set (PPS) contains such parameters that are likely to be unchanged in several coded pictures. A picture parameter set may include parameters that can be referred to by the coded image segments of one or more coded pictures. A header parameter set (HPS) has been proposed to contain such parameters that may change on picture basis.

A parameter set may be activated when it is referenced e.g. through its identifier. For example, a header of an image segment, such as a slice header, may contain an identifier of the PPS that is activated for decoding the coded picture containing the image segment. A PPS may contain an identifier of the SPS that is activated, when the PPS is activated. An activation of a parameter set of a particular type may cause the deactivation of the previously active parameter set of the same type.

Instead of or in addition to parameter sets at different hierarchy levels (e.g. sequence and picture), video coding formats may include header syntax structures, such as a sequence header or a picture header. A sequence header may precede any other data of the coded video sequence in the bitstream order. A picture header may precede any coded video data for the picture in the bitstream order.

The phrase along the bitstream (e.g. indicating along the bitstream) or along a coded unit of a bitstream (e.g. indicating along a coded tile) may be used in claims and described embodiments to refer to transmission, signaling, or storage in a manner that the "out-of-band" data is associated with but not included within the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively. For example, the phrase along the bitstream may be used when the bitstream is contained in a container file, such as a file conforming to the ISO Base Media File Format, and certain file metadata is stored in the file in a manner that associates the metadata to the bitstream, such as boxes in the sample entry for a track containing the bitstream, a sample group for the track containing the bitstream, or a timed metadata track associated with the track containing the bitstream.

A coded picture is a coded representation of a picture.

A Random Access Point (RAP) picture, which may also be referred to as an intra random access point (TRAP) picture, may comprise only intra-coded image segments. Furthermore, a RAP picture may constrain subsequence pictures in output order to be such that they can be correctly decoded without performing the decoding process of any pictures that precede the RAP picture in decoding order.

An access unit may comprise coded video data for a single time instance and associated other data. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

It may be required that coded pictures appear in certain order within an access unit. For example, a coded picture with nuh_layer_id equal to nuhLayerIdA may be required to precede, in decoding order, all coded pictures with nuh_layer_id greater than nuhLayerIdA in the same access unit.

A bitstream may be defined as a sequence of bits, which may in some coding formats or standards be in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. In some coding formats or standards, the end of the first bitstream may be indicated by a specific NAL unit, which may be referred to as the end of bitstream (EOB) NAL unit and which is the last NAL unit of the bitstream.

A coded video sequence (CVS) may be defined as such a sequence of coded pictures in decoding order that is independently decodable and is followed by another coded video sequence or the end of the bitstream.

Bitstreams or coded video sequences can be encoded to be temporally scalable as follows. Each picture may be assigned to a particular temporal sub-layer. Temporal sub-layers may be enumerated e.g. from 0 upwards. The lowest temporal sub-layer, sub-layer 0, may be decoded independently. Pictures at temporal sub-layer 1 may be predicted from reconstructed pictures at temporal sub-layers 0 and 1. Pictures at temporal sub-layer 2 may be predicted from reconstructed pictures at temporal sub-layers 0, 1, and 2, and so on. In other words, a picture at temporal sub-layer N does not use any picture at temporal sub-layer greater than N as a reference for inter prediction. The bitstream created by excluding all pictures greater than or equal to a selected sub-layer value and including pictures remains conforming.

A sub-layer access picture may be defined as a picture from which the decoding of a sub-layer can be started correctly, i.e. starting from which all pictures of the sub-layer can be correctly decoded. In HEVC there are two picture types, the temporal sub-layer access (TSA) and step-wise temporal sub-layer access (STSA) picture types, that can be used to indicate temporal sub-layer switching points. If temporal sub-layers with TemporalId up to N had been decoded until the TSA or STSA picture (exclusive) and the TSA or STSA picture has TemporalId equal to N+1, the ISA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides.

Available media file format standards include ISO base media file format (ISO/IEC 14496-12, which may be abbreviated ISOBMFF), MPEG-4 file format (ISO/IEC 14496-14, also known as the MP4 format), file format for NAL unit structured video (ISO/IEC 14496-15) and 3GPP file format (3GPP TS 26.244, also known as the 3GP format). The ISO file format is the base for derivation of all the above mentioned file formats (excluding the ISO file format itself). These file formats (including the ISO file format itself) are generally called the ISO family of file formats.

Some concepts, structures, and specifications of ISOBMFF are described below as an example of a container file format, based on which the embodiments may be implemented. The aspects of the present disclosure are not limited to ISOBMFF, but rather the description is given for one possible basis on top of which the example embodiments may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding TrackBox ('trak'). A track may be one of the many types, including a media track that refers to samples formatted according to a media compression format (and its encapsulation to the ISO base media file format). A track may be regarded as a logical channel.

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs (a.k.a. track fragment runs), each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es).

TrackGroupBox, which is contained in TrackBox, enables indication of groups of tracks where each group shares a particular characteristic or the tracks within a group have a particular relationship. The box contains zero or more boxes, and the particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, 2nd Edition, 2014). 3GPP continued to work on adaptive HTTP streaming in communication with MPEG and published 3GP-DASH (Dynamic Adaptive Streaming over HTTP; 3GPP TS 26.247: "Transparent end-to-end packet-switched streaming Service (PSS); Progressive download and dynamic adaptive Streaming over HTTP (3GP-DASH)". MPEG DASH and 3GP-DASH are technically close to each other and may therefore be collectively referred to as DASH. Some concepts, formats, and operations of DASH are described below as an example of a video streaming system, wherein the embodiments may be implemented. The aspects of the present disclosure are not limited to DASH, but rather the description is given for one possible basis on top of which the example embodiments may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single file or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In DASH, hierarchical data model is used to structure media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

The DASH MPD complies with Extensible Markup Language (XML) and is therefore specified through elements and attributes as defined in XML.

In DASH, all descriptor elements are structured in the same way, namely they contain a @schemeIdUri attribute that provides a URI to identify the scheme and an optional attribute @value and an optional attribute @id. The semantics of the element are specific to the scheme employed. The URI identifying the scheme may be a URN or a URL.

In DASH, an independent representation may be defined as a representation that can be processed independently of any other representations, An independent representation may be understood to comprise an independent bitstream or an independent layer of a bitstream. A dependent representation may be defined as a representation for which Segments from its complementary representations are necessary for presentation and/or decoding of the contained media content components. A dependent representation may be understood to comprise e.g. a predicted layer of a scalable bitstream. A complementary representation may be defined as a representation which complements at least one dependent representation. A complementary representation may be an independent representation or a dependent representation. Dependent Representations may be described by a Representation element that contains a @dependencyId attribute. Dependent Representations can be regarded as regular Representations except that they depend on a set of complementary Representations for decoding and/or presentation. The @dependencyId contains the values of the @id attribute of all the complementary Representations, i.e. Representations that are necessary to present and/or decode the media content components contained in this dependent Representation.

Track references of ISOBMFF can be reflected in the list of four-character codes in the @associationType attribute of DASH MPD that is mapped to the list of Representation@id values given in the @associationId in a one to one manner. These attributes may be used for linking media Representations with metadata Representations.

A DASH service may be provided as on-demand service or live service. In the former, the MPD is a static and all Segments of a Media Presentation are already available when a content provider publishes an MPD. In the latter, however, the MPD may be static or dynamic depending on the Segment URLs construction method employed by a MPD and Segments are created continuously as the content is produced and published to DASH clients by a content provider. Segment URLs construction method may be either template-based Segment URLs construction method or the Segment list generation method. In the former, a DASH client is able to construct Segment URLs without updating an MPD before requesting a Segment. In the latter, a DASH client has to periodically download the updated MPDs to get Segment URLs. For live service, hence, the template-based Segment URLs construction method is superior to the Segment list generation method.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

The notation (Sub)segment refers to either a Segment or a Subsegment. If Segment Index boxes are not present, the notation (Sub)segment refers to a Segment. If Segment Index boxes are present, the notation (Sub)segment may refer to a Segment or a Subsegment, e.g. depending on whether the client issues requests on Segment or Subsegment basis.

MPEG-DASH defines segment-container formats for both ISO Base Media File Format and MPEG-2 Transport Streams. Other specifications may specify segment formats based on other container formats. For example, a segment format based on Matroska container file format has been proposed.

DASH supports rate adaptation by dynamically requesting Media Segments from different Representations within an Adaptation Set to match varying network bandwidth. When a DASH client switches up/down Representation, coding dependencies within Representation have to be taken into account. A Representation switch may happen at a random access point (RAP), which is typically used in video coding techniques such as H.264/AVC. In DASH, a more general concept named Stream Access Point (SAP) is introduced to provide a codec-independent solution for accessing a Representation and switching between Representations. In DASH, a SAP is specified as a position in a Representation that enables playback of a media stream to be started using only the information contained in Representation data starting from that position onwards (preceded by initialising data in the Initialisation Segment, if any). Hence, Representation switching can be performed in SAP.

In DASH the automated selection between Representations in the same Adaptation Set have been performed based on the width and height (@width and @height); the frame rate (@frameRate); the bitrate (@bandwidth); indicated quality ordering between the Representations (@qualityRanking). The semantics of @qualityRanking are specified as follows: specifies a quality ranking of the Representation relative to other Representations in the same Adaptation Set. Lower values represent higher quality content. If not present, then no ranking is defined.

Several types of SAP have been specified, including the following. SAP Type 1 corresponds to what is known in some coding schemes as a "Closed GOP random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

In some video coding standards, such as MPEG-2, each intra picture has been a random access point in a coded sequence. The capability of flexible use of multiple reference pictures for inter prediction in some video coding standards, such as H.264/AVC and H.265/HEVC, has a consequence that an intra picture may not be sufficient for random access. Therefore, pictures may be marked with respect to their random access point functionality rather than inferring such functionality from the coding type; for example an IDR picture as specified in the H.264/AVC standard can be used as a random access point. A closed group of pictures (GOP) is such a group of pictures in which all pictures can be correctly decoded. For example, in H.264/AVC, a closed GOP may start from an IDR access unit.

An open group of pictures (GOP) is such a group of pictures in which pictures preceding the initial intra picture in output order may not be correctly decodable but pictures following the initial intra picture in output order are correctly decodable. Such an initial intra picture may be indicated in the bitstream and/or concluded from the indications from the bitstream, e.g. by using the CRA NAL unit type in HEVC. The pictures preceding the initial intra picture starting an open GOP in output order and following the initial intra picture in decoding order may be referred to as leading pictures. There are two types of leading pictures: decodable and non-decodable. Decodable leading pictures, such as RADL pictures of HEVC, are such that can be correctly decoded when the decoding is started from the initial intra picture starting the open GOP. In other words, decodable leading pictures use only the initial ultra picture or subsequent pictures in decoding order as reference in inter prediction. Non-decodable leading pictures, such as RASL pictures of HEVC, are such that cannot be correctly decoded when the decoding is started from the initial ultra picture starting the open GOP.

A DASH Preselection defines a subset of media components of an MPD that are expected to be consumed jointly by a single decoder instance, wherein consuming may comprise decoding and rendering. The Adaptation Set that contains the main media component for a Preselection is referred to as main Adaptation Set. In addition, each Preselection may include one or multiple partial Adaptation Sets. Partial Adaptation Sets may need to be processed in combination with the main Adaptation Set. A main Adaptation Set and partial Adaptation Sets may be indicated by one of the two means: a preselection descriptor or a Preselection element.

Virtual reality is a rapidly developing area of technology in which image or video content, sometimes accompanied by audio, is provided to a user device such as a user headset (a.k.a. head-mounted display). As is known, the user device may be provided with a live or stored feed from a content source, the feed representing a virtual space for immersive output through the user device. Currently, many virtual reality user devices use so-called three degrees of freedom (3DoF), which means that the head movement in the yaw, pitch and roll axes are measured and determine what the user sees, i.e. to determine the viewport. It is known that rendering by taking the position of the user device and changes of the position into account can enhance the immersive experience. Thus, an enhancement to 3DoF is a six degrees-of-freedom (6DoF) virtual reality system, where the user may freely move in Euclidean space as well as rotate their head in the yaw, pitch and roll axes. Six degrees-of-freedom virtual reality systems enable the provision and consumption of volumetric content. Volumetric content comprises data representing spaces and/or objects in three-dimensions from all angles, enabling the user to move fully around the space and/or objects to view them from any angle. Such content may be defined by data describing the geometry (e.g. shape, size, position in a three-dimensional space) and attributes such as colour, opacity and reflectance. The data may also define temporal changes in the geometry and attributes at given time instances, similar to frames in two-dimensional video.

Terms 360-degree video or virtual reality (VR) video may sometimes be used interchangeably. They may generally refer to video content that provides such a large field of view (FOV) that only a part of the video is displayed at a single point of time in displaying arrangements. For example, VR video may be viewed on a head-mounted display (HMD) that may be capable of displaying e.g. about 100-degree field of view. The spatial subset of the VR video content to be displayed may be selected based on the orientation of the HMD. In another example, a flat-panel viewing environment is assumed, wherein e.g. up to 40-degree field-of-view may be displayed. When displaying wide-FOV content (e.g. fisheye) on such a display, it may be preferred to display a spatial subset rather than the entire picture.

MPEG Omnidirectional Media Format (ISO/TEC 23090-2) is a virtual reality (VR) system standard. OMAF defines a media format (comprising both file format derived from ISOBMFF and streaming formats for DASH and MPEG Media Transport). OMAF version 1 supports 360° video, images, and audio, as well as the associated timed text and facilitates three degrees of freedom (3DoF) content consumption, meaning that a viewport can be selected with any azimuth and elevation range and tilt angle that are covered by the omnidirectional content but the content is not adapted to any translational changes of the viewing position. The viewport-dependent streaming scenarios described further below have also been designed for 3DoF although could potentially be adapted to a different number of degrees of freedom.

OMAF is discussed with reference to FIG. 1. A real-world audio-visual scene (A) may be captured by audio sensors as well as a set of cameras or a camera device with multiple lenses and sensors. The acquisition results in a set of digital image/video (Bi) and audio (Ba) signals. The cameras/lenses may cover all directions around the center point of the camera set or camera device, thus the name of 360-degree video.

Audio can be captured using many different microphone configurations and stored as several different content formats, including channel-based signals, static or dynamic (i.e. moving through the 3D scene) object signals, and scene-based signals (e.g., Higher Order Ambisonics). The channel-based signals may conform to one of the loudspeaker layouts defined in CICP (Coding-Independent Code-Points). In an omnidirectional media application, the loudspeaker layout signals of the rendered immersive audio program may be binauralized for presentation via headphones.

The images (Bi) of the same time instance are stitched, projected, and mapped onto a packed picture (D).

For monoscopic 360-degree video, the input images of one time instance may be stitched to generate a projected picture representing one view. An example of image stitching, projection, and region-wise packing process for monoscopic content is illustrated with FIG. 2. Input images (Bi) are stitched and projected onto a three-dimensional projection structure that may for example be a unit sphere. The projection structure may be considered to comprise one or more surfaces, such as plane(s) or part(s) thereof. A projection structure may be defined as three-dimensional structure consisting of one or more surface(s) on which the captured VR image/video content is projected, and from which a respective projected picture can be formed. The image data on the projection structure is further arranged onto a two-dimensional projected picture (C). The term projection may be defined as a process by which a set of input images are projected onto a projected picture. There may be a predefined set of representation formats of the projected picture, including for example an equirectangular projection (ERP) format and a cube map projection (CMP) format. It may be considered that the projected picture covers the entire sphere.

Optionally, a region-wise packing is then applied to map the projected picture (C) onto a packed picture (D). If the region-wise packing is not applied, the packed picture is identical to the projected picture, and this picture is given as input to image/video encoding. Otherwise, regions of the projected picture (C) are mapped onto a packed picture (D) by indicating the location, shape, and size of each region in the packed picture, and the packed picture (D) is given as input to image/video encoding. The term region-wise packing may be defined as a process by which a projected picture is mapped to a packed picture. The term packed picture may be defined as a picture that results from region-wise packing of a projected picture.

Figure 2:
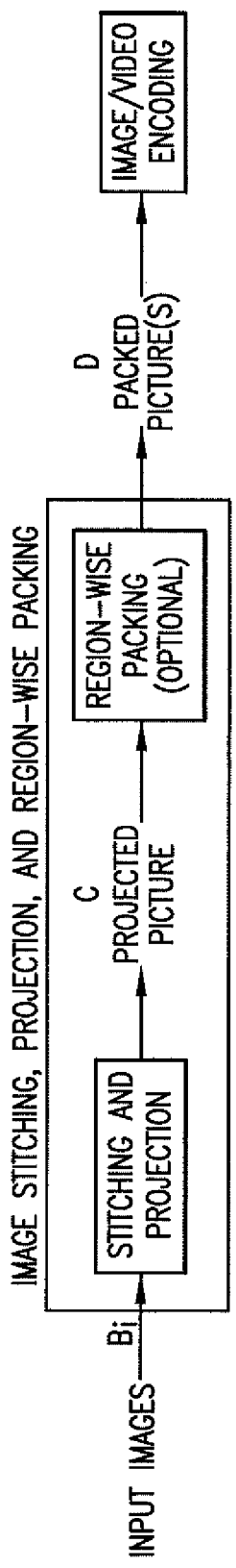
FIG. 2 shows an example of image stitching, projection and region-wise packing.
Figure 3:
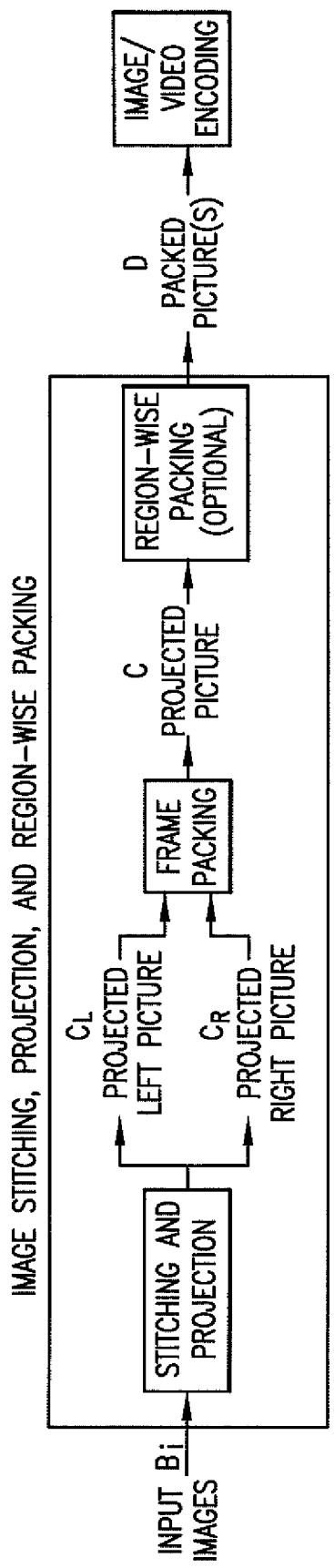
FIG. 3 shows another example of image stitching, projection and region-wise packing.

In the case of stereoscopic 360-degree video, as shown in an example of FIG. 3, the input images of one time instance are stitched to generate a projected picture representing two views (CL, CR), one for each eye. Both views (CL, CR) can be mapped onto the same packed picture (D), and encoded by a traditional 2D video encoder. Alternatively, each view of the projected picture can be mapped to its own packed picture, in which case the image stitching, projection, and region-wise packing is performed as illustrated in FIG. 2. A sequence of packed pictures of either the left view or the right view can be independently coded or, when using a multiview video encoder, predicted from the other view.

An example of image stitching, projection, and region-wise packing process for stereoscopic content where both views are mapped onto the same packed picture, as shown in FIG. 3 is described next in more detailed manner. Input images (Bi) are stitched and projected onto two three-dimensional projection structures, one for each eye. The image data on each projection structure is further arranged onto a two-dimensional projected picture (CL for left eye, CR for right eye), which covers the entire sphere. Frame packing is applied to pack the left view picture and right view picture onto the same projected picture. Optionally, region-wise packing is then applied to the pack projected picture onto a packed picture, and the packed picture (D) is given as input to image/video encoding. If the region-wise packing is not applied, the packed picture is identical to the projected picture, and this picture is given as input to image/video encoding.

The image stitching, projection, and region-wise packing process can be carried out multiple times for the same source images to create different versions of the same content, e.g. for different orientations of the projection structure. Similarly, the region-wise packing process can be performed multiple times from the same projected picture to create more than one sequence of packed pictures to be encoded.

Figure 4:
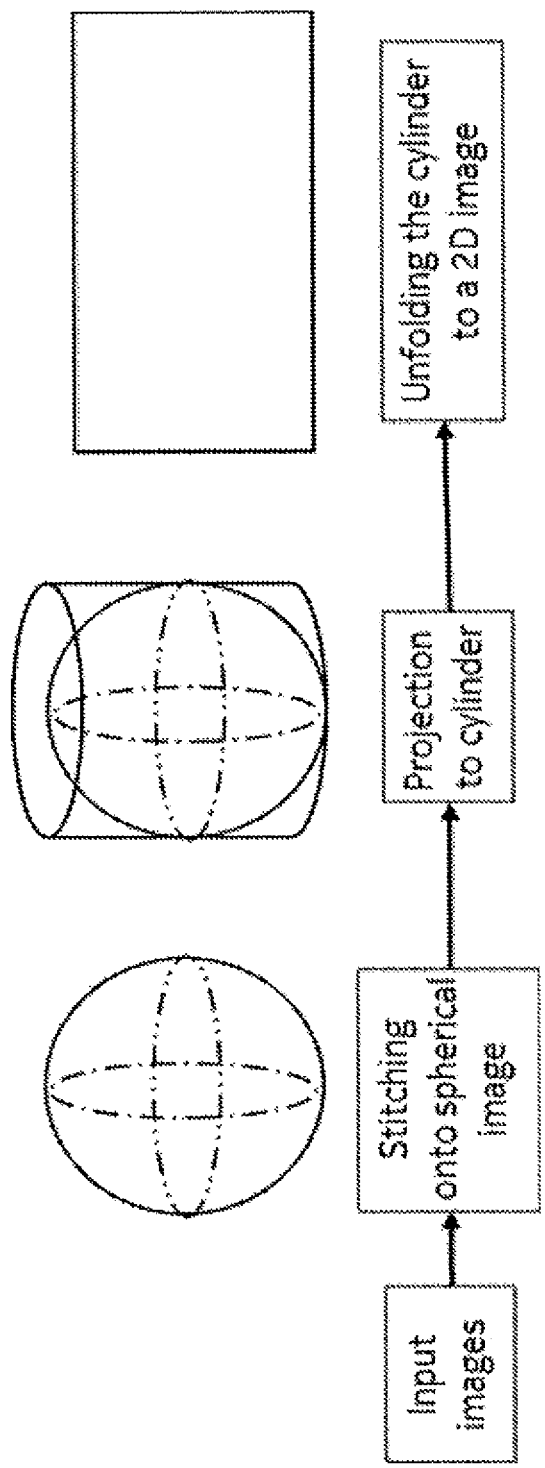
FIG. 4 shows an example of a process of forming a monoscopic equirectangular panorama picture.

360-degree panoramic content (i.e., images and video) cover horizontally the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that has been mapped to a two-dimensional image plane using equirectangular projection (ERP). In this case, the horizontal coordinate may be considered equivalent to a longitude, and the vertical coordinate may be considered equivalent to a latitude, with no transformation or scaling applied. The process of forming a monoscopic equirectangular panorama picture is illustrated in FIG. 4. A set of input images, such as fisheye images of a camera array or a camera device with multiple lenses and sensors, is stitched onto a spherical image. The spherical image is further projected onto a cylinder (without the top and bottom faces). The cylinder is unfolded to form a two-dimensional projected picture. In practice one or more of the presented steps may be merged; for example, the input images may be directly projected onto a cylinder without an intermediate projection onto a sphere. The projection structure for equirectangular panorama may be considered to be a cylinder that comprises a single surface.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane.

In some cases panoramic content with 360-degree horizontal field-of-view but with less than 180-degree vertical field-of-view may be considered special cases of equirectangular projection, where the polar areas of the sphere have not been mapped onto the two-dimensional image plane. In some cases a panoramic image may have less than 360-degree horizontal field-of-view and up to 180-degree vertical field-of-view, while otherwise has the characteristics of equirectangular projection format.

Region-wise packing information may be encoded as metadata in or along the bitstream. For example, the packing information may comprise a region-wise mapping from a pre-defined or indicated source format to the packed picture format, e.g. from a projected picture to a packed picture, as described earlier.

Rectangular region-wise packing metadata may be described as follows:

For each region, the metadata defines a rectangle in a projected picture, the respective rectangle in the packed picture, and an optional transformation of rotation by 90, 180, or 270 degrees and/or horizontal and/or vertical mirroring. Rectangles may, for example, be indicated by the locations of the top-left corner and the bottom-right corner. The mapping may comprise resampling. As the sizes of the respective rectangles can differ in the projected and packed pictures, the mechanism infers region-wise resampling.

Among other things, region-wise packing provides signalling for the following usage scenarios:

1) Additional compression for viewport-independent projections is achieved by densifying sampling of different regions to achieve more uniformity across the sphere. For example, the top and bottom parts of ERP are oversampled, and region-wise packing can be applied to down-sample them horizontally.
2) Arranging the faces of plane-based projection formats, such as cube map projection, in an adaptive manner.
3) Generating viewport-dependent bitstreams that use viewport-independent projection formats. For example, regions of ERP or faces of CMP can have different sampling densities and the underlying projection structure can have different orientations.
4) Indicating regions of the packed pictures represented by an extractor track. This is needed when an extractor track collects tiles from bitstreams of different resolutions.

A guard band may be defined as an area in a packed picture that is not rendered but may be used to improve the rendered part of the packed picture to avoid or mitigate visual artifacts such as seams.

Referring again to FIG. 1, the OMAF allows the omission of image stitching, projection, and region-wise packing and encode the image/video data in their captured format. In this case, images (D) are considered the same as images (Bi) and a limited number of fisheye images per time instance are encoded.

For audio, the stitching process is not needed, since the captured signals are inherently immersive and omnidirectional.

The stitched images (D) are encoded as coded images (Ei) or a coded video bitstream (Ev). The captured audio (Ba) is encoded as an audio bitstream (Ea). The coded images, video, and/or audio are then composed into a media file for file playback (F) or a sequence of an initialization segment and media segments for streaming (Fs), according to a particular media container file format. In this specification, the media container file format is the ISO base media file format. The file encapsulator also includes metadata into the file or the segments, such as projection and region-wise packing information assisting in rendering the decoded packed pictures.

The metadata in the file may include:
the projection format of the projected picture,
fisheye video parameters,
the area of the spherical surface covered by the packed picture,
the orientation of the projection structure corresponding to the projected picture relative to the global coordinate axes,
region-wise packing information, and
region-wise quality ranking (optional).

Region-wise packing information may be encoded as metadata in or along the bitstream, for example as region-wise packing SEI message(s) and/or as region-wise packing boxes in a file containing the bitstream. For example, the packing information may comprise a region-wise mapping from a pre-defined or indicated source format to the packed picture format, e.g. from a projected picture to a packed picture, as described earlier. The region-wise mapping information may for example comprise for each mapped region a source rectangle (a.k.a. projected region) in the projected picture and a destination rectangle (a.k.a. packed region) in the packed picture, where samples within the source rectangle are mapped to the destination rectangle and rectangles may for example be indicated by the locations of the top-left corner and the bottom-right corner. The mapping may comprise resampling. Additionally or alternatively, the packing information may comprise one or more of the following: the orientation of the three-dimensional projection structure relative to a coordinate system, indication which projection format is used, region-wise quality ranking indicating the picture quality ranking between regions and/or first and second spatial region sequences, one or more transformation operations, such as rotation by 90, 180, or 270 degrees, horizontal mirroring, and vertical mirroring. The semantics of packing information may be specified in a manner that they are indicative for each sample location within packed regions of a decoded picture which is the respective spherical coordinate location.

The segments (Fs) may be delivered using a delivery mechanism to a player.

The file that the file encapsulator outputs (F) is identical to the file that the file decapsulator inputs (F'). A file decapsulator processes the file (F') or the received segments (F's) and extracts the coded bitstreams (E'a, E'v, and/or E'i) and parses the metadata. The audio, video, and/or images are then decoded into decoded signals (B'a for audio, and D' for images/video). The decoded packed pictures (D') are projected onto the screen of a head-mounted display or any other display device based on the current viewing orientation or viewport and the projection, spherical coverage, projection structure orientation, and region-wise packing metadata parsed from the file. Likewise, decoded audio (B'a) is rendered, e.g. through headphones, according to the current viewing orientation. The current viewing orientation is determined by the head tracking and possibly also eye tracking functionality. Besides being used by the renderer to render the appropriate part of decoded video and audio signals, the current viewing orientation may also be used the video and audio decoders for decoding optimization.

The process described above is applicable to both live and on-demand use cases.

At any point of time, a video rendered by an application on a HMD or on another display device renders a portion of the 360-degree video. This portion may be defined as a viewport. A viewport may be understood as a window on the 360-degree world represented in the omnidirectional video displayed via a rendering display. According to another definition, a viewport may be defined as a part of the spherical video that is currently displayed. A viewport may be characterized by horizontal and vertical field of views (FOV or FoV).

A viewpoint may be defined as the point or space from which the user views the scene; it usually corresponds to a camera position. Slight head motion does not imply a different viewpoint. A viewing position may be defined as the position within a viewing space from which the user views the scene. A viewing space may be defined as a 3D space of viewing positions within which rendering of image and video is enabled and VR experience is valid.

Typical representation formats for volumetric content include triangle meshes, point clouds and voxels. Temporal information about the content may comprise individual capture instances, i.e. frames or the position of objects as a function of time.

Advances in computational resources and in three-dimensional acquisition devices enable reconstruction of highly-detailed volumetric representations. Infrared, laser, time-of-flight and structured light technologies are examples of how such content may be constructed. The representation of volumetric content may depend on how the data is to be used. For example, dense voxel arrays may be used to represent volumetric medical images. In three-dimensional graphics, polygon meshes are extensively used. Point clouds, on the other hand, are well suited to applications such as capturing real-world scenes where the topology of the scene is not necessarily a two-dimensional surface or manifold. Another method is to code three-dimensional data to a set of texture and depth maps. Closely related to this is the use of elevation and multi-level surface maps. For the avoidance of doubt, embodiments herein are applicable to any of the above technologies.

"Voxel" of a three-dimensional world corresponds to a pixel of a two-dimensional world. Voxels exist in a three-dimensional grid layout. An octree is a tree data structure used to partition a three-dimensional space. Octrees are the three-dimensional analog of quadtrees. A sparse voxel octree (SVO) describes a volume of a space containing a set of solid voxels of varying sizes. Empty areas within the volume are absent from the tree, which is why it is called "sparse".

A three-dimensional volumetric representation of a scene may be determined as a plurality of voxels on the basis of input streams of at least one multicamera device. Thus, at least one but preferably a plurality (i.e. 2, 3, 4, 5 or more) of multicamera devices may be used to capture 3D video representation of a scene. The multicamera devices are distributed in different locations in respect to the scene, and therefore each multicamera device captures a different 3D video representation of the scene. The 3D video representations captured by each multicamera device may be used as input streams for creating a 3D volumetric representation of the scene, said 3D volumetric representation comprising a plurality of voxels. Voxels may be formed from the captured 3D points e.g. by merging the 3D points into voxels comprising a plurality of 3D points such that for a selected 3D point, all neighbouring 3D points within a predefined threshold from the selected 3D point are merged into a voxel without exceeding a maximum number of 3D points in a voxel.

Voxels may also be formed through the construction of the sparse voxel octree. Each leaf of such a tree represents a solid voxel in world space; the root node of the tree represents the bounds of the world. The sparse voxel octree construction may have the following steps: 1) map each input depth map to a world space point cloud, where each pixel of the depth map is mapped to one or more 3D points; 2) determine voxel attributes such as colour and surface normal vector by examining the neighbourhood of the source pixel(s) in the camera images and the depth map; 3) determine the size of the voxel based on the depth value from the depth map and the resolution of the depth map; 4) determine the SVO level for the solid voxel as a function of its size relative to the world bounds; 5) determine the voxel coordinates on that level relative to the world bounds; 6) create new and/or traversing existing SVO nodes until arriving at the determined voxel coordinates; 7) insert the solid voxel as a leaf of the tree, possibly replacing or merging attributes from a previously existing voxel at those coordinates. Nevertheless, the size of voxel within the 3D volumetric representation of the scene may differ from each other. The voxels of the 3D volumetric representation thus represent the spatial locations within the scene.

A volumetric video frame may be regarded as a complete sparse voxel octree that models the world at a specific point in time in a video sequence. Voxel attributes contain information like colour, opacity, surface normal vectors, and surface material properties. These are referenced in the sparse voxel octrees (e.g. colour of a solid voxel), but can also be stored separately.

Point clouds are commonly used data structures for storing volumetric content. Compared to point clouds, sparse voxel octrees describe a recursive subdivision of a finite volume with solid voxels of varying sizes, while point clouds describe an unorganized set of separate points limited only by the precision of the used coordinate values.

In technologies such as dense point clouds and voxel arrays, there may be tens or even hundreds of millions of points. In order to store and transport such content between entities, such as between a server and a client over an IP network, compression is usually required.

User's position can be detected relative to content provided within the volumetric virtual reality content, e.g. so that the user can move freely within a given virtual reality space, around individual objects or groups of objects, and can view the objects from different angles depending on the movement (e.g. rotation and location) of their head in the real world. In some examples, the user may also view and explore a plurality of different virtual reality spaces and move from one virtual reality space to another one.

The angular extent of the environment observable or hearable through a rendering arrangement, such as with a head-mounted display, may be called the visual field of view (FOV). The actual FOV observed or heard by a user depends on the inter-pupillary distance and on the distance between the lenses of the virtual reality headset and the user's eyes, but the FOV can be considered to be approximately the same for all users of a given display device when the virtual reality headset is being worn by the user.

When viewing volumetric content from a single viewing position, a portion (often half) of the content may not be seen because it is facing away from the user. This portion is sometimes called "back facing content".

A volumetric image/video delivery system may comprise providing a plurality of patches representing part of a volumetric scene, and providing, for each patch, patch visibility information indicative of a set of directions from which a forward surface of the patch is visible. A volumetric image/video delivery system may further comprise providing one or more viewing positions associated with a client device, and processing one or more of the patches dependent on whether the patch visibility information indicates that the forward surface of the one or more patches is visible from the one or more viewing positions.

Patch visibility information is data indicative of where in the volumetric space the forward surface of the patch can be seen. For example, patch visibility information may comprise a visibility cone, which may comprise a visibility cone direction vector (X, Y, Z) and an opening angle (A). The opening angle (A) defines a set of spatial angles from which the forward surface of the patch can be seen. In another example, the patch visibility metadata may comprise a definition of a bounding sphere surface and sphere region metadata, identical or similar to that specified by the omnidirectional media format (OMAF) standard (ISO/IEC 23090-2). The bounding sphere surface may for example be defined by a three-dimensional location of the centre of the sphere, and the radius of the sphere. When the viewing position collocates with the bounding sphere surface, the patch may be considered visible within the indicated sphere region. In general, the geometry of the bounding surface may also be something other than a sphere, such as cylinder, cube, or cuboid. Multiple sets of patch visibility metadata may be defined for the same three-dimensional location of the centre of the bounding surface, but with different radii (or information indicative of the distance of the bounding surface from the three-dimensional location). Indicating several pieces of patch visibility metadata may be beneficial to handle occlusions.

A volumetric image/video delivery system may comprise one or more patch culling modules. One patch culling module may be configured to determine which patches are transmitted to a user device, for example the rendering module of the headset. Another patch culling module may be configured to determine which patches are decoded. A third patch culling module may be configured to determine which decoded patches are passed to rendering. Any combination of patch culling modules may be present or active in a volumetric image/video delivery or playback system. Patch culling may utilize the patch visibility information of patches, the current viewing position, the current viewing orientation, the expected future viewing positions, and/or the expected future viewing orientations.

In some cases, each volumetric patch may be projected to a two-dimensional colour (or other form of texture) image and to a corresponding depth image, also known as a depth map. This conversion enables each patch to be converted back to volumetric form at a client rendering module of the headset using both images.

In some cases, a source volume of a volumetric image, such as a point cloud frame, may be projected onto one or more projection surfaces. Patches on the projection surfaces may be determined, and those patches may be arranged onto one or more two-dimensional frames. As above, texture and depth patches may be formed similarly. shows a projection of a source volume to a projection surface, and inpainting of a sparse projection. In other words, a three-dimensional (3D) scene model, comprising geometry primitives such as mesh elements, points, and/or voxel, is projected onto one or more projection surfaces. These projection surface geometries may be "unfolded" onto 2D planes (typically two planes per projected source volume: one for texture, one for depth). The "unfolding" may include determination of patches. 2D planes may then be encoded using standard 2D image or video compression technologies. Relevant projection geometry information may be transmitted alongside the encoded video files to the decoder. The decoder may then decode the coded image/video sequence and perform the inverse projection to regenerate the 3D scene model object in any desired representation format, which may be different from the starting format e.g. reconstructing a point cloud from original mesh model data.

In some cases, multiple points of volumetric video or image (e.g. point cloud) are projected to the same pixel position. Such cases may be handled by creating more than one "layer". It is remarked that the concept of layer in volumetric video, such as point cloud compression, may differ from the concept of layer in scalable video coding. Thus, terms such as PCC layer or volumetric video layer may be used to make a distinction from a layer of scalable video coding. Each volumetric (3D) patch may be projected onto more than one 2D patch, representing different layers of visual data, such as points, projected onto the same 2D positions. The patches may be organized for example based on ascending distance to the projection plane. More precisely the following example process may be used to create two layers but could be generalized to other number of layers too: Let H(u,v) be the set of points of the current patch that get projected to the same pixel (u, v). The first layer, also called the near layer, stores the point of H(u,v) with the lowest depth D0. The second layer, referred to as the far layer, captures the point of H(u,v) with the highest depth within the interval [D0, D0+?], where ? is a user-defined parameter that describes the surface thickness.

It should be understood that volumetric image/video can comprise, additionally or alternatively to texture and depth, other types of patches, such as reflectance, opacity or transparency (e.g. alpha channel patches), surface normal, albedo, and/or other material or surface attribute patches.

Two-dimensional form of patches may be packed into one or more atlases. Texture atlases are known in the art, comprising an image consisting of sub-images, the image being treated as a single unit by graphics hardware and which can be compressed and transmitted as a single image for subsequent identification and decompression. Geometry atlases may be constructed similarly to texture atlases. Texture and geometry atlases may be treated as separate pictures (and as separate picture sequences in case of volumetric video), or texture and geometry atlases may be packed onto the same frame, e.g. similarly to how frame packing is conventionally performed. Atlases may be encoded as frames with an image or video encoder.

The sub-image layout in an atlas may also be organized such that it is possible to encode a patch or a set of patches having similar visibility information into spatiotemporal units that can be decoded independently of other spatiotemporal units. For example, a tile grid, as understood in the context of High Efficiency Video Coding (HEVC), may be selected for encoding and an atlas may be organized in a manner such that a patch or a group of patches having similar visibility information can be encoded as a motion-constrained tile set (MCTS).

In some cases, one or more (but not the entire set of) spatiotemporal units may be provided and stored as a track, as is understood in the context of the ISO base media file format, or as any similar container file format structure. Such a track may be referred to as a patch track. Patch tracks may for example be sub-picture tracks, as understood in the context of OMAF, or tile tracks, as understood in the context of ISO/IEC 14496-15.

In some cases, several versions of the one or more atlases are encoded. Different versions may include, but are not limited to, one or more of the following: different bitrate versions of the one or more atlases at the same resolution; different spatial resolutions of the atlases; and different versions for different random access intervals; these may include one or more intra-coded atlases (where every picture can be randomly accessed).

In some cases, combinations of patches from different versions of the texture atlas may be prescribed and described as metadata, such as extractor tracks, as will be understood in the context of OMAF and/or ISO/IEC 14496-15.

When the total sample count of a texture atlas and, in some cases, of the respective geometry pictures and/or other auxiliary pictures (if any) exceeds a limit, such as a level limit of a video codec, a prescription may be authored in a manner so that the limit is obeyed. For example, patches may be selected from a lower-resolution texture atlas according to subjective importance. The selection may be performed in a manner that is not related to the viewing position. The prescription may be accompanied by metadata characterizing the obeyed limit(s), e.g. the codec Level that is obeyed.

A prescription may be made specific to a visibility cone (or generally to a specific visibility) and hence excludes the patches not visible in the visibility cone. The selection of visibility cones for which the prescriptions are generated may be limited to a reasonable number, such that switching from one prescription to another is not expected to occur frequently. The visibility cones of prescriptions may overlap to avoid switching back and forth between two prescriptions. The prescription may be accompanied by metadata indicative of the visibility cone (or generally visibility information).

A prescription may use a specific grid or pattern of independent spatiotemporal units. For example, a prescription may use a certain tile grid, wherein tile boundaries are also MCTS boundaries. The prescription may be accompanied by metadata indicating potential sources (e.g. track groups, tracks, or representations) that are suitable as spatiotemporal units.

In some cases, a patch track forms a Representation in the context of DASH. Consequently, the Representation element in DASH MPD may provide metadata on the patch, such as patch visibility metadata, related to the patch track. Clients may select patch Representations and request (Sub) segments from the selected Representations on the basis of patch visibility metadata.

A collector track may be defined as a track that extracts implicitly or explicitly coded video data, such as coded video data of MCTSs or sub-pictures, from other tracks. When resolved by a file reader or alike, a collector track may result into a bitstream that conforms to a video coding standard or format. A collector track may for example extract MCTSs or sub-pictures to form a coded picture sequence where MCTSs or sub-pictures are arranged to a grid. For example, when a collector track extracts two MCTSs or sub-pictures, they may be arranged into a 2×1 grid of MCTSs or sub-pictures. As discussed subsequently, an extractor track that extracts MCTSs or sub-pictures from other tracks may be regarded as a collector track. A tile base track as discussed subsequently is another example of a collector track. A collector track may also be called a collection track. A track that is a source for extracting to a collector track may be referred to as a collection item track.

Extractors specified in ISO/IEC 14496-15 for H.264/AVC and HEVC enable compact formation of tracks that extract NAL unit data by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. A sample constructor extracts, by reference, NAL unit data from a sample of another track. An in-line constructor includes NAL unit data. The term in-line may be defined e.g. in relation to a data unit to indicate that a containing syntax structure contains or carries the data unit (as opposed to includes the data unit by reference or through a data pointer). When an extractor is processed by a file reader that requires it, the extractor is logically replaced by the bytes resulting when resolving the contained constructors in their appearance order. Nested extraction may be disallowed, e.g. the bytes referred to by a sample constructor shall not contain extractors; an extractor shall not reference, directly or indirectly, another extractor. An extractor may contain one or more constructors for extracting data from the current track or from another track that is linked to the track in which the extractor resides by means of a track reference of type 'scal'. The bytes of a resolved extractor may represent one or more entire NAL units. A resolved extractor starts with a valid length field and a NAL unit header. The bytes of a sample constructor are copied only from the single identified sample in the track referenced through the indicated 'scal' track reference. The alignment is on decoding time, i.e. using the time-to-sample table only, followed by a counted offset in sample number. Extractors are a media-level concept and hence apply to the destination track before any edit list is considered. (However, one would normally expect that the edit lists in the two tracks would be identical).

In viewport-dependent streaming, which may be also referred to as viewport-adaptive streaming (VAS) or viewport-specific streaming, a subset of 360-degree video content covering the viewport (i.e., the current view orientation) is transmitted at a better quality and/or higher resolution than the quality and/or resolution for the remaining of 360-degree video. There are several alternatives to achieve viewport-dependent omnidirectional video streaming. In tile-based viewport-dependent streaming, projected pictures are partitioned into tiles that are coded as motion-constrained tile sets (MCTSs) or alike. Several versions of the content are encoded at different bitrates or qualities using the same MCTS partitioning. Each MCTS sequence is made available for streaming as a DASH Representation or alike. The player selects on MCTS basis which bitrate or quality is received.

H.264/AVC does not include the concept of tiles, but the operation like MCTSs can be achieved by arranging regions vertically as slices and restricting the encoding similarly to encoding of MCTSs. For simplicity, the terms tile and MCTS are used in this document but should be understood to apply to H.264/AVC too in a limited manner. In general, the terms tile and MCTS should be understood to apply to similar concepts in any coding format or specification.

One possible subdivision of the tile-based viewport-dependent streaming schemes is the following:
  Region-wise mixed quality (RWMQ) 360° video: Several versions of the content are coded with the same resolution, the same tile grid, and different bitrate/picture quality. Players choose high-quality MCTSs for the viewport.
  Viewport+360° video: One or more bitrate and/or resolution versions of a complete low-resolution/low-quality omnidirectional video are encoded and made available for streaming. In addition, MCTS-based encoding is performed and MCTS sequences are made available for streaming. Players receive a complete low-resolution/low-quality omnidirectional video and select and receive the high-resolution MCTSs covering the viewport.
  Region-wise mixed resolution (RWMR) 360° video: MCTSs are encoded at multiple resolutions. Players select a combination of high resolution MCTSs covering the viewport and low-resolution MCTSs for the remaining areas.

It needs to be understood that there may be other ways to subdivide tile-based viewport-dependent streaming methods to categories than the one described above. Moreover, the above-described subdivision may not be exhaustive, i.e. they may be tile-based viewport-dependent streaming methods that do not belong to any of the described categories.

All above-described viewport-dependent streaming approaches, tiles or MCTSs (or guard bands of tiles or MCTSs) may overlap in sphere coverage by an amount selected in the pre-processing or encoding.

All above-described viewport-dependent streaming approaches may be realized with client-driven bitstream rewriting (a.k.a. late binding) or with author-driven MCTS merging (a.k.a. early binding). In late binding, a player selects MCTS sequences to be received, selectively rewrites portions of the received video data as necessary (e.g. parameter sets and slice segment headers may need to be rewritten) for combining the received MCTSs into a single bitstream, and decodes the single bitstream. Early binding refers to the use of author-driven information for rewriting portions of the received video data as necessary, for merging of MCTSs into a single bitstream to be decoded, and in some cases for selection of MCTS sequences to be received. There may be approaches in between early and late binding: for example, it may be possible to let players select MCTS sequences to be received without author guidance, while an author-driven approach is used for MCTS merging and header rewriting. Early binding approaches include an extractor-driven approach and tile track approach, which are described subsequently.

In the tile track approach, one or more motion-constrained tile set sequences are extracted from a bitstream, and each extracted motion-constrained tile set sequence is stored as a tile track (e.g. an HEVC tile track) in a file. A tile base track (e.g. an HEVC tile base track) may be generated and stored in a file. The tile base track represents the bitstream by implicitly collecting motion-constrained tile sets from the tile tracks. At the receiver side the tile tracks to be streamed may be selected based on the viewing orientation. The client may receive tile tracks covering the entire omnidirectional content. Better quality or higher resolution tile tracks may be received for the current viewport compared to the quality or resolution covering the remaining 360-degree video. A tile base track may include track references to the tile tracks, and/or tile tracks may include track references to the tile base track. For example, in HEVC, the 'sabt' track reference is used to refer to tile tracks from a tile base track, and the tile ordering is indicated by the order of the tile tracks contained by a 'sabt' track reference. Furthermore, in HEVC, a tile track has is a 'tbas' track reference to the tile base track.

In the extractor-driven approach, one or more motion-constrained tile set sequences are extracted from a bitstream, and each extracted motion-constrained tile set sequence is modified to become a compliant bitstream of its own (e.g. HEVC bitstream) and stored as a sub-picture track (e.g. with untransformed sample entry type 'hvc1' for HEVC) in a file. One or more extractor tracks (e.g. an HEVC extractor tracks) may be generated and stored in a file. The extractor track represents the bitstream by explicitly extracting (e.g. by HEVC extractors) motion-constrained tile sets from the sub-picture tracks. At the receiver side the sub-picture tracks to be streamed may be selected based on the viewing orientation. The client may receive sub-picture tracks covering the entire omnidirectional content. Better quality or higher resolution sub-picture tracks may be received for the current viewport compared to the quality or resolution covering the remaining 360-degree video.

It needs to be understood that even though the tile track approach and extractor-driven approach are described in details, specifically in the context of HEVC, they apply to other codecs and similar concepts as tile tracks or extractors. Moreover, a combination or a mixture of tile track and extractor-driven approach is possible. For example, such a mixture could be based on the tile track approach, but where a tile base track could contain guidance for rewriting operations for the client, e.g. the tile base track could include rewritten slice or tile group headers.

As an alternative to MCTS-based content encoding, content authoring for tile-based viewport-dependent streaming may be realized with sub-picture-based content authoring, described as follows. The pre-processing (prior to encoding) comprises partitioning uncompressed pictures to sub-pictures. Several sub-picture bitstreams of the same uncompressed sub-picture sequence are encoded, e.g. at the same resolution but different qualities and bitrates. The encoding may be constrained in a manner that merging of coded sub-picture bitstream to a compliant bitstream representing omnidirectional video is enabled. For example, dependencies on samples outside the decoded picture boundaries may be avoided in the encoding by selecting motion vectors in a manner that sample locations outside the picture would not be referred in the inter prediction process. Each sub-picture bitstream may be encapsulated as a sub-picture track, and one or more extractor tracks merging the sub-picture tracks of different sub-picture locations may be additionally formed. If a tile track based approach is targeted, each sub-picture bitstream is modified to become an MCTS sequence and stored as a tile track in a file, and one or more tile base tracks are created for the tile tracks.

Tile-based viewport-dependent streaming approaches may be realized by executing a single decoder instance or one decoder instance per MCTS sequence (or in some cases, something in between, e.g. one decoder instance per MCTSs of the same resolution), e.g. depending on the capability of the device and operating system where the player runs. The use of single decoder instance may be enabled by late binding or early binding. To facilitate multiple decoder instances, the extractor-driven approach may use sub-picture tracks that are compliant with the coding format or standard without modifications. Other approaches may need either to rewrite image segment headers, parameter sets, and/or alike information in the client side to construct a conforming bitstream or to have a decoder implementation capable of decoding an MCTS sequence without the presence of other coded video data.

There may be at least two approaches for encapsulating and referencing tile tracks or sub-picture tracks in the tile track approach and the extractor-driven approach, respectively:
  Referencing track identifiers from a tile base track or an extractor track.
  Referencing tile group identifiers from a tile base track or an extractor track, wherein the tile group identified by a tile group identifier contains the collocated tile tracks or the sub-picture tracks that are alternatives for extraction.

In the RWMQ method, one extractor track per each picture size and each tile grid is sufficient. In 3600 viewport video and RWMR video, one extractor track may be needed for each distinct viewing orientation.

An approach similar to above-described tile-based viewport-dependent streaming approaches, which may be referred to as tile rectangle based encoding and streaming, is described next. This approach may be used with any video codec, even if tiles similar to HEVC were not available in the codec or even if motion-constrained tile sets or alike were not implemented in an encoder. In tile rectangle based encoding, the source content is split into tile rectangle sequences before encoding. Each tile rectangle sequence covers a subset of the spatial area of the source content, such as full panorama content, which may e.g. be of equirectangular projection format. Each tile rectangle sequence is then encoded independently from each other as a single-layer bitstream. Several bitstreams may be encoded from the same tile rectangle sequence, e.g. for different bitrates. Each tile rectangle bitstream may be encapsulated in a file as its own track (or alike) and made available for streaming. At the receiver side the tracks to be streamed may be selected based on the viewing orientation. The client may receive tracks covering the entire omnidirectional content. Better quality or higher resolution tracks may be received for the current viewport compared to the quality or resolution covering the remaining, currently non-visible viewports. In an example, each track may be decoded with a separate decoder instance.

In viewport-adaptive streaming, the primary viewport (i.e., the current viewing orientation) is transmitted at a good quality/resolution, while the remaining of 360-degree video is transmitted at a lower quality/resolution. When the viewing orientation changes, e.g. when the user turns his/her head when viewing the content with a head-mounted display, another version of the content needs to be streamed, matching the new viewing orientation. In general, the new version can be requested starting from a stream access point (SAP), which are typically aligned with (Sub)segments. In single-layer video bitstreams, SAPs correspond to random-access pictures, are intra-coded, and are hence costly in terms of rate-distortion performance. Conventionally, relatively long SAP intervals and consequently relatively long (Sub)segment durations in the order of seconds are hence typically used. Thus, the delay (here referred to as the viewport quality update delay) in upgrading the quality after a viewing orientation change (e.g. a head turn) is conventionally in the order of seconds and is therefore clearly noticeable and annoying.

As explained above, viewport switching in viewport-dependent streaming, which may be compliant with MPEG OMAF, is enabled at stream access points, which involve intra coding and hence a greater bitrate compared to respective inter coded pictures at the same quality. A compromise between the stream access point interval and the rate-distortion performance is hence chosen in an encoding configuration.

Viewport-adaptive streaming of equal-resolution HEVC bitstreams with MCTSs is described in the following as an example. Several HEVC bitstreams of the same omnidirectional source content may be encoded at the same resolution but different qualities and bitrates using motion-constrained tile sets. The MCTS grid in all bitstreams is identical. In order to enable the client the use of the same tile base track for reconstructing a bitstream from MCTSs received from different original bitstreams, each bitstream is encapsulated in its own file, and the same track identifier is used for each tile track of the same tile grid position in all these files. HEVC tile tracks are formed from each motion-constrained tile set sequence, and a tile base track is additionally formed. The client may parse tile base track to implicitly reconstruct a bitstream from the tile tracks. The reconstructed bitstream can be decoded with a conforming HEVC decoder.

Clients can choose which version of each MCTS is received. The same tile base track suffices for combining MCTSs from different bitstreams, since the same track identifiers are used in the respective tile tracks.

Figure 5:
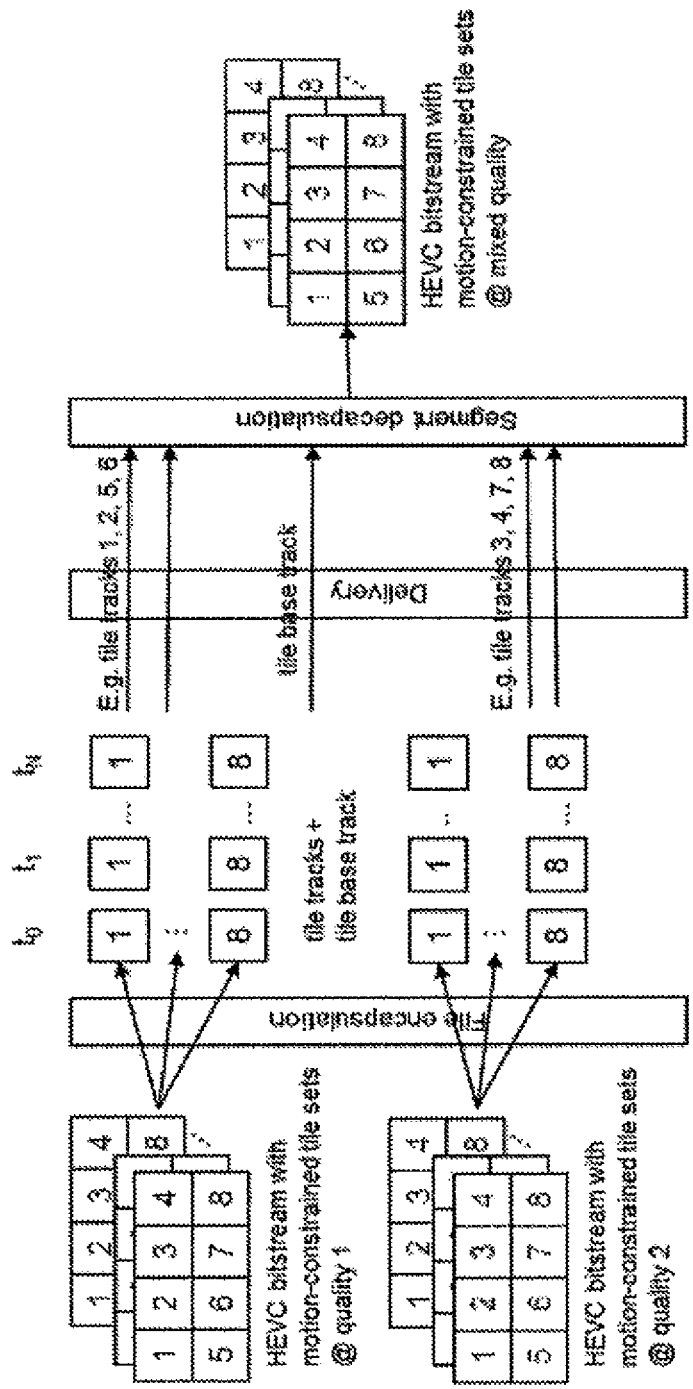
FIG. 5 shows an example of tile-based omnidirectional video streaming.

FIG. 5 illustrates an example how tile tracks of the same resolution can be used for tile-based omnidirectional video streaming. A 4×2 tile grid has been used in forming of the motion-constrained tile sets. Two HEVC bitstreams originating from the same source content are encoded at different picture qualities and bitrates. Each bitstream may be encapsulated in its own file wherein each motion-constrained tile set sequence may be included in one tile track and a tile base track is also included. The client may choose the quality at which each tile track is received based on the viewing orientation. In this example the client receives tile tracks 1, 2, 5, and 6 at a particular quality and tile tracks 3, 4, 7, and 8 at another quality. The tile base track is used to order the received tile track data into a bitstream that can be decoded with an HEVC decoder.

In current video codecs, different parts of the original content needs to be packed into 2D frame to be coded by a conventional 2D video codec. Video coding formats have constraints on spatial partitioning of pictures. For example, HEVC uses a tile grid of picture-wide tile rows and picture-high tile columns specified in units of CTUs with certain minimum with and height constraints for tile columns and tile rows. Different parts may have different sizes, so their optimal packing along spatial partitioning units of 2D video codecs might not be possible. There may also be empty spaces (areas that are not allocated by any parts of the original content but are anyhow coded and decoded) in the packed picture. These empty spaces, however not needed by the receiver, are counted as effective pixels for the codec, and should anyway be encoded and decoded. This leads to inefficient packing. Known solutions for overcoming this drawback, have concentrated on the possibility of more flexible and/or finer granularity tiling, e.g. tile granularity of CUs or tile partitioning that needs not use a tile grid of picture-wide tile rows and picture-high tile columns.

As another drawback, in viewport dependent 360-streaming, corresponding tiles need to be selected and arranged in a coded 2D picture. This also needs some changes to the coded data, since the tile positions in the encoder output differ from those of the merged bitstream that is input to the decoder. Thus, parameter sets and slice headers need to be rewritten for the merged bitstream. Known solutions for overcoming this drawback of extraction for viewport-dependent 360-degree streaming have been related to e.g. a client-side slice header rewriting, which, however, is not part of a standardized decoding operation, and may not be supported by decoder APIs and decoder implementations; or an extractor track with rewritten slice header, which relates to ISO/IEC 14496-15 including the design for extractors, which can be used for rewriting parameter sets and slice headers in the extractor track, while the tile data is included by reference. Such an approach may require one extractor track per each possible extracted combination, such as one extractor track per each range of 360-degree video viewing orientations that results in a different set of picked tiles.

Yet, as another drawback, there is a rate-distortion penalty in the case that different parts of a content (e.g. different tiles) are needed to be coded independently (e.g. using motion constrained tile set technique in viewport-adaptive streaming application or ROI enhancement layer). For example a 12×8 MCTS grid has been found to have an average Bjontegaard delta bitrate increase of more than 10% over 14 ERP test sequences, peaking at 22.5% when compared to coding without tiles. Known solutions for overcoming this drawback relate to modification of motion compensation filter near the motion constrained tile border to reduce the RD (Rate Distortion) penalty of MCTS tool; or to modification of the predicted block and removal of its dependency to other tiles which are coded in MCTS mode, which reduce the RD penalty of MCTS tool.

The present embodiments are related to sub-picture-based video codec operation. Visual content at specific time instances is divided into several parts, were each part is represented using a sub-picture. Respective sub-pictures at different time instances form a sub-picture sequence, wherein the definition of "respective" may depend on the context, but can be for example the same spatial portion of a picture area in a sequence of pictures or the content acquired with the same settings, such as the same acquisition position, orientation, and projection surface. A picture at specific time instance may be defined as a collection of all the sub-pictures at the specific time instance. Each sub-picture is coded using a conventional video encoder, and reconstructed sub-picture is stored in a reconstructed sub-picture memory corresponding to the sub-picture sequence. For predicting a sub-picture at a particular sub-picture sequence, the encoder can use reconstructed sub-pictures of the same sub-picture sequence as reference for prediction. Coded sub-pictures are included as separate units (e.g. VCL NAL units) in the same bitstream.

A decoder receives coded video data (e.g. a bitstream). A sub-picture is decoded as a separate unit from other sub-pictures using a conventional video decoder. The decoded sub-picture may be buffered using a decoded picture buffering process. The decoded picture buffering process may provide the decoded sub-picture of a particular sub-picture sequence to the decoder, and the decoder may use the decoded sub-picture as reference for prediction for predicting a sub-picture at the same sub-picture sequence.

Figure 6:
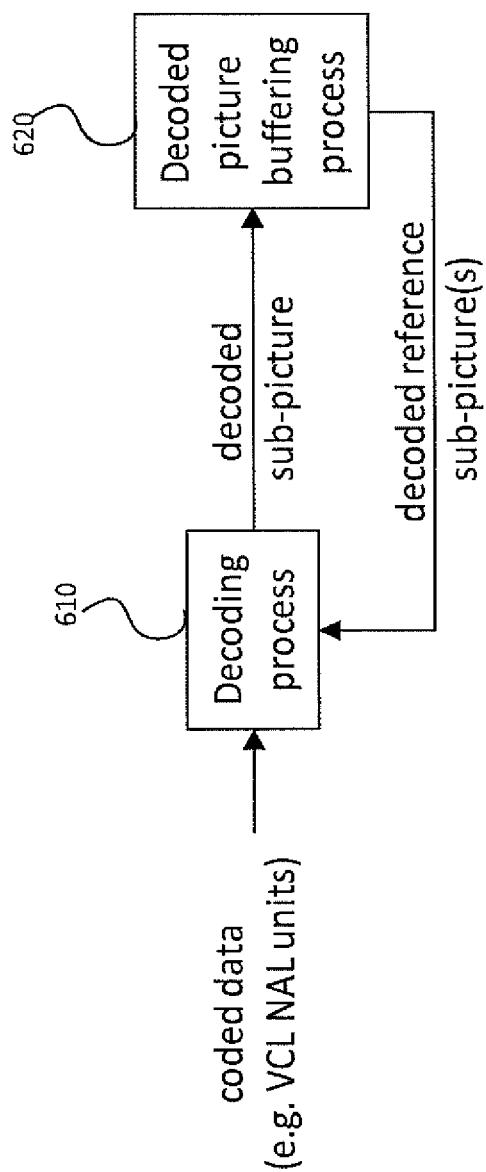
FIG. 6 shows an example of a decoding process.

FIG. 6 illustrates an example of a decoder. The decoder receives coded video data (e.g. a bitstream). A sub-picture is decoded in a decoding process 610 as a separate unit from other sub-pictures using a conventional video decoder. The decoded sub-picture may be buffered using a decoded picture buffering process 620. The decoded picture buffering process may provide the decoded sub-picture of a particular sub-picture sequence to the decoding process 610, and the decoder may use the decoded sub-picture as a reference for prediction for predicting a sub-picture at the same sub-picture sequence.

The decoded picture buffering process 620 may comprise a sub-picture-sequence-wise buffering, which may comprise marking of reconstructed sub-pictures as "used for reference" and "unused for reference" as well as keeping track of whether reconstructed sub-pictures have been output from the decoder. The buffering of sub-picture sequences may be independent form each other, or may be synchronized in one or both of the following ways:

the output of all reconstructed sub-pictures of the same time instance may be performed synchronously.
  the reference picture marking of reconstructed sub-pictures of the same time instance may be performed synchronously.

Figure 7:
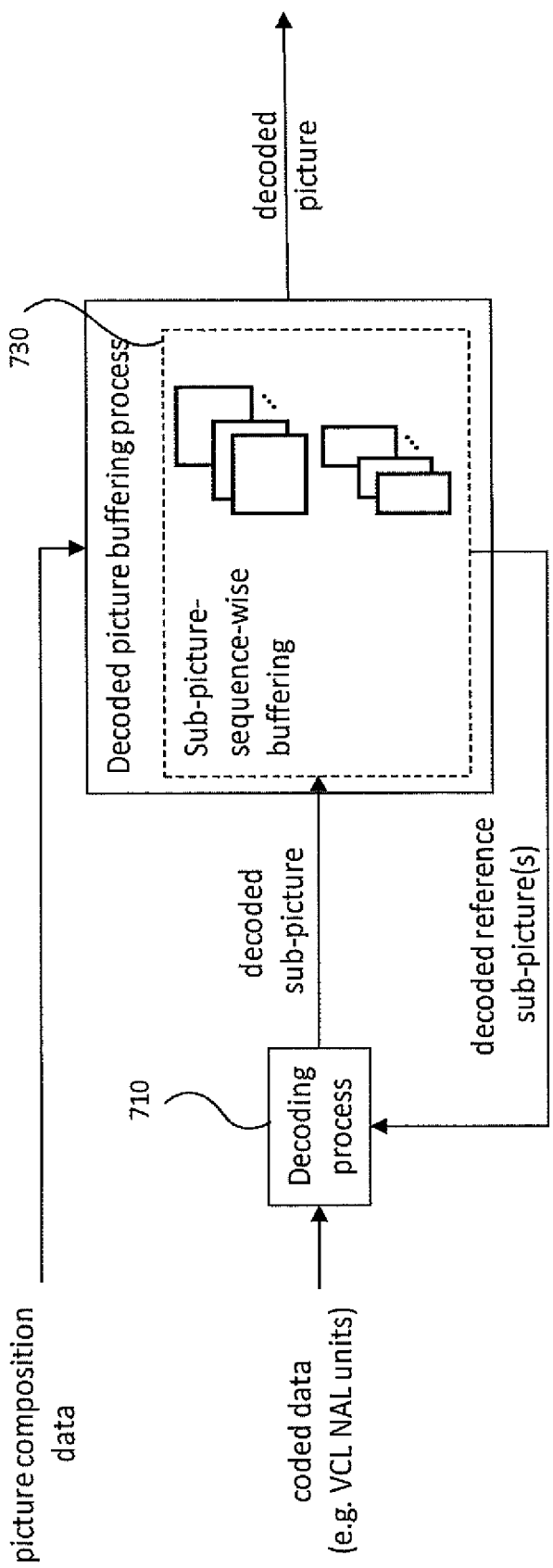
FIG. 7 shows a sub-picture-sequence-wise buffering according to an embodiment.

The sub-picture-sequence-wise buffering 730 may be illustrated with FIG. 7. The example illustrates decoding of two sub-picture sequences, which have the same height but different width. It needs to be understood that the number of sub-picture sequences and/or the sub-picture dimensions could have been chosen differently and these choices are only meant as possible examples.

According to an embodiment, output from a decoder comprises a collection of the different and separate decoded sub-pictures.

According to another example an output picture, which may also or alternatively be referred to as a decoded picture, from a decoding process is a collection of the different and separate sub-pictures. According to another embodiment, the output picture is composed by arranging reconstructed sub-pictures into a two-dimensional (2D) picture. This embodiment keeps a conventional design of a single output picture (per time instance) as the output of a video decoder and hence can be straightforward for integrating to systems. The decoded sub-pictures are provided to a decoded sub-picture buffering. The decoding process may then use buffered sub-picture(s) as a reference for decoding succeeding pictures. The decoding process may obtain an indication or infer which of the decoded sub-picture(s) are to be used as a source for generating manipulated sub-picture(s). Those sub-pictures are provided to a reference sub-picture manipulation process. Manipulated reference sub-pictures are then provided to the decoded sub-picture buffering, where the manipulated reference sub-pictures are buffered. The sub-pictures and the manipulated reference sub-pictures may then be used by the output picture compositing process that takes the picture composition data as input and arranges reconstructed sub-pictures into output pictures. An encoder encodes picture composition data into or along the bitstream, wherein the picture composition data is indicative of how reconstructed sub-pictures are to be arranged into 2D picture(s) forming output picture(s). A decoder decodes picture composition data from or along the bitstream and forms an output picture from reconstructed sub-pictures and/or manipulated reference sub-pictures according to the decoded picture composition data. The decoding or picture composition data may happen as a part of or operationally connected with the output picture compositing process. Thus, a conventional video decoding process decodes the picture composition data.

Figure 8:
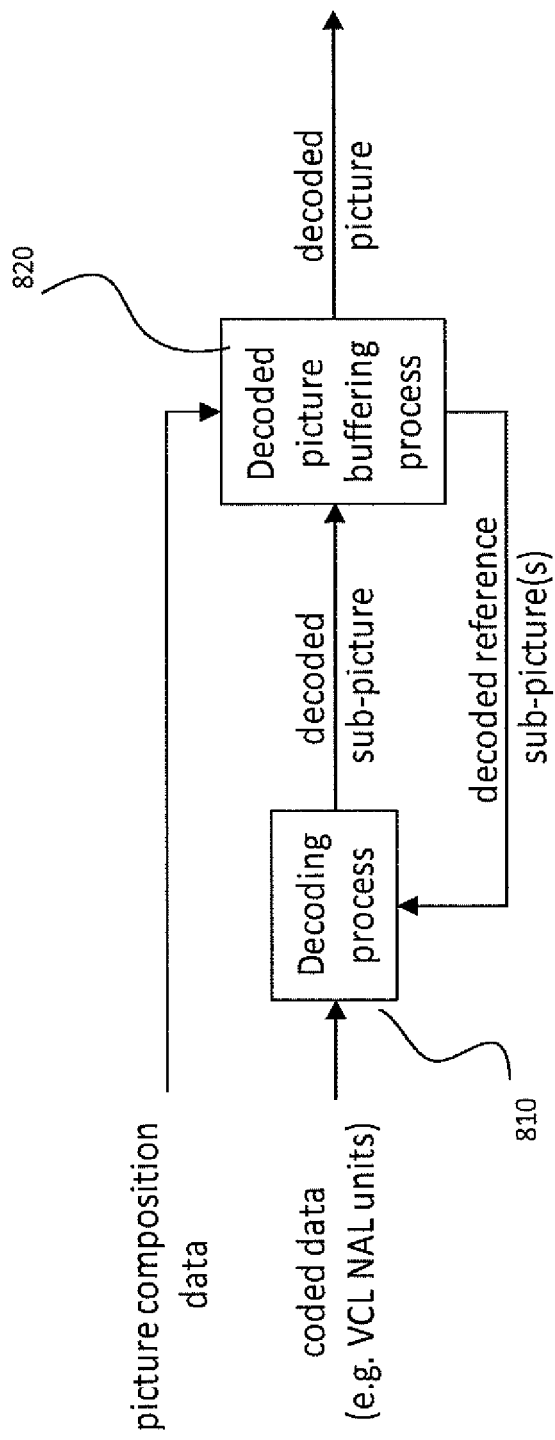
FIG. 8 shows a decoding process in accordance with an embodiment.

According to another embodiment, an example of which is shown in FIG. 8, an output picture, which may also or alternatively be referred to as a decoded picture, is composed by arranging reconstructed sub-pictures into a two-dimensional (2D) picture. This embodiment keeps a conventional design of a single output picture (per time instance) as the output of a video decoder and hence can be straightforward for integrating to systems. An encoder encodes picture composition data into or along the bitstream, wherein the picture composition data is indicative of how reconstructed sub-pictures are to be arranged into 2D picture(s) forming output picture(s). A decoder decodes picture composition data from or along the bitstream and forms an output picture from reconstructed sub-pictures according to the decoded picture composition data. The decoding or picture composition data may happen as a part of or operationally connected with the decoded picture buffering process 820. Thus, a conventional video decoding process needs to decode the picture composition data.

According to an embodiment, the picture composition data is encoded in or along the bitstream and/or decoded from or along the bitstream using the bitstream or decoding order of sub-pictures and the dimensions of sub-pictures. An algorithm for positioning sub-pictures within a picture area is followed in an encoder and/or in a decoder, wherein sub-pictures are input to the algorithm in their bitstream or decoding order. In an embodiment, the algorithm for positioning sub-pictures within a picture area is the following: When a picture comprises multiple sub-pictures and when encoding of a picture and/or decoding of a coded picture is started, each CTU location in the reconstructed or decoded picture is marked as unoccupied. For each sub-picture in bitstream or decoding order, the sub-picture takes the next such unoccupied location in CTU raster scan order within a picture that is large enough to fit the sub-picture within the picture boundaries.

Figure 9:
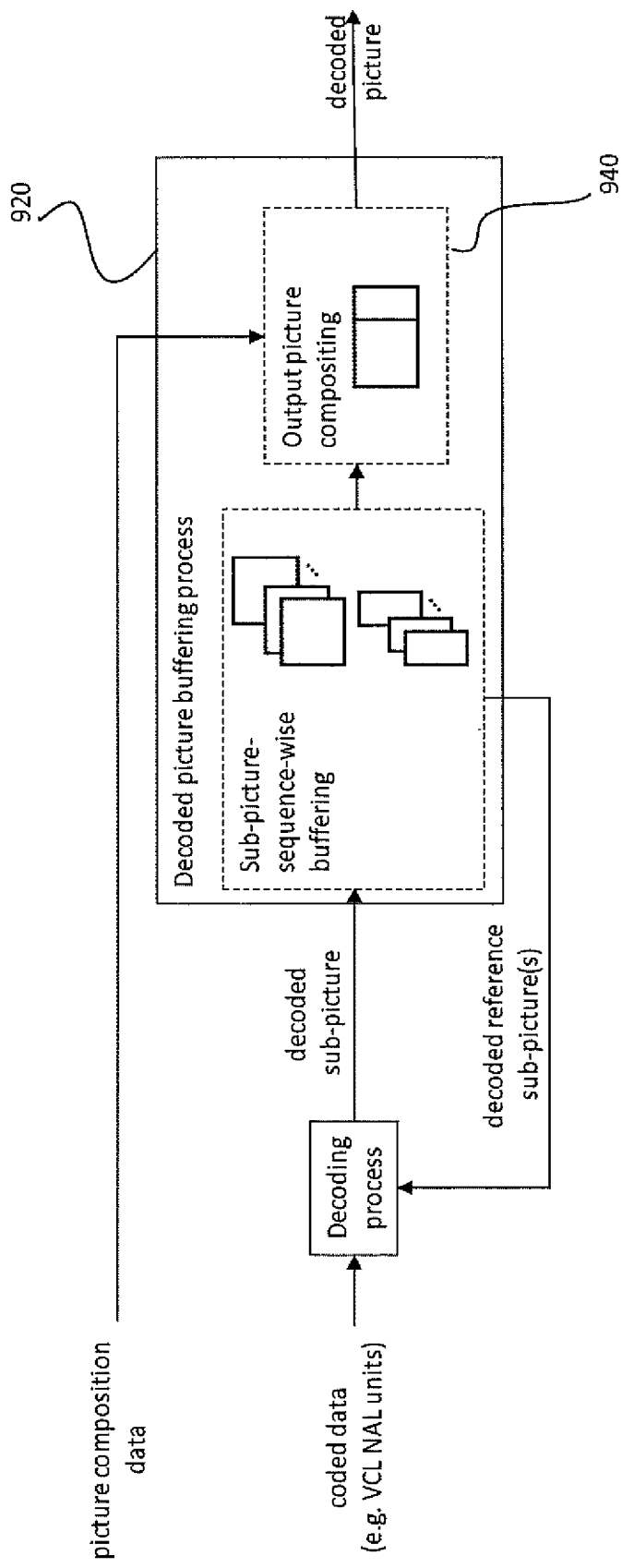
FIG. 9 illustrates a decoding process according to another embodiment.

FIG. 9 illustrates a further example of the embodiment shown in FIG. 8, for arranging time-aligned reconstructed sub-pictures side-by-side into an output picture. The decoded picture buffering process 920 may comprise an output picture compositing process 940 that takes the picture composition data as input and arranges reconstructed sub-pictures into output pictures. The example illustrates decoding of two sub-picture sequences, which have the same height but different width. In this example the output picture compositing process 940 arranges time-aligned reconstructed sub-pictures side-by-side onto output pictures. It needs to be understood that the number of sub-picture sequences and/or the sub-picture dimensions could have been chosen differently and these choices are only meant as possible examples.

According to an embodiment, an encoder indicates in or along the bitstream if the decoder is intended to output a collection of the different and separate decoded sub-pictures; or
  the decoder is intended to generate output pictures according to the picture composition data; or
  the decoder is allowed to perform either of the options above.

According to an embodiment, a decoder decodes from or along the bitstream if the decoder is intended to output a collection of the different and separate decoded sub-pictures; or
  the decoder is intended to generate output pictures according to the picture composition data; or
  the decoder is allowed to perform either of the options above.

The decoder adapts its operation to conform to the decoded intent or allowance.

According to an embodiment, a decoder includes an interface for selecting at least among outputting a collection of the different and separate decoded sub-pictures or generating output pictures according to the picture composition data. The decoder adapts its operation to conform to what has been indicated through the interface.

According to an embodiment, pictures are divided into sub-pictures, tile groups and tiles. A tile may be defined similarly to an HEVC tile, thus a tile may be defined as a sequence of CTUs that cover a rectangular region of a picture. A tile group may be defined as a sequence of tiles in tile raster scan within a sub-picture. It may be specified that A VCL NAL unit contains exactly one tile group, i.e. a tile group is contained in exactly one VCL NAL unit. A sub-picture may be defined as a rectangular set of one or more entire tile groups. In an embodiment, a picture is partitioned to sub-pictures, i.e. the entire picture is occupied by sub-pictures and there are no unoccupied areas within a picture. In another embodiment, a picture comprises sub-pictures and one or more unoccupied areas.

Figure 10:
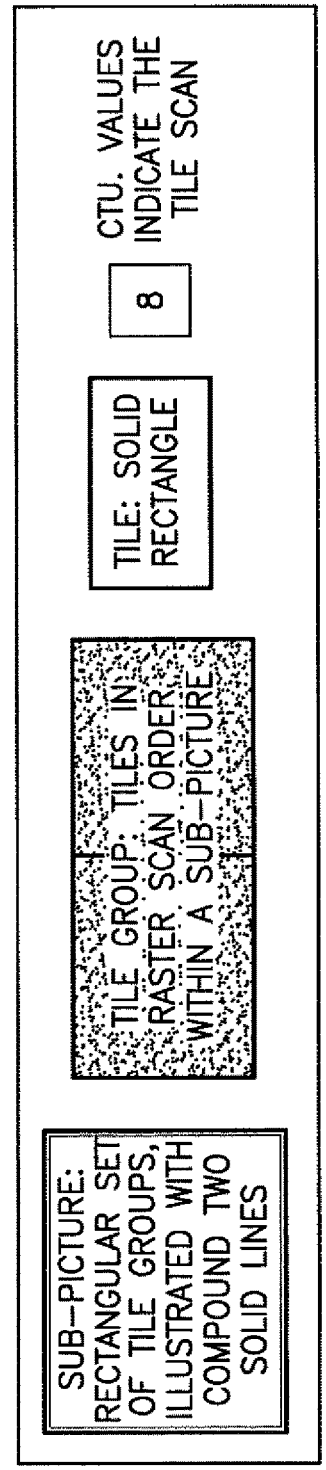
FIG. 10 shows an example of a picture that has been divided into four sub-pictures.

According to an embodiment, an encoder encodes in or along the bitstream and/or a decoder decodes from or along the bitstream information indicative of one or more tile partitionings for sub-pictures. A tile partitioning may for example be a tile grid specified as widths and heights of tile columns and tile rows, respectively. An encoder encodes in or along a bitstream and/or a decoder decodes from or along the bitstream which tile partitioning applies for a particular sub-picture or sub-picture sequence. In an embodiment, syntax elements describing a tile partitioning are encoded in and/or decoded from a picture parameter set, and a PPS is activated for a sub-picture e.g. through a PPS identifier in a tile group header. Each sub-picture may refer to its own PPS and may hence have its own tile partitioning. For example, FIG. 10 illustrates a picture that is divided into 4 sub-pictures. Each sub-picture may have its own tile grid. In this example sub-picture 1 is divided into a grid of 3×2 tiles of equal width and equal height, sub-picture 2 is divided into 2×1 tiles of 3 and 5 CTUs high. Each of sub-pictures 3 and 4 has only one tile. Sub-picture 1 has 3 tile groups containing 1, 3, and 2 tiles, respectively. Each of sub-pictures 2, 3, and 4 has one tile group.

FIG. 10 also illustrates the above-discussed algorithm for positioning sub-pictures within a picture area. Sub-picture 1 is the first in decoding order and thus placed in the top-left corner of the picture area. Sub-picture 2 is the second in decoding order and thus placed to the next unoccupied location in raster scan order. The algorithm also operates the same way for the third and fourth sub-pictures in decoding order, i.e. sub-pictures 3 and 4, respectively. The sub-picture decoding order is indicated with the number (1, 2, 3, 4) outside the picture boundaries.

According to an embodiment, an encoder encodes in the bitstream and/or a decoder decodes from the bitstream, e.g. in an image segment header such as a tile group header, information indicative of one or more tile positions within a sub-picture. For example, a tile position of the first tile, in decoding order, of the image segment or tile group may be encoded and/or decoded. In an embodiment, a decoder concludes that the current image segment or tile group is the first image segment or tile group of a sub-picture, when the first tile of an image segment or tile group is the top-left tile of a sub-picture (e.g. having a tile address or tile index equal to 0 in raster scan order of tiles). In an embodiment, in relation to concluding a first image segment or tile group, a decoder concludes if a new access unit is started. In an embodiment, it is concluded that a new access is started when the picture order count value or syntax element value(s) related to picture order count (such as least significant bits of picture order count) differ from that of the previous sub-picture.

According to an embodiment, decoded picture buffering is performed on picture-basis rather than on sub-picture basis. An encoder and/or a decoder generates a reference picture from decoded sub-pictures of the same access unit or time instance using the picture composition data. The generation of a reference picture is performed identically or similarly to what is described in other embodiments for generating output pictures. When a reference picture is referenced in encoding and/or decoding of a sub-picture, reference sub-pictures for encoding and/or decoding the sub-picture are generated by extracting the area collocating with the current sub-picture from the reference pictures in the decoded picture buffer. Thus, the decoding process gets reference sub-picture(s) from the decoded picture buffering process similarly to other embodiments, and the decoding process may operate similarly to other embodiments.

In an embodiment, an encoder selects reference pictures for predicting a current sub-picture in a manner that the reference pictures contain a sub-picture that has the same location as the current sub-picture (within the picture) and the same dimensions (width and height) as the current sub-picture. An encoder avoids selecting reference pictures for predicting a current sub-picture if the reference pictures do not contain a sub-picture that has the same location as the current sub-picture (within the picture) or the same dimensions as the current sub-picture. In an embodiment, sub-pictures of the same access unit or time instance are allowed to have different types, such as random-access sub-picture and non-random-access sub-picture, defined similarly to what has been described earlier in relation to NAL unit types and/or picture types. An encoder encodes a first access unit with both a random-access sub-picture in a first location and size and a non-random-access sub-picture in a second location and size, and a subsequent access unit in decoding order including a sub-picture in the first location and size constrained in a manner that reference pictures preceding the first access unit in decoding order are avoided, and including another sub-picture in the second location and size using a reference picture preceding the first access unit decoding order as a reference for prediction.

In an embodiment, for encoding and/or decoding a current sub-picture, an encoder and/or a decoder includes only such reference pictures into the initial reference picture list that contain a sub-picture that has the same location as the current sub-picture (within the picture) and the same dimensions (width and height) as the current sub-picture. Reference pictures into that do not contain a sub-picture that has the same location as the current sub-picture (within the picture) or the same dimensions (width and height) as the current sub-picture are skipped or excluded for generating an initial reference picture list for encoding and/or decoding the current sub-picture. In an embodiment, sub-pictures of the same access unit or time instance are allowed to have different types, such as random-access sub-picture and non-random-access sub-picture, defined similarly to what has been described earlier in relation to NAL unit types and/or picture types. Reference picture list initialization process or algorithm in an encoder and/or a decoder only includes the previous random-access sub-picture and subsequent sub-pictures, in decoding order, in an initial reference picture list and skips or excludes sub-pictures preceding, in decoding order, the previous random-access sub-picture.

According to an embodiment, a sub-picture at a second sub-picture sequence is predicted from one or more sub-pictures of a first sub-picture sequence. Spatial relationship of the sub-picture in relation to the one or more sub-pictures of the first sub-picture sequence is either inferred or indicated by an encoder in or along the bitstream and/or decoded by a decoder from or along the bitstream. In the absence of such spatial relationship information in or along the bitstream, an encoder and/or a decoder may infer that the sub-pictures are collocated, i.e. exactly overlapping for spatial correspondence in prediction. The spatial relationship information is independent of the picture composition data. For example, sub-pictures may be composed to be above each other in an output picture (in a top-bottom packing arrangement) while they are considered to be collocated for prediction.

Figure 11:
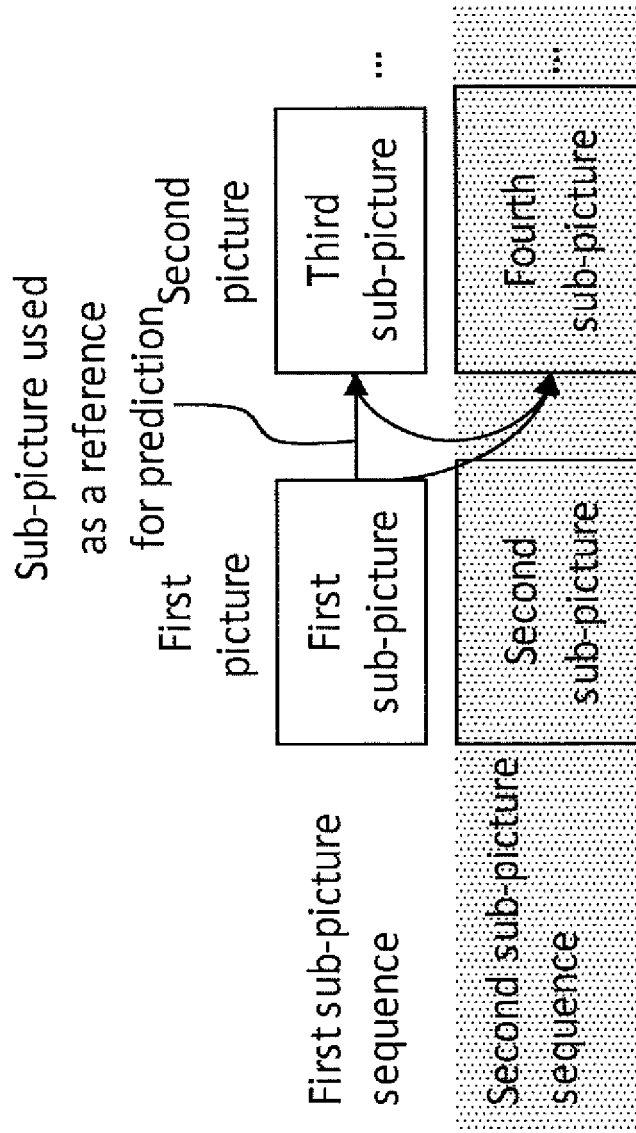
FIG. 11 shows predictions applicable in an encoding process and/or in a decoding process according to an embodiment.

An embodiment of an encoding process or a decoding process is illustrated in FIG. 11, where the arrows from the first sub-picture to the second sub-picture sequence indicate prediction. In the example of FIG. 11, the sub-pictures may be inferred to be collocated for prediction.

According to an embodiment, an encoder indicates a sub-picture sequence identifier or alike in or along the bitstream in a manner that the sub-picture sequence identifier is associated with coded video data units, such as VCL NAL units. According to an embodiment, a decoder decodes a sub-picture sequence identifier or alike from or along the bitstream in a manner that the sub-picture sequence identifier is associated with coded video data units and/or the respective reconstructed sub-pictures. The syntax structure containing the sub-picture sequence identifier and the association mechanism may include but are not limited to one or more of the following:

A sub-picture sequence identifier included in a NAL unit header and associated with the NAL unit.

A sub-picture sequence identifier included in a header included in a VCL NAL unit, such as a tile group header or a slice header and associated with the respective image segment (e.g. tile group or slice).

A sub-picture sequence identifier included in a sub-picture delimiter, a picture header, or alike syntax structure, which is implicitly referenced by coded video data. A sub-picture delimiter may for example be a specific NAL unit that starts a new sub-picture. Implicit referencing may for example mean that the previous syntax structure (e.g. sub-picture delimiter or picture header) in decoding or bitstream order may be referenced.

A sub-picture sequence identifier included in a header parameter set, a picture parameter set or alike syntax structure, which is explicitly referenced by coded video data. Explicit referencing may for example mean that the identifier of the reference parameter set is included in the coded video data, such as in a tile group header or in a slice header.

In an embodiment, sub-picture sequence identifier values are valid within a pre-defined subset of a bitstream (which may be called "validity period" or "validity subset"), which may be but is not limited to one of the following:

A single access unit, i.e. coded video data for a single time instance.

A coded video sequence.

From a closed random-access access unit (inclusive) until the next closed random-access access unit (exclusive) or the end of the bitstream. A closed random-access access unit may be defined as an access unit within and after which all present sub-picture sequences start with a closed random-access sub-picture. A closed random-access sub-picture may be defined as an intra-coded sub-picture, which is followed, in decoding order, by no such sub-pictures in the same sub-picture sequence that reference any sub-picture preceding the intra-coded sub-picture, in decoding order, in the same sub-picture sequence. In an embodiment, a closed random-access sub-picture may either be an intra-coded sub-picture or a sub-picture associated with and predicted only from external reference sub-picture(s) (see an embodiment described further below) and is otherwise constrained as described above.

The entire bitstream.

In an embodiment, sub-picture sequence identifier values are valid within an indicated subset of a bitstream. An encoder may for example include a specific NAL unit in the bitstream, where the NAL unit indicates a new period for sub-picture sequence identifiers that is unrelated to earlier period(s) of sub-picture sequence identifiers.

In an embodiment, a sub-picture with a particular sub-picture sequence identifier value is concluded to be within the same sub-picture sequence as a preceding sub-picture in decoding order that has the same sub-picture sequence identifier value, when both sub-pictures are within the same validity period of sub-picture sequence identifiers. When two pictures are on different validity periods of sub-picture sequence identifiers or have different sub-picture sequence identifiers, they are concluded to be in different sub-picture sequences.

In an embodiment, a sub-picture sequence identifier is a fixed-length codeword. The number of bits in the fixed-length codeword may be encoded into or along the bitstream, e.g. in a video parameter set or a sequence parameter set, and/or may be decoded from or along the bitstream, e.g. from a video parameter set or a sequence parameter set.

In an embodiment, a sub-picture sequence identifier is a variable-length codeword, such as an exponential-Golomb code or alike.

According to an embodiment, an encoder indicates a mapping of VCL NAL units or image segments, in decoding order, to sub-pictures or sub-picture sequences in or along the bitstream, e.g. in a video parameter set, a sequence parameter set, or a picture parameter set. Likewise, according to an embodiment, a decoder decodes a mapping of VCL NAL units or image segments, in decoding order, to sub-pictures or sub-picture sequence from or along the bitstream. The mapping may concern a single time instance or access unit at a time.

In an embodiment, several mappings are provided e.g. in a single container syntax structure and each mapping is indexed or explicitly identified e.g. with an identifier value.

In an embodiment, an encoder indicates in the bitstream, e.g. in an access unit header or delimiter, a picture parameter set, a header parameter set, a picture header, a header of an image segment (e.g. tile group or slice), which mapping applies to a particular access unit or time instance. Likewise, in an embodiment, a decoder decodes form the bitstream which mapping applies to a particular access unit or time instance. In an embodiment, the indication which mapping applies is an index to a list of several mappings (specified e.g. in a sequence parameter set) or an identifier to a set of several mappings (specified e.g. in a sequence parameter set). In another embodiment, the indication which mapping applies comprises the mapping itself e.g. as a list of sub-picture sequence identifiers for VCL NAL units in decoding order included in the access unit associated with the mapping.

According to an embodiment, the decoder concludes the sub-picture or sub-picture sequence for a VCL NAL unit or image segment as follows:

The start of an access unit is concluded e.g. as specified in a coding specification, or the start of a new time instance is concluded as specified in a packetization or container file specification.

The mapping applied to the access unit or time instance is concluded according to any earlier embodiment.

For each VCL NAL unit or image segment in decoding order, the respective sub-picture sequence or sub-picture is concluded from the mapping.

An example embodiment is provided below with the following design decisions:

The mappings are specified in a sequence parameter set.
The mappings are specified to map VCL NAL units to sub-picture sequences.
Indicating which mapping applies for a particular access unit or time instance takes place in a tile group header.

It should be understood that other embodiments could be similarly realized with other design decisions, e.g. container syntax structures, mapping for image segments rather than VCL NAL units, and mapping for sub-pictures rather than sub-picture sequences.

|  | Descriptor |
|---|---|
| seq_parameter_set_rbsp( ) { | |
| ... | |
|   num_subpic_patterns | ue(v) |
|   if( num_subpic_patterns > 0 ) { | |
|     subpic_seq_id_len_minus1 | ue(v) |
|     for( i = 0; i < num_subpic_patterns; i++ ) { | |
|       num_vcl_nal_units_minus1[ i ] | ue(v) |
|       for( j =0; j <= num_vcl_nal_units_minus1[ i ]; j++ ) | |
|         subpic_seq_id[ i ][ j ] | u(v) |
|     } | |
|   } | |
| ... | |

The semantics of syntax elements may be specified as follows: num_subpic_patterns equal to 0 specifies that sub-picture-based decoding is not in use. num_subpic_patterns greater than 0 specifies the number of mappings from VCL NAL units to sub-picture sequence identifiers. subpic_seq_id_len_minus1 plus 1 specifies the length of the subpic_seq_id[i][j] syntax element in bits. num_vd_nal_units_minus1[i] plus 1 specifies the number of VCL NAL units that are mapped in the i-th mapping. subpic_seq_id[i][j] specifies the sub-picture sequence identifier of the j-th VCL NAL unit in decoding order in an access unit associated with the i-th mapping.

|  | Descriptor |
|---|---|
| tile_group_header( ) { | |
| ... | |
|   if( num_subpic_patterns > 0 ) | |
|     subpic_pattern_idx | u(v) |
| ... | |

The semantics of subpic_pattern_idx may be specified as follows. subpic_pattern_idx specifies the index of the mapping from VCL NAL units to sub-picture sequence identifiers that applies for this access unit. It may be required that subpic_pattern_idx has the same value in all tile_group_header( ) syntax structures of the same access unit.

According to an embodiment, a random-access sub-picture of a particular sub-picture sequence may be predicted from one or more reference sub-pictures of other sub-picture sequences (excluding the particular sub-picture sequence).

One of the following may be required and may be indicated for a random-access sub-picture:

It may be required that the random-access sub-picture is constrained so that prediction of any sub-picture at or after the random-access sub-picture in output order does not depend on any reference sub-picture (of the same sub-picture sequence) preceding the random-access sub-picture in decoding order; this case corresponds to an open GOP random-access point.

It may be required that the random-access sub-picture is constrained so that prediction of any sub-picture at or after the random-access sub-picture in decoding order does not depend on any reference sub-picture (of the same sub-picture sequence) preceding the random-access sub-picture in decoding order; this case corresponds to a closed GOP random-access point.

Since random-access sub-picture may be predicted from other sub-picture sequence(s), random-access sub-pictures are more compact than similar random-access sub-pictures realized with intra-coded pictures.

Stream access points (which may also or alternatively be referred to as sub-picture sequence access point) for sub-picture sequences may be defined as a position in a sub-picture sequence (or alike) that enables playback of the sub-picture sequence to be started using only the information from that position onwards assuming that the referenced sub-picture sequences have already been decoded earlier. Stream access points of sub-picture sequences may coincide or be equivalent with random-access sub-pictures.

According to an embodiment, At the start of the decoding of a bitstream, the decoding of all sub-picture sequences is marked as uninitialized in the decoding process. When a sub-picture is coded as a random-access sub-picture (e.g. like an IRAP picture in HEVC) and prediction across sub-picture sequences is not enabled, the decoding of the corresponding sub-picture sequence is marked as initialized. When a current sub-picture is coded as a random-access sub-picture (e.g. like an IRAP picture in predicted layers in multilayer HEVC) and decoding of all sub-picture sequences used as reference for prediction is marked as initialized, the decoding of the sub-picture sequence of the current sub-picture is marked as initialized. When no sub-picture for a sub-picture sequence of an identifier is not present for a time instance (e.g. for an access unit), the decoding of the corresponding sub-picture sequence is marked as uninitialized in the decoding process. When a current sub-picture is not a random-access sub-picture and the decoding of the sub-picture sequence of the current sub-picture is not marked as initialized, the decoding of the current sub-picture may be omitted. Areas that correspond to omitted sub-pictures (e.g. on the basis of picture composition data) can be treated like unoccupied areas in the output picture compositing process, as described in other embodiments.

As a consequence of the above-described sub-picture-wise decoding start-up, the present or absence of sub-picture can be dynamically selected, e.g. depending on application needs.

Picture composition data may comprise but is not limited to one or more of the following pieces of information per sub-picture:

The top, left, bottom and right coordinates of an effective area within a sub-picture. Samples outside the effective area are not used in the output picture compositing process. One example of taking advantage of indicating an effective area is to exclude guard bands from the output picture compositing process.

The top, left, bottom and right coordinates of a composition area within the output picture. One composition area is indicated per one effective area of a sub-picture. The effective area of a sub-picture is mapped onto the composition area. When the composition area has different dimensions than the effective area, the effective picture area is resealed or resampled to match the effective area Rotation, e.g. by 0, 90, 180 or 270 degrees, for mapping the effective area on the composition area.

Mirroring, e.g. vertically or horizontally, for mapping the effective area on the composition area.

It is appreciated that other choices for syntax elements than those presented above may be equivalently used. For example, coordinates and dimensions of an effective area and/or a composition area may be indicated by the coordinates of the top-left corner of the area, the width of the area, and the height of the area. It needs to be understood that the units for indicating the coordinates or extents may be inferred or indicated in or along the bitstream and/or decoded from or along the bitstream. For example, coordinates and/or extents may be indicated as integer multiples of coding tree units.

According to an embodiment, a z-order or an overlaying order may be indicated by the encoder or another entity as part of picture composition data in or along the bitstream. According to an embodiment, a z-order or an overlaying order may be inferred for example to be an ascending sub-picture identifier or the same as the decoding order of the sub-pictures of the same output time or the same output order.

Picture composition data may be associated with a sub-picture sequence identifier or alike. Picture composition data may be encoded into and/or decoded from a video parameter set, a sequence parameter set, or a picture parameter set.

Picture composition data may describe sub-pictures or sub-picture sequences, which are not encoded, requested, transmitted, received, and/or decoded. This enables selecting a subset of possible or available sub-pictures or sub-picture sequences for encoding, requesting, transmission, receiving, and/or decoding.

A decoder or a player according to an embodiment may include an output picture compositing process or alike, which may take as input two or more reconstructed sub-pictures that represent the same output time or the same output order. An output picture compositing process may be a part of the decoded picture buffering process or may be connected to the decoded picture buffering process. An output picture compositing process may be invoked when a decoder is triggered to output a picture. Such triggering may for example happen when an output picture at a correct output order can be composed, i.e. when no coded video data preceding the next reconstructed sub-pictures in output order follows the current decoding position within the bitstream. Another example of such triggering is when an indicated buffering time has elapsed.

In the output picture compositing process, picture composition data is applied to locate said two or more reconstructed sub-pictures on the same coordinates or onto the same output picture area. According to an embodiment, the output picture area that is unoccupied is set to a determined value, which may be separately derived per each color component. The determined value may be a default value (e.g. pre-defined in a coding standard), an arbitrary value determined by the output picture compositing process, or a value indicated by an encoder in or along the bitstream and/or decoded from or along the bitstream. Correspondingly, the output picture area may be initialized to the determined value prior to locating said two or more reconstructed sub-pictures onto it.

According to an embodiment, a decoder indicates unoccupied areas together with the output picture. The output interface of the decoder or the output picture compositing process may comprise an output picture and information indicative of the unoccupied areas.

According to an embodiment, the output picture of the output picture compositing process is formed by locating the possibly resampled sample arrays of the two or more reconstructed sub-pictures in the z-order onto the output picture in such a manner that the sample array later in the z-order covers or replaces the sample values in collocated positions of the sample arrays earlier in the z-order.

According to an embodiment, the output picture compositing process comprises aligning the decoded representations of said two or more reconstructed sub-pictures. For example, if one sub-picture is represented by the YUV 4:2:0 chroma format and the other one, later in the z-order, is represented by the YUV 4:4:4 chroma format, the first one may be upsampled to YUV 4:4:4 as part of the process. Likewise, if one picture is represented by a first color gamut or format, such a ITU-R BT.709, and another one, later in the z-order, is represented by a second color gamut or format, such as ITU-R BT.2020, the first one may be converted to the second color gamut or format as part of the process.

In addition, the output picture compositing process may include one or more conversions from a color representation format to another (or, equivalently, from one set of primary colors to another set of primary colors). The destination color representation format may be selected for example based on the display in use. For example, the output picture compositing process may include a conversion from YUV to RGB.

Eventually, when all of said two or more reconstructed sub-pictures are processed a described above, the resulting output picture may form the picture to be displayed or to be used in the displaying process e.g. for generating content for the viewport.

It is appreciated that the output picture compositing process may additionally contain other steps than those described above and may lack some steps from those described above. Alternatively, or additionally, the described steps of the output picture compositing process may be performed in another order than that described above.

The spatial correspondence between a current sub-picture and the reference sub-picture (from a different sub-picture sequence) may be indicated by the encoder and/or decoded by the decoder using spatial relationship information described in the following:

According to an embodiment, in the absence of spatial relationship information, it may be inferred that the current sub-picture and the reference sub-picture are collocated.

According to an embodiment, the spatial relationship information indicates the location of the top-left sample of the current sub-picture in the reference sub-picture. It is noted that the top-left sample of the current sub-picture may be indicated to correspond to a location outside the reference sub-picture (e.g. have negative horizontal and/or vertical coordinates). Likewise, bottom and/or right-side samples of the current sub-picture may be located outside the reference sub-picture. When the current sub-picture references samples or decoded variable values (e.g. motion vectors) that are outside the reference sub-picture, they may be considered to be unavailable for prediction.

According to an embodiment, the spatial relationship information indicates the location of an indicated or inferred sample location of the reference sub-picture (for example the top-left sample location of the reference sub-picture) in the current sub-picture. It is noted that the indicated or inferred sample location of the reference sub-picture may be indicated to correspond to a location outside the current sub-picture (e.g. have negative horizontal and/or vertical coordinates). Likewise, some sample locations, e.g. bottom and/or right-side samples, of the reference sub-picture may be located outside the current sub-picture. When the current sub-picture references samples or decoded variable values (e.g. motion vectors) that are outside the reference sub-picture, they may be considered to be unavailable for prediction. It is noted that sub-pictures of different sub-picture sequences may use the same reference sub-picture as a reference for prediction using the same or different spatial relationship information. It is also noted that the indicated or inferred sample location of the reference sub-picture may be indicated to correspond to a fractional location in the current sub-picture. In this case, reference sub-picture is generated by resampling the current sub-picture.

According to an embodiment, the spatial relationship information indicates the location of the four corner (e.g. top-left, top-right, bottom-left, bottom-right) samples of the current sub-picture in the reference sub-picture. The corresponding location of each sample of the current picture in the reference subpicture may be calculated using a for example bilinear interpolation.

According to an embodiment, it may be inferred by an encoder and/or a decoder or it may be indicated in or along the bitstream by an encoder and/or it may be decoded from or along the bitstream by a decoder that spatial correspondence is applied in a wrap-around manner horizontally and/or vertically. An encoder may indicate such wrap-around correspondence for example when a sub-picture covers an entire 360-degree picture and sub-picture sequences of both views are present in the bitstream. When wrap-around correspondence is in use and a sample location outside a boundary of the reference sub-picture would be referenced in the decoding process, the referenced sample location may be wrapped around horizontally or vertically (depending which boundary is crossed) to the other side of the reference sub-picture.

According to an embodiment, an encoder generates and/or a decoder decodes more than one instance of spatial relationship information to indicate spatial correspondence between a current sub-picture and more than one reference sub-pictures.

According to an embodiment, an encoder generates and/or a decoder decodes more than one instance of spatial relationship information to indicate more than one spatial correspondence between a current sub-picture and the reference sub-picture (from a different sub-picture sequence). Any embodiment above may be used for describing an instance of spatial relationship information. For each instance of spatial relationship information, a separate reference picture index in one or more reference picture lists may be generated in an encoder and/or in a decoder. For example, reference picture list initialization may comprise including the number of times a reference sub-picture is included in an initial reference picture list can be equal to the number of instance of the spatial relationship information concerning the reference sub-picture. An encoder may indicate the use the reference sub-picture associated with a particular instance of spatial relationship information using the corresponding reference index when indicating a reference for inter prediction. Respectively, a decoder may decode the reference index to be used as a reference for inter prediction, conclude the particular instance of spatial relationship information corresponding to that reference index, and use the associated reference sub-picture with the concluded particular instance of spatial relationship information as a reference for inter prediction. The present embodiment may be used e.g. when the reference sub-picture is bigger than the current sub-picture, and object motions in different borders of the current sub-picture are in different directions (spatially when they are toward outside the sub-picture). Thus, for each border a different reference with different instance of spatial relationship information may be helpful.

According to an embodiment, unavailable samples may be copied from the other side of the sub-picture. This may be useful especially in 360-degree videos.

According to an embodiment, an access unit contains sub-pictures of the same time instance, and coded video data for a single access unit is contiguous in decoding order and is not interleaved, in decoding order, with any coded data of any other access unit. In another embodiment, sub-pictures of the same time instance need not be contiguous in decoding order.

According to another embodiment, sub-pictures of the same time instance need not be contiguous in decoding order. This embodiment may be used for example for retroactive decoding of some sub-layers of sub-picture sequences that were earlier decoded at a reduced picture rate but are now to be decoded at a higher picture rate. Such operation for multiple picture rates or different number of sub-layers for sub-picture sequence is described in another embodiment further below.

According to an embodiment, all sub-picture sequences have sub-pictures of the same time instances present. In other words, when one sub-picture sequence has a sub-picture for any particular time instance, all other sub-pictures also have a sub-picture for that time instance. An encoder may indicate in or along the bitstream, e.g. in a VPS (Video Processing System), and/or a decoder may decode from or along the bitstream if all sub-picture sequences have sub-pictures of the same time instances present. According to another embodiment, sub-picture sequences may have sub-pictures present whose time instances are at least partially differing. For example, sub-picture sequences may have different picture rates from each other.

According to an embodiment, all sub-picture sequences may have the same prediction structure, have sub-pictures of the same time instances present and use sub-pictures of the same time instances as reference. An encoder may indicate in or along the bitstream, e.g. in a VPS, and/or a decoder may decode from or along the bitstream if all sub-picture sequences have the same prediction structure.

According to an embodiment, reference picture marking for a sub-picture sequence is independent of other sub-picture sequences. This may be realized e.g. by using separate SPSs (Sequence Parameter Set) and PPSs (Picture Parameter Set) for different sub-picture sequences.

According to another embodiment, reference picture marking for all sub-picture sequences is synchronized. In other words, all sub-pictures of a single time instance are either all marked as "used for reference" or all marked as "unused for reference". In an embodiment, syntax structures affecting reference picture marking are included in and/or referenced by sub-picture-specific data units, such as VCL NAL units for sub-pictures. In another embodiment, syntax structures affecting reference picture marking are included in and/or reference by picture-specific data units, such as a picture header, a header parameter set, or alike.

According to an embodiment, bitstream or CVS (Coded Video Sequence) properties are indicated in two levels, namely per sub-picture sequence and collectively to all sub-picture sequences (i.e. all coded video data). The properties may comprise but are not limited to a coding profile, a level, HRD parameters (e.g. CPB and/or DPB size), constraints that have been applied in encoding. Properties per sub-picture sequence may be indicated in a syntax structure that applies to the sub-picture sequence. Properties applying collectively to all sub-picture sequences may be indicated in a syntax structure applying to the entire CVS or bitstream.

According to an embodiment, two levels of bitstream or CVS (Coded Video Sequence) properties are decoded, namely per sub-picture sequence and collectively to all sub-picture sequences (i.e. all coded video data). The properties may comprise but are not limited to a coding profile, a level, HRD parameters (e.g. CPB and/or DPB size), constraints that have been applied in encoding. A decoder or a client may determine from the properties indicated for all sub-picture sequences collectively whether it can process the entire bitstream. A decoder or a client may determine from the properties indicated for individual sub-picture sequences which sub-picture sequences it is able to process.

According to an embodiment, it is indicated in or along the bitstream, e.g. in SPS, and/or decoded from or along the bitstream:
- if motion vectors do not cause references to sample locations over sub-picture boundaries, or
- if motion vectors may cause references to sample locations over sub-picture boundaries.

According to an embodiment, the properties per sub-picture sequence and/or the properties applying collectively to all sub-picture sequences are informative of the sample count and/or sample rate limit applicable in the sub-picture sequence and/or all sub-picture sequences wherein:
- the sample locations over sub-picture boundaries are excluded provided that motion vectors do not cause references to sample locations over sub-picture boundaries, and
- the sample locations over sub-picture boundaries that may be referenced are included provided that motion vectors may cause references to sample locations over sub-picture boundaries.

According to an embodiment, parameters related to a sub-picture and/or sub-picture sequence are encoded into and/or decoded from a picture parameter set. Sub-pictures of the same picture, access unit, or time instance are allowed but not necessarily required to refer to different picture parameter sets.

According to an embodiment, information indicative of sub-picture width and height are indicated in and/or decoded from a picture parameter set. For example, the sub-picture width and height may be indicated and/or decoded in units of CTUs. The picture parameter set syntax structure may comprise the following syntax elements:

| | Descriptor |
|---|---|
| pic_parameter_set_rbsp( ) { | |
| ... | u(1) |
| multiple_subpics_enabled_flag | u(1) |
| if( multiple_subpics_enabled_flag ) { | |
| subpic_width_in_ctus_minus1 | ue(v) |

| | Descriptor |
|---|---|
| subpic_height_in_ctus_minus1 | ue(v) |
| } | |
| ... | |

The semantics of the syntax elements may be specified as follows:

multiple_subpics_enabled_flag equal to 0 specifies that a picture contains exactly one sub-picture and that all VCL NAL units of an access unit reference the same active PPS. multiple_subpics_enabled_flag equal to 1 specifies that a picture may contain more than one sub-picture and each sub-picture may reference a different active PPS. subpic_width_inctus_minus1 plus 1, when present, specifies the width of the sub-picture for which this PPS is the active PPS. subpic_height_in_ctus_minus1 plus 1, when present, specifies the height of the sub-picture for which this PPS is the active PPS. When subpic_width_in_ctus_minus1 and subpic_height_in_ctus_minus1 are present in a PPS that is activated, variables related to picture dimensions may be derived based on them and may override the respective variables derived from the syntax elements of SPS.

It needs to be understood that information indicative of sub-picture width and height may be realized differently than what is described above in details. In a first example, PPS may contain the tile row heights and tile column widths of all tile rows and tile columns, respectively, and the sub-picture height and width are the sums of all the tile column heights and widths, respectively. In a second example, sub-picture width and height may be indicated and/or decoded in units of minimum coding block size. This option would enable finer granularity for the last tile column and the last tile row.

According to an embodiment, parameters related to a sub-picture sequence are encoded into and/or decoded from a sub-picture parameter set. A single sub-picture parameter set may be used by sub-picture of more than one sub-picture sequence but is not required to be used by all sub-picture sequences. A sub-picture parameter set may for example comprise information similar to that included in a picture parameter set for conventional video coding, such as HEVC. For example, a sub-picture parameter set may indicate which coding tools are enabled in coded image segments of the sub-pictures referring to the sub-picture parameter set. Sub-pictures of the same time instance may refer to different sub-picture parameter sets. A picture parameter set may indicate parameters that applies collectively to more than one sub-picture sequences or across sub-pictures, such as spatial relationship information.

According to an embodiment, a sub-picture sequence is encapsulated as a track in a container file. A container file may contain multiple tracks of sub-picture sequences. Prediction of a sub-picture sequence from another sub-picture sequence may be indicated through file format metadata, such as a track reference.

According to an embodiment, selected sub-layer(s) of a sub-picture sequence are encapsulated as a track. For example, sub-layer 0 may be encapsulated as a track. Sub-layer-wise encapsulation may enable requesting, transmission, reception, and/or decoding of a subset of sub-layers for tracks that are not needed for rendering.

According to an embodiment, one or more collector tracks are generated. A collector track indicates which sub-picture tracks are suitable to be consumed together.

Sub-picture tracks may be grouped into groups containing alternatives to be consumed. For example, one sub-picture track of per a group may be intended to be consumed for any time range. Collector tracks may reference either or both of sub-picture tracks and/or groups of sub-picture tracks. Collector tracks might not contain instructions for modifying coded video content, such as VCL NAL units. In an embodiment, the generation of a collector track comprises but is not limited to authoring and storing one or more of the following pieces of information:

Parameter sets and/or headers that apply when the collector track is resolved. For example, sequence parameter set(s), picture parameter set(s), header parameter set(s), and/or picture header(s) may be generated. For example, a collector track may contain the picture header that applies for picture when its sub-pictures may originate from both random-access pictures and non-random-access pictures or be of both random-access sub-picture type and non-random-access sub-picture type.

Picture composition data.

Bitstream or CVS (Coded Video Sequence) properties applying collectively to the sub-picture sequences resolved from the collector track. The properties may comprise but are not limited to a coding profile, a level, HRD parameters (e.g. CPB and/or DPB size), constraints that have been applied in encoding.

In an embodiment, a sample in a collector track pertains to multiple samples of associated sub-picture tracks. For example, by selecting the sample duration of a collector track to pertain to multiple samples of associated sub-picture tracks, it can be indicated that the same parameter sets and/or header, and/or the same picture composition data applies to a period of time in the associated sub-picture tracks.

According to an embodiment, a client or alike identifies one or more collector tracks being available, wherein a collector track indicates which sub-picture tracks are suitable to be consumed together, and collector tracks may reference either or both of sub-picture tracks and/or groups of sub-picture tracks (e.g. a group containing alternative sub-picture tracks out of which one is intended to be selected for consumption for any time range), and collector tracks might not contain instructions for modifying coded video content, such as VCL NAL units.

In an embodiment, the client or alike parses from one or more collector tracks or information accompanying the one or more collector tracks one or more of the following pieces of information:

Parameter sets and/or headers that apply when the collector track is resolved.

Picture composition data.

Bitstream or CVS (Coded Video Sequence) properties applying collectively to the sub-picture sequences resolved from the collector track. The properties may comprise but are not limited to a coding profile, a level, HRD parameters (e.g. CPB and/or DPB size), constraints that have been applied in encoding.

In an embodiment, the client or alike selects a collector track from the one or more collector tracks to be consumed. The selection may be based on but is not limited to the above-listed pieces of information.

In an embodiment, the client or alike resolves the collector track to generate a bitstream for decoding. At least a subset of the information included in or accompanying the collector track may be included in the bitstream for decoding. The bitstream may be generated piece-wise, e.g. access unit by access unit. The bitstream may then be decoded, and the decoding may be performed piece-wise, e.g. access unit by access unit.

It needs to be understood that the embodiments described in relation to collector track equally apply to tracks called differently but essentially with the same nature. For example, instead of a collector track, the term parameter set track could be used, since the information included in the track could be considered parameter or parameter sets rather than VCL data.

According to an embodiment, sub-picture sequence(s) are decapsulated from selected tracks of a container file. Samples of the selected tracks may be arranged into a decoding order that complies with a coding format or a coding standard, and then passed to a decoder. For example, when a second sub-picture is predicted from a first sub-picture, the first sub-picture is arranged prior to the second sub-picture in decoding order.

According to an embodiment, each track containing a sub-picture sequence forms a Representation in the MPD. An Adaptation Set is generated per each group of sub-picture sequence tracks that is collocated and also otherwise share the same properties such that switching between the Representations of an Adaptation Set is possible e.g. with a single decoder instance.

According to an embodiment, prediction of a sub-picture sequence from another sub-picture sequence may be indicated through streaming manifest metadata, such as a @dependencyId in DASH MPD.

According to an embodiment, an indication of a group of Adaptation Sets is generated into an MPD, wherein the Adaptation Sets contain Representations that carry sub-picture sequences, and the sub-picture sequences are such that can be decoded with a single decoder. According to an embodiment, a client infers from the indicated group that any combination of selected dependent Representations whose complementary Representations are also in the combination and any selected independent or complementary Representations can be decoded.

According to an embodiment, a client selects e.g. based on the above-mentioned indicated group, estimated throughput, and use case needs (see e.g. below embodiments on viewport-dependent streaming) from which Representations (Sub)segments are requested.

According to an embodiment, sub-pictures are encoded onto and/or decoded from more than one layer of scalable video coding. In an embodiment, a reference picture for inter-layer prediction comprises a picture generated by the output picture compositing process. In another embodiment, inter-layer prediction is performed from a reconstructed sub-picture of a reference layer to a sub-picture of an enhancement layer.

According to an embodiment, a sub-picture sequence corresponds to a layer of scalability video coding. Embodiments can be used to realize e.g. quality scalability, region-of-interest scalability, or view scalability (i.e. multiview or stereoscopic video coding). Thus, multi-layer coding may be replaced by sub-picture-based coding. Sub-picture-based coding may be more advantageous in many use cases compared to scalable video coding. For example, many described embodiments enable a large number of sub-picture sequences, which may be advantageous e.g. in point cloud coding or volumetric video coding where generated of patches is dynamically adapted. In contrast, scalable video coding has conventionally assumed a fixed maximum number of layers (e.g. as determined by the number of bits in nuh_layer_id syntax element in HEVC). Furthermore, many described embodiments enable dynamic selection of (de) coding order of sub-pictures and reference sub-pictures for prediction, whereas the scalable video coding conventionally has a fixed (de)coding order of layers (within an access unit) and a fixed set of allowed inter-layer dependencies within a coded video sequence.

Embodiments may be used but are not limited with selecting (for encoding) and/or decoding sub-pictures or sub-picture sequences as any of the following:—
- whole picture of a normal single view 2D video (in this case each picture has only one sub-picture)
- partitions of a spatial partitioning of a video; partitions may correspond to coded image segments
- partitions of a spatiotemporal partitioning of a video; spatiotemporal partitions may be selected similarly to MCTSs in various use cases
- views of stereoscopic or multiview video as discussed above
- layers of a multi-layer (scalable) video as discussed above
- surfaces of a projection structure of 360-degree projection, such as faces of a multi-face 360-degree projection (e.g. cubemap)
- packed regions as indicated by region-wise packing information
- spatially contiguous single-resolution parts of a multi-resolution packing of a video (for example multi-resolution ERP or CMP)
- parts or patches of a point cloud projected onto a surface (texture or depth); a sub-picture sequence may comprise respective patches in subsequent time instances
- one or more regions of interest coded as sub-pictures at a higher resolution than other areas
- aggregation of coded videos from different sources (e.g. different cameras) as sub-picture sequences within one bitstream; this may be used for multi-point video conferencing, for example In the following some example embodiments using sub-picture-based (de)coding are discussed, e.g. from a point of view of Viewport-dependent 360-degree video streaming; coding of scalable, multiview and stereoscopic video; coding of multi-face content with overlapping; coding of point cloud content.

Viewport-dependent 360-degree video streaming:

According to an embodiment, a coded sub-picture sequence may be encapsulated in a track of a container file, the track may be partitioned into Segments and/or Subsegments, and a Representation may be created in a streaming manifest (e.g. MPEG-DASH MPD) to make the (Sub) segments available through requests and to announce properties of the coded sub-picture sequence. The process of the previous sentence may be performed for each of the coded sub-picture sequences.

According to an embodiment, a client apparatus may be configured to parse from a manifest information of a plurality of Representations and to parse from the manifest a spherical region for each of the plurality of Representations. The client apparatus may also parse from the manifest values indicative of the quality of the spherical regions and/or resolution information for the spherical regions or their 2D projections. The client apparatus determines which Representations are suitable for its use. For example, the client apparatus may include means to detect head orientation when using a head-mounted display and select a Representation with a higher quality to cover the viewport than in Representations selected for other regions. As a consequence of the selection, the client apparatus may request (Sub)Segments of the selected Representations.

According to an embodiment, the same content is coded at multiple resolutions and/or bitrates using sub-picture sequences. For example, different parts of a 360-degree content may be projected to different surfaces, and the projected faces may be downsampled to different resolutions. For example, the faces that are not in the current viewport may be downsampled to lower resolution. Each face may be coded as a sub-picture.

According to an embodiment, the same content is coded at different random-access intervals using sub-picture sequences.

According to an embodiment, a change in viewing orientation causes a partly different selection of Representations to be requested than earlier. The new Representations to be requested may be requested or their decoding may be started from the next random-access position within the sub-picture sequences carried in the Representations. When sub-picture sequences are made available at several random-access intervals, Representations having more frequent random-access positions may be requested as a response to a viewing orientation change until a next (Sub)segment with random-access position and of similar quality is available from respective Representations having less frequent random-access positions. Representations that need not be changed as a response to a viewing orientation change need not have random-access positions. As discussed already earlier, sub-pictures may be allowed to have different sub-picture types or NAL unit types. For example, a sub-picture of a particular access unit or time instance may be of a random-access type while another sub-picture of the same particular access unit or time instance may be of a non-random-access type. Thus, sub-pictures of bitstreams having different random-access intervals can be combined.

According to an embodiment, shared coded sub-pictures are coded among the sub-picture sequences. Shared coded sub-pictures are identical in respective sub-picture sequences of different bitrates, both in their coded form (e.g. VCL NAL units are identical) and in their reconstructed form (the reconstructed sub-pictures are identical).

According to an embodiment, shared coded sub-pictures are coded in their own sub-picture sequence.

In an embodiment, shared coded sub-pictures are indicated in or along the bitstream (e.g. by an encoder) not to be output by a decoder, and/or are decoded from or along the bitstream not to be output by a decoder.

Shared coded sub-pictures may be made available as separate Representation(s) or may be included in "normal" Representations. When shared coded sub-pictures are made available as separate Representation(s), the client apparatus may constantly request and receive those Representation(s).

The above-described selection process(es) depending on viewing orientation apply when shared coded sub-pictures are in use with a difference that in addition to capability of switching between Representation(s) at random-access positions, also the shared coded sub-pictures offer that capability.

Figure 12:
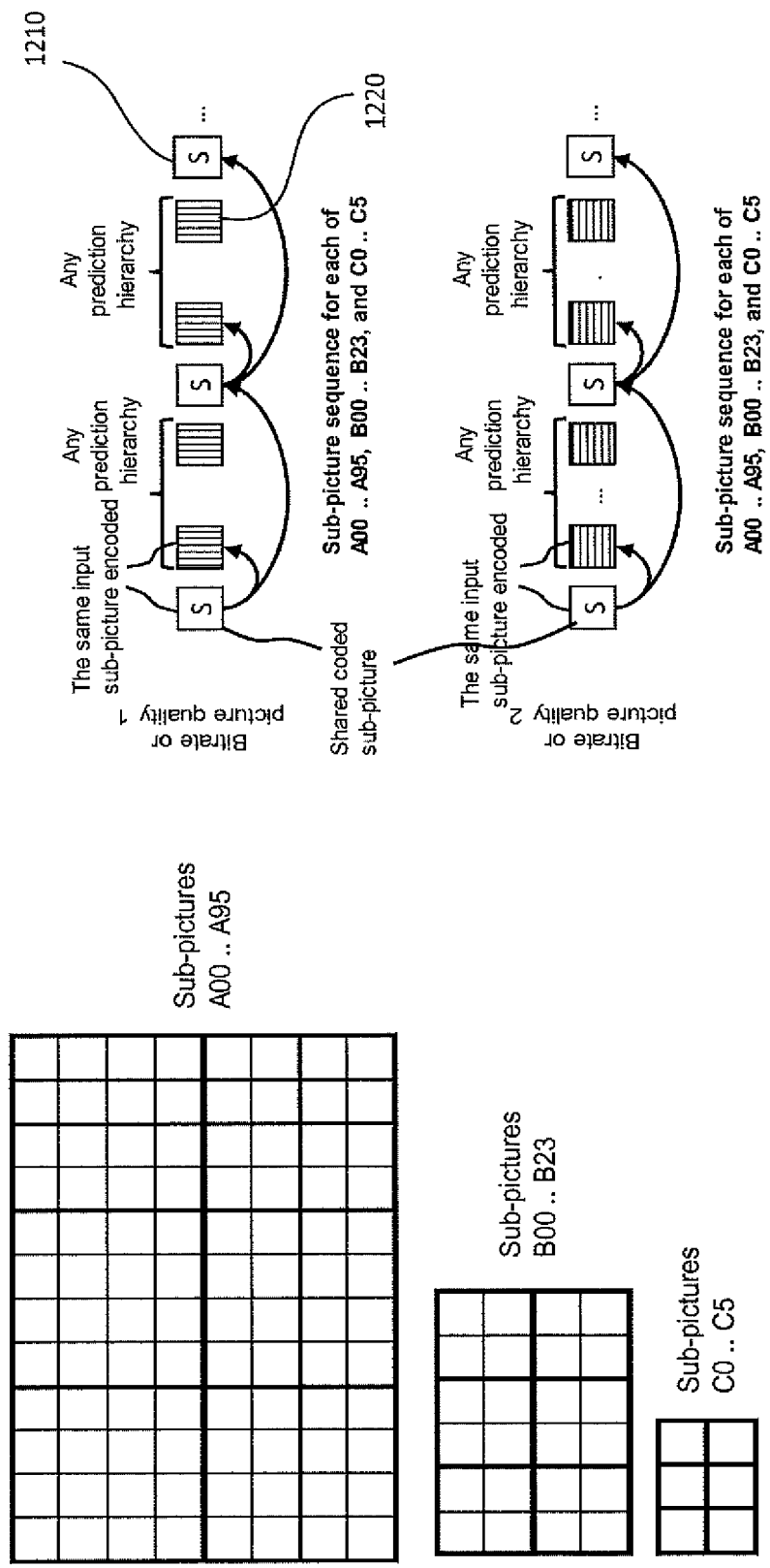
FIG. 12 shows an example of using a shared coded sub-picture for multi-resolution viewport independent 360-degree video streaming.

FIG. 12 illustrates an example of using shared coded sub-picture for multi-resolution viewport-dependent 360-degree video streaming.

The cubemap content is resampled before encoding to three resolutions (A, B, C). It needs to be understood that cubemap projection is meant as one possible choice for which the embodiment can be realized, but generally other projection formats can likewise be used. In this example, the content at each resolution is split into sub-pictures of equal dimensions, although generally different dimensions could likewise be used.

In this example, shared coded sub-pictures (indicated with rectangle containing the S character) are coded periodically, but it needs to be understood that different strategies of coding shared coded sub-pictures could additionally or alternatively be used. For example, scene cuts could be detected, IRAP pictures or alike could be coded for detected scene cuts, and periods for coding shared coded sub-pictures could be reset at IRAP pictures or alike.

In this example, shared coded sub-pictures are coded with "normal" sub-pictures (indicated with striped rectangles in the figure) in the same sub-picture sequences. The shared coded sub-picture and the respective "normal" sub-picture represent conceptually different units in the bitstream, e.g. with different decoding times, with different picture order counts, and/or belonging to different access units. In another embodiment, a sequence of shared coded sub-pictures could form its own sub-picture sequence from which the respective "normal" sub-picture sequence could be predicted. If prediction from one sub-picture sequence (the shared coded sub-picture sequence in this example) to another is enabled, shared coded sub-picture and the respective "normal" sub-picture from the same input picture can belong to the time instance (e.g. be a part of the same access unit).

In this example, shared coded sub-pictures have the same dimensions as the respective "normal" sub-pictures. In another embodiment, shared coded sub-pictures could have different dimensions. For example, a shared coded sub-picture could cover an entire cube face or all cube faces of a cubemap, and spatial relationship information could be used to indicate how "normal" sub-pictures spatially relate to shared coded sub-pictures. An advantage of this approach is to enable prediction across a larger area within and between shared coded sub-pictures when compared to "normal" sub-pictures.

The client apparatus can select, request, receive, and decode:
    shared coded sub-pictures A00 . . . A95, B00 . . . B23, and C0 . . . C5 of all desired resolutions
    any subset of sub-pictures of other coded pictures of any selected bitrate (on sub-picture basis)

According to an embodiment, a sub-picture sequence representing 360-degree video is coded at a "base" fidelity or quality, and hence the sub-picture sequence may be referred to as the base sub-picture sequence. This sub-picture sequence may be considered to carry shared coded sub-pictures. Additionally, one or more sub-picture sequences representing spatiotemporal subsets of the 360-degree video are coded at a fidelity or quality that is higher than the base fidelity or quality. For example, the projected picture area or the packed picture area may be partitioned into rectangles, and each sequence of rectangles may be coded as a "region-of-interest" sub-picture sequence. An ROI sub-picture sequence may be predicted from base sub-picture sequence and from reference sub-pictures of the same ROI sub-picture sequence. Spatial relationship information is used to indicate the spatial correspondence of the ROI sub-picture sequence in relation to the base sub-picture sequence. Several ROI sub-picture sequences of the same spatial position can be coded, e.g. for different bitrate or resolution.

In an embodiment, the base sub-picture sequence has the same picture rate as the ROI sub-picture sequences and thus ROI sub-picture sequences can be selected to cover a subset of the 360-degree video, e.g. the viewport with a selected margin for viewing orientation changes. In another embodiment, the base sub-picture sequence has a lower picture rate than the ROI sub-picture sequences and thus ROI sub-picture sequences can be selected to cover the entire 360-degree video. The viewport with a selected margin for viewing orientation changes can be selected to be requested, transmitted, received, and/or decoded from ROI sub-picture sequences with higher quality than the ROI sub-picture sequences covering the remaining of the sphere coverage.

In some solutions, the base sub-picture sequence is always received and decoded. Additionally, ROI sub-picture sequences selected on the basis of the current viewing orientation are received and decoded.

Random-access sub-pictures for the ROI sub-picture sequences may be predicted from the base sub-picture sequence, Since the base sub-picture sequence is consistently received and decoded, random-access sub-picture interval (i.e., the SAP interval) for the base sub-picture sequence can be longer than that for ROI sub-picture sequences. The encoding method facilitates switching to requesting and/or receiving and/or decoding another ROI sub-picture sequence at a SAP position of that ROI sub-picture sequence. No intra-coded sub-picture at that ROI sub-picture sequence is required to start the decoding of that ROI sub-picture sequence, and consequently compression efficiency is improved compared to a conventional approach.

The benefits of using the example embodiments in viewport-dependent 360-degree streaming include the following:

Extractor track(s) or tile base track(s) or alike are not needed for merging of MCTSs in viewport-dependent streaming, since sub-picture sequences can be decoded without modifications regardless of which set of sub-picture sequences are received or passed to decoding. This reduces content authoring burden and simplifies client operation.

No changes in VCL NAL units are needed in late-binding-based viewport-dependent streaming, since sub-picture sequences can be decoded without modifications regardless of which set of sub-picture sequences are received or passed to decoding. This reduces client implementation complexity.

Picture size in terms of pixels needs not be constant. This advantage becomes apparent when shared coded sub-pictures are used, where a greater number of pixels may be decoded in the time instances including shared coded sub-pictures than other time instances.

Flexibility in choosing the number of sub-pictures according to the viewport size and head motion margin. In some prior-art methods, the number of sub-picture tracks was pre-defined when creating an extractor track for merging of the content of the sub-picture tracks into a single bitstream.

Flexibility in choosing the number of sub-pictures according to the decoding capacity and/or availability of received data. The number of decoded sub-pictures can be dynamically chosen depending on available decoding capacity, e.g. on a multi-process or multi-tasking system with resource sharing. The coded data for a particular time instance can be passed to decoding even if some requested sub-pictures for it have not been received. Thus, delivery delays concerning only a subset of sub-picture sequences do not stall the decoding and playback of other sub-picture sequences.

Switching between bitrates and received sub-pictures can take place at any shared coded sub-picture and/or random-access sub-picture. Several versions of the content can be encoded at different intervals of shared coded sub-pictures and/or random-access sub-pictures. In the decoded bitstreams shared coded sub-pictures and/or random-access sub-pictures need not be aligned in all sub-picture sequences, thus better rate-distortion efficiency can be achieved when switching and/or random-access property is only in those sub-picture sequences where it is needed.

As discussed above, depending on the use case, the term "sub-picture" can refer to various use cases and/or types of projections. Examples relating to the coding of sub-pictures in the context of few of these use cases are discussed next.

Coding of Multi-Face Content with Overlapping

Figure 14:
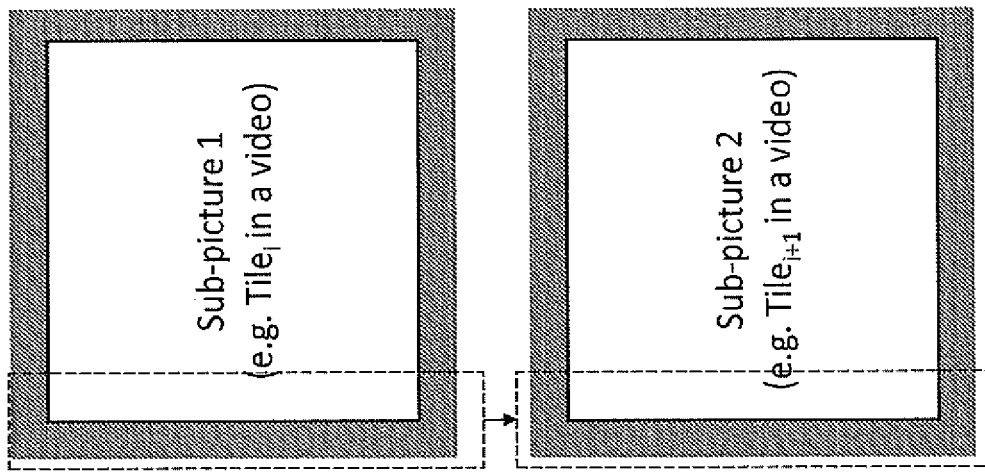
FIG. 14 shows another example of a sub-picture using a part of another sub-picture as a reference frame.
Figure 13:
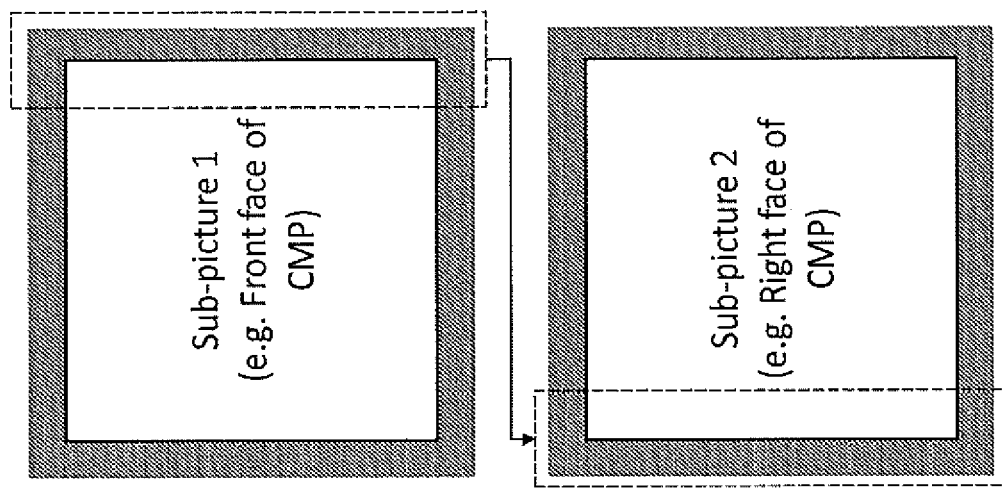
FIG. 13 shows an example of a sub-picture using a part of another sub-picture as a reference frame.

According to an embodiment, different parts of a 360-degree content may be projected to different surfaces, and the projected faces may have overlapped content. In another embodiment a content may be divided to several regions (e.g. tiles) with overlapped content. Each face or region may be coded as a sub-picture. Each sub-picture may use a part of the other sub-picture as a reference frame as is shown in FIGS. 13 and 14 for two examples, where the non-overlapped contents have been shown in white box, the overlapped areas have been shown in gray color, and the corresponding parts in sub-pictures have been indicated by a dashed rectangle. Spatial relationship information could be used to indicate how a sub-picture spatially relate to other sub-pictures.

Coding of Point Cloud Content

Figure 15:
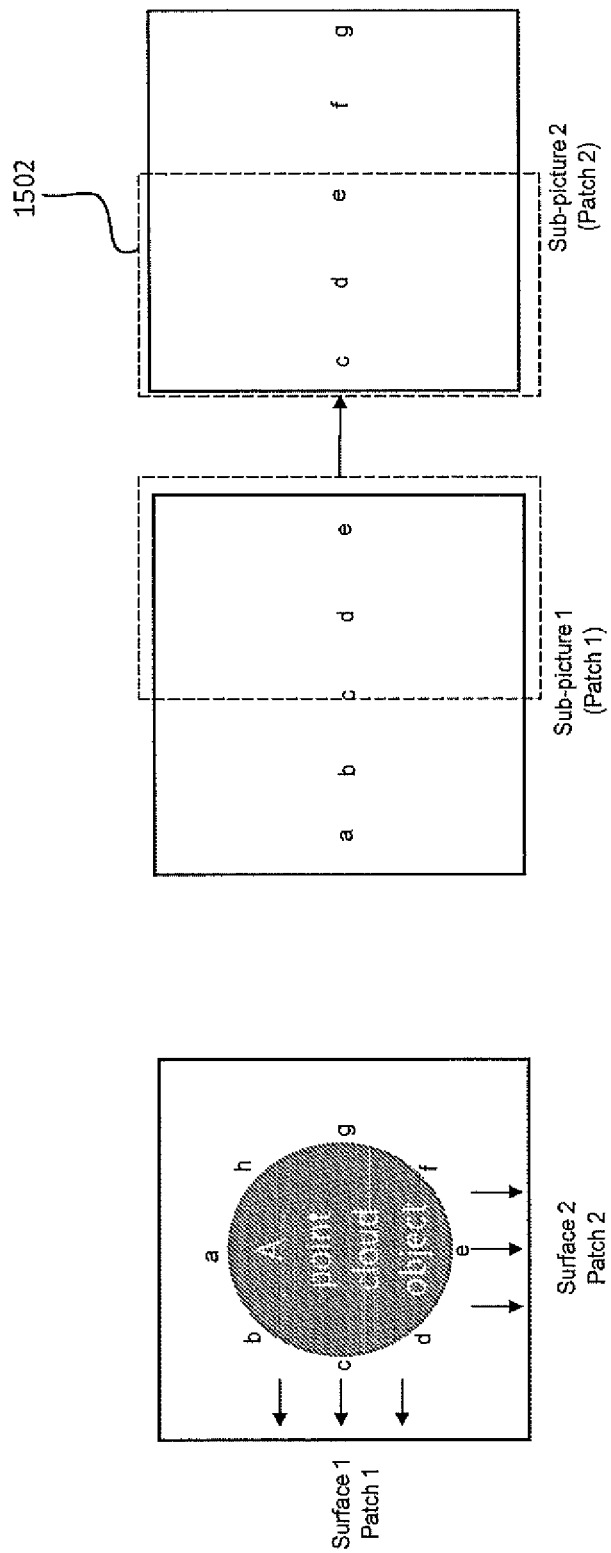
FIG. 15 shows an example of a patch generation according to an embodiment.

According to an embodiment, each part of a point cloud content is projected to a surface to generate a patch. Each patch may be coded as a sub-picture. Different patches may have redundant data. Each sub-picture may use other sub-picture to compensate this redundancy. In example in FIG. 15 different parts of a point cloud have been projected to surface 1 and surface 2 to generate patch 1 and patch 2, respectively. Each patch is coded as a sub-picture. In this example, a part of the point cloud content which is indicated by c,d,e is redundantly projected to two surfaces, so the corresponding content in redundant in patch 1 and patch 2. In FIG. 15, that part of the sub-picture 2 which may be predicted from sub-picture 1 is indicated by dashed box. The collection of reconstructed sub-pictures may form the output picture. Alternatively, reconstructed sub-pictures may be arranged into a 2D output picture.

According to an encoding embodiment, a patch of a second PCC layer is coded as a second sub-picture and is predicted the reconstructed sub-picture of the respective patch of a first PCC layer. Similarly, according to a decoding embodiment, a second sub-picture is decoded, wherein the second sub-picture represents a patch of a second PCC layer, and wherein the decoding comprises prediction from the reconstructed sub-picture that represents the respective patch of a first PCC layer.

According to an embodiment sub-picture sequences are intentionally encoded, requested, transmitted, received, and/or decoded at different picture rates and/or at different number of sub-layers. This embodiment is applicable e.g. when only a part of the content is needed for rendering at a particular time. For example, in 360-degree video only the viewport is needed for rendering at a particular time, and in point cloud coding and volumetric video the part needed for rendering may depend on the viewing position and viewing orientation. The picture rate and/or the number of sub-layers for sub-picture sequences that are needed for rendering may be selected (in encoding, requesting, transmitting, receiving, and/or decoding) to be higher than for those sub-picture sequences that are not needed for rendering and/or not likely to be needed for rendering soon (e.g. for responding to a viewing orientation change). With the described arrangement, the needed decoding capacity and power consumption may be reduced. Alternatively, delivery and/or decoding speedup may be achieved e.g. for faster than real-time playback. When decoding of a sub-picture sequence at a greater number of sub-layers is desired (e.g. for responding to a viewing orientation change), sub-layer access pictures, such as TSA and/or STSA pictures of HEVC, may be used to restart encoding, requesting, transmitting, receiving, and/or decoding sub-layers.

According to an embodiment, a TSA sub-picture or alike can be encoded into the lowest sub-layer of a sub-picture sequence not predicted from other sub-picture sequences. This TSA sub-picture indicates that all sub-layers of this sub-picture sequence can be predicted starting from this TSA picture. According to an embodiment, a ISA sub-picture or alike is decoded from the lowest sub-layer of a sub-picture sequence not predicted from other sub-picture sequences. In an embodiment, it is concluded that requesting, transmission, reception, and/or decoding of any sub-layers above the lowest sub-layer can start starting from this TSA sub-picture, and consequently such requesting, transmission, reception, and/or decoding takes place.

The present embodiments provide also other advantages in addition to those already discussed above. For example, loop filtering across sub-picture boundaries is disabled. Thus, a very low delay operation may be achieved by processing the decoded sub-pictures output by the decoding process immediately (e.g., through color space conversion from YUV to RGB, etc.). This enables pipelining of the processes involved in playing (e.g. receiving VCL NAL units, decoding VCL NAL units, post-processing decoded sub-pictures). Similar benefit may also be achieved in the encoding end. Filtering over borders of non-contiguous image content, such as filtering across disjoint projection surfaces, may cause visible artefacts. By disabling loop filter visible artifacts at sub-picture borders are reduced and subjective quality is improved.

As a further advantage, when sub-picture sequences are independent from each other, sub-pictures can be decoded in any order and sub-pictures of different pictures can be decoded in parallel. This provides more flexibility for load balancing between processing cores.

As a further advantage, a sequence of patches of point cloud or volumetric video can be indicated to be of the same or similar source (e.g. the same projection surface) by indicating them to below to the same sub-picture sequence. Consequently, patches of the same source can be inter-predicted from each other. Conventionally, patches of point cloud or volumetric video have been packed onto a 2D picture and patches of the same or similar source should have been positioned spatially to the same location on the 2D picture. However, as the number and size of patches may vary, such temporal alignment of corresponding patches might not be straightforward.

As a further advantage, only high-level syntax structures, such as the picture composition data, need to be rewritten for extracting a subset of sub-pictures of a bitstream or merging sub-pictures of different bitstreams. Coded data of sub-pictures need not be changed. This makes viewport-dependent 360-degree streaming applications easier to implement. Likewise, for viewing position and orientation dependent volumetric video streaming applications.

In addition, the number or pixel count of sub-pictures per picture does not have the stay constant. This makes 360-degree and 6DoF streaming applications that are based on "late binding" and adaptation based on viewing orientation and/viewing position easier to implement. The number of received sub-pictures can be chosen based on the viewport size and/or the decoding capacity. If a sub-picture is not received in time, the picture can be decoded without it.

By allowing motion vectors to reference data outside sub-picture boundaries compression efficiency can be improved compared to motion-constrained tile sets.

By allowing prediction from one sub-picture sequence to another, compression efficiency can be improved e.g. for:
Inter-view prediction, when the first sub-picture sequence represents a first view, and the second sub-picture sequence represents a second view.
Prediction from a "shared sub-picture sequence" can be enabled for adaptive 360 and 6DoF streaming.

Since the picture width and height is may be allowed to be not aligned with CTU boundary (or alike) and since sub-picture decoding operates as conventional picture decoding, flexibility in defining sub-picture sizes is achieved. For example, sub-picture sizes used for 360-degree video need not be multiples of CTU width and height. This decoding capacity in terms of pixels/second can be utilized more flexibly.

In multifaced projection like CMP, where there is discontinuity in face boundaries, sub-picture coding can improve intra coding in the face boundaries by not using the neighboring face pixels for prediction.

In the following, the reference sub-picture manipulation process will be described in more detail, in accordance with an embodiment.

An encoder selects which of the sub-pictures could be used as a source of a manipulated reference sub-picture. The encoder generates the set of manipulated reference sub-pictures from the set of decoded sub-pictures using the identified reference sub-picture manipulation process; and includes at least one of the manipulated reference sub-pictures in a reference picture list for prediction.

The encoder includes in or along the bitstream an identification of the reference sub-picture manipulation process and may also include in the bitstream information indicative of or infers a set of decoded sub-pictures to be manipulated, and/or a set of manipulated reference sub-pictures to be generated.

A decoder decodes from or along the bitstream the identification of the reference sub-picture manipulation process. The decoder also decodes from the bitstream information indicative of or infers a set of decoded sub-pictures to be manipulated, and/or a set of manipulated reference sub-pictures to be generated.

The decoder may also generate the set of manipulated reference sub-pictures from the set of decoded sub-pictures using the identified reference sub-picture manipulation process; and include at least one of the manipulated reference sub-pictures in a reference picture list for prediction.

In an embodiment, an encoder indicates in or along the bitstream and/or a decoder decodes from or along the bitstream and/or it is inferred by an encoder and/or a decoder that a reference sub-picture manipulation operation is to be carried out when the reference sub-picture(s) used as input in the reference sub-picture manipulation become available.

In an embodiment, an encoder encodes into or along the bitstream and/or a decoder decodes from or along the bitstream a control signal if a reference sub-picture is to be provided for reference sub-picture manipulation when it becomes available (e.g., right after it has been decoded). The control signal may be included for example in a sequence parameter set, a picture parameter set, a header parameter set, a picture header, a sub-picture delimiter or header, and/or an image segment header (e.g. a tile group header). When included in a parameter set, the control signal may apply to each sub-picture referring to the parameter set. The control signal may be specific to a sub-picture sequence (and may be accompanied by a sub-picture sequence identifier) or may apply to all sub-picture sequences that are decoded. When included in a header, the control signal may apply to the spatiotemporal unit wherein the header is applied. In some cases, the control signal is applicable in the first header and may be repeated in subsequent headers applying to the same spatiotemporal units. For example, the control signal may be included in an image segment header (e.g. a tile group header) of a sub-picture, indicating that the decoded sub-picture is provided to the reference sub-picture manipulation.

In an embodiment, an encoder indicates in or along the bitstream and/or a decoder decodes from or along the bitstream and/or it is inferred by an encoder and/or a decoder that a reference sub-picture manipulation operation is to be carried out when the manipulated reference sub-picture is referenced in encoding and/or decoding or is about to be reference in encoding and/or decoding. For example, the reference sub-picture manipulation process may be carried out when the manipulated reference sub-picture is included in a reference picture list among "active" reference sub-pictures that may be used as reference for prediction in the current sub-picture.

As discussed earlier, in some embodiments:
Decoded picture buffering is performed on picture basis rather than on sub-picture basis.
An encoder and/or a decoder generates a reference picture from decoded sub-pictures of the same access unit or time instance using the picture composition data.
The generation of a reference picture is performed identically or similarly to what is described in other embodiments for generating output pictures.

An embodiment, in which decoded picture buffering is performed on picture basis, comprises the following: A reference sub-picture to be used as input to the reference sub-picture manipulation process is generated by extracting an area from a reference picture in the decoded picture buffer. The extraction may be done as a part of the decoded picture buffering process or a part of the reference sub-picture manipulation process or be operationally connected to the decoded picture buffering process and/or the reference sub-picture manipulation process. In an embodiment, the area is the area that collocates with the current sub-picture being encoded or decoded. In another embodiment, the area is provided through spatial relationship information. Thus, the reference sub-picture manipulation process gets reference sub-picture(s) from the decoded picture buffering process similarly to other embodiments, and the reference sub-picture manipulation process may operate similarly to other embodiments.

Identification of the Reference Sub-Picture Manipulation Process and Signalling Accompanying Information The above-mentioned sub-picture packing may involve indicating packing information for sub-picture sequences, sub-pictures, or regions within sub-pictures that may be used as source for the sub-picture packing. In an embodiment, the packing information is indicated similarly to but separately from the picture composition data. In an embodiment, an encoder indicates in or along the bitstream that the picture composition data is reused as packing information, and/or likewise a decoder decodes from or along the bitstream that the picture composition data is reused as packing information. In an embodiment, the packing information is indicated similarly to region-wise packing SEI message or region-wise packing metadata of OMAF.

It is noted that packing information may be indicated for a set of reconstructed sub-pictures (e.g. all sub-pictures to be used for output picture compositing), but a manipulated reference sub-picture may be generated from those reconstructed sub-pictures that are available at the time when the manipulated reference sub-picture is created. For example, a manipulated reference sub-picture that is used as a reference for a third sub-picture of a first time instance may be generated from a first reconstructed sub-picture and a second reconstructed sub-picture (also of the first time instance) that precede the third sub-picture in decoding order, while the packing information used in generating the manipulated reference sub-picture may comprise the information for the first, second, and third sub-pictures.

The blending as part of generating the manipulated reference sub-picture may be performed in either so that each value sample for a sample position in calculated as the average of all samples of the reference sub-pictures positioned onto this sample position, or so that each sample may be calculated using a weighted average according to the location of the sample with respect to the location of available and unavailable samples.

Adaptive Resolution Change

An adaptive resolution change (ARC) refers to dynamically changing the resolution within the video bitstream or video session, for example in video-conferencing use-cases. Adaptive resolution change may be used e.g. for better network adaptation and error resilience against transmission errors or losses. For better adaptation to changing network requirements for different content, it may be desired to be able to change both the temporal/spatial resolution in addition to quality. ARC may also enable a fast start of a session or after seeking to a new time position, wherein the start-up time of a session may be able to be reducing by first sending a low resolution frame and then increasing the resolution. ARC may further be used in composing a conference. For example, when a person starts speaking, his/her corresponding resolution may be increased.

ARC may be conventionally carried out by an encoding a random-access picture (e.g. an HEVC IRAP picture) at the position where the resolution change takes place. However, since intra coding applied in random-access pictures make them more inefficient than inter-coded pictures in rate-distortion performance. Consequently, one possibility is to encode a random-access picture at a relatively low quality to keep the bit count close to that of inter-coded pictures so that the delay is not significantly increased. However, a low-quality picture may be subjectively noticeable and also negatively affects the rate-distortion performance of pictures predicted from it. Another possibility is to encode a random-access picture at a relatively high quality, but then the relatively high bit count may cause higher delay. In low-delay conversational applications, it might not be possible to compensate the high delay with initial buffering, which might cause noticeable picture rate fluctuation or motion discontinuity.

The reference sub-picture manipulation process can be used for adaptive resolution changes.

Inter prediction may be used for reference sub-picture manipulation process. Any preceding reference sub-picture of the same sub-picture sequence, in decoding order, may be used as a reference for prediction. Moreover, the manipulated reference sub-pictures may be used as reference for prediction.

In the example the last reconstructed sub-picture of a certain resolution is resampled to generate a manipulated reference sub-picture for a new resolution. Such an arrangement may suit low-delay applications, where the decoding and output order of (sub-)pictures are the same. It needs to be understood that this is not the only possible arrangement, but any reconstructed sub-picture(s) may be resampled to generate manipulated reference sub-picture(s) to be used as a reference for prediction of sub-pictures of a new resolution. Moreover, there may be more than one manipulated reference sub-picture that is used as a reference for prediction for sub-pictures of a new resolution.

Sub-picture sequences may be formed so that the sub-pictures of the same resolution are in the same sub-picture sequence. Consequently, there are two sub-picture sequences in this example. Another option for forming sub-picture sequences is such that the sub-pictures of the same resolution starting from a resolution switch point are in the same sub-picture sequence. Consequently, there are three sub-picture sequences in this example.

The example above illustrates a possible operation for live encoding adapted e.g. to network throughput and/or decoding capability. Alternatively or additionally, the example above may also illustrate the decoding operation, where the decoded sub-pictures are a subset of sub-pictures that are available for decoding, e.g. in a container file or as a part of received streams.

An adaptive resolution change may be facilitated in streaming (for multiple players) e.g. as described in the next paragraphs.

Selected sub-picture sequences may be encoded for relatively infrequent random-access interval. In this example, a low-resolution sub-picture sequence and a high-resolution sub-picture sequence are generated for random-access period of every third (sub)segment. These sub-picture sequences may be received e.g. at a stable reception condition, when the receiver buffer occupancy is sufficiently high and network throughput is sufficient and stable for the bitrate of the sub-picture sequence.

Selected sub-picture sequences are encoded for switching between resolutions using manipulated reference sub-pictures created through resampling. In this example, one sub-picture sequence is encoded for resolution change from low to high resolution at any (sub)segment boundary. The sub-pictures of each (sub)segment in this sub-picture sequence are encoded in a manner that they only depend on each other or on the low-resolution sub-picture sequence.

The sub-picture sequences are made available separately for streaming. For example, they may be announced as separate Representations in DASH MPD.

The client chooses on (sub)segment basis which sub-picture sequence is received. The client first receives one (sub)segment of the low-resolution sub-picture sequence (of the infrequent random-access interval). The client then decides to switch up to a higher resolution and receives two (sub)segments of the sub-picture sequence that uses manipulated reference sub-pictures generated from the low-resolution sub-pictures as a reference for prediction. However, since the latter manipulated reference sub-picture requires the second low-resolution (sub)segment to be decoded, the second (sub)segment of the low-resolution sub-picture sequence is also received. The client then switches to the high-resolution sub-picture sequence of the infrequent random-access interval.

In an embodiment, the manipulated reference sub-pictures are generated from specific temporal sub-layers only (e.g. the lowest temporal sub-layer, e.g. TemporalId equal to 0 in HEVC). Those specific temporal sub-layers may be made available for streaming separately from the other temporal sub-layers of the same sub-picture sequence. For example, those specific temporal sub-layers may be announced as a first Representation, and the other sub-layers of the same sub-picture sequence may be made available as a second Representation. Continuing the example client operation illustrated above, only the specific sub-layers need to be received from the second (sub)segment of the low-resolution sub-picture sequence. The specific sub-layers may be made available as a separate Representation or Sub-Representation, hence enabling requesting and receiving them separately from other sub-layers.

Stream Switching at Open GOP Random-Access Pictures

To support the client switching between different qualities and resolutions during the streaming session of DASH representations, random access point pictures may be encoded at the segment boundaries. Conventionally, random-access pictures starting a so-called closed group of pictures (GOP) prediction structure have been used at segment boundaries of DASH representations. It has been found that open-GOP random-access pictures improve rate-distortion performance compared to closed-GOP random-access pictures. Moreover, open-GOP random-access pictures have been found to reduce observable picture quality fluctuation when compared to closed-GOP random-access pictures. When the decoding starts from an open-GOP random-access picture (e.g. a CRA picture of HEVC), some pictures following the random-access picture in decoding order but preceding the random-access picture in output order may not be decodable. These pictures may be referred to random access skipped leading (RASL) pictures. Consequently, if open GOPs were used at segment boundaries in DASH, representation switching would result into the inability to decode the RASL pictures and hence a picture rate glitch in the playback.

Seamless representation switching may be enabled when representations use open GOP structures and share the same resolution and other characteristics, i.e. when a decoded picture of the source representation can be used as such as a reference picture for predicting pictures of a target representation. However, representations may not share the same characteristics, e.g., they may be of different spatial resolution, wherein seamless representation switching may need some further considerations.

According to an embodiment, an encoder indicates in or along the bitstream that reference sub-picture manipulation is applied for those reference sub-pictures of leading sub-pictures or alike that precede, in decoding order, the open-GOP random-access sub-picture associated with the leading sub-pictures. According to an embodiment, a decoder decodes from or along the bitstream or infers that reference sub-picture manipulation is applied for those reference sub-pictures of leading sub-pictures or alike that precede, in decoding order, the open-GOP random-access sub-picture associated with the leading sub-pictures. A decoder may infer reference sub-picture manipulation e.g. when an open-GOP random-access sub-picture is of different resolution than earlier sub-pictures of the same sub-picture sequence in decoding order and when the open-GOP random-access sub-picture kept one or more preceding (in decoding order) reference sub-pictures marked as "used for reference". The reference sub-picture manipulation may be indicated (by an encoder), decoded (by a decoder), or inferred (by an encoder and/or a decoder) to be resampling to match the resolution of the reference sub-pictures to that of the leading sub-pictures using the reference sub-pictures as reference for prediction.

Adaptive Resolution Changing for Responding to Viewport Changes in Region-Wise Mixed-Resolution (RWMR) 360° Video Streaming When viewing orientation changes in HEVC-based viewport-dependent 360° streaming, a new selection of sub-picture Representations can take effect at the next IRAP-aligned (Sub)segment boundary. Sub-picture Representations are merged to coded pictures for decoding, and hence the VCL NAL unit types are aligned in all selected sub-picture Representations.

To provide a trade-off between the response time to react to viewing orientation changes and the rate-distortion performance when the viewing orientation is stable, multiple versions of the content can be coded at different random-access picture intervals (or SAP intervals).

Since the viewing orientation may often move gradually, the resolution changes in only a subset of the sub-picture locations in RWMR viewport-dependent streaming. However, as discussed above, (Sub)Segments starting with an random-access picture need to be received for all sub-picture locations. Updating all sub-picture locations with (Sub) segments starting with a random-access picture is inefficient in terms of streaming rate-distortion performance.

In addition, the ability to use open GOP prediction structures with sub-picture Representations of RWMR 360° streaming is desirable to improve rate-distortion performance and to avoid visible picture quality pumping caused by closed GOP prediction structures.

Adaptive resolution change may also be used when there are multiple sub-pictures per access unit. For example, cubemap projection may be used, and each cube face may be coded as one or more sub-pictures. The sub-pictures that cover the viewport (potentially with a margin to cover also viewing orientation changes) may be streamed and decoded at a higher resolution than the other sub-pictures. When a viewing orientation changes in a manner that new sub-pictures would need to be streamed at a higher resolution while they were earlier streamed at a lower resolution, or vice versa, switching from one resolution to another may be performed as described above.

Adaptive resolution change and/or stream switching at open GOP random-access pictures according to embodiments described above may also be used when there are multiple sub-pictures per access unit.

According to an embodiment, multiple versions of sub-picture sequences for each sub-picture location have been encoded. For example, a separate version is coded for each combination among two resolutions and two random access intervals (here referred to as "short" and "long") for each sub-picture location. An open GOP prediction structure has been used in at least of a sub-picture sequence. Sub-picture sequences have been encapsulated into sub-picture tracks and made available as a sub-picture Representations in DASH. At least some of the (Sub)segments formed from the coded sub-picture sequences start with an open GOP prediction structure. A client selects for a first range of (Sub) segments a first set of sub-picture locations to be received at a first resolution and a second set of sub-picture locations to be received at a second resolution. A viewing orientation change is handled by the client by selecting for a second range of (Sub)segments a third set of sub-picture locations to be received at a first resolution and a fourth set of sub-picture locations to be received at a second resolution. The first and third sets are not identical, and the intersection of the first and third sets is non-empty. Likewise, the second and fourth sets are not identical, and the intersection of the second and fourth sets is non-empty. If the second range of (Sub)segments does not start with a random-access position in the long-random-access versions, the client requests (Sub) segments of the short-random-access sub-picture Representations for sub-picture locations for which the resolution needs to change (i.e. that are within the third set but outside the intersection of the first and third sets, or within the fourth set but outside of the intersection of the second and fourth sets). The reference sub-picture(s) for RASL sub-picture(s) of (Sub)segments of a changed resolution and starting with an open-GOP random-access picture are processed by reference sub-picture manipulation as described in other embodiments. For example, the reference sub-picture(s) may be resampled to the resolution of the RASL sub-picture(s).

For example, cubemap projection may be used, and each cube face may be coded as one or more sub-pictures. The sub-pictures that cover the viewport (potentially with a margin to cover also viewing orientation changes) may be streamed and decoded at a higher resolution than the other sub-pictures. When a viewing orientation changes in a manner that new sub-pictures would need to be streamed at a higher resolution while they were earlier streamed at a lower resolution, or vice versa, switching from one resolution to another may be performed as described above.

Reference Sub-Picture Manipulation In-Place

In some embodiments, reference sub-picture manipulation happens in-place. In other words, the modified subsequence modifies, overwrites or replaces the reference sub-picture. No other codec or bitstream changes beyond indicating reference sub-picture manipulation might be needed. An encoder and/or a decoder may conclude in-place manipulation taking place through, but not limited to, one or more of the following means:
- In-place manipulation may be pre-defined, e.g. in a coding standard, to apply always when a manipulated reference sub-picture is generated.
- In-place manipulation may be specified, e.g. in a coding standard, to apply for a pre-defined subset of manipulation processes.
- An encoder indicates in or along the bitstream, e.g. in a sequence parameter set, and/or a decoder decodes from or along the bitstream that in-place manipulation takes place.

If the dimensions (i.e. width and/or height) and/or other properties affecting memory allocation (e.g. bit depth) of the manipulated reference sub-picture differ from those of the sub-picture(s) used as input to the manipulation process, in-place manipulation may be understood to comprise the following:
- Creating the manipulated reference sub-picture in a picture buffer separate from the sub-picture(s) used as source(s) for the manipulation process.
- Marking the sub-picture(s) used as source(s) for the manipulation process as "unused for reference" and possibly removing them from the decoded picture buffer.

Implicit Resampling

In an embodiment the identification of the reference sub-picture manipulation process identifies resampling. The identification may, for example, be a sequence-level indication that reference sub-pictures may need to be resampled. In another example, the identification is a profile indicator or alike, whereby the feature of resampling of reference sub-pictures is included. The set of decoded sub-pictures to be manipulated may be inferred as follows: if a reference sub-picture has a different resolution than the current sub-picture, it is resampled to the resolution of the current sub-picture. In an embodiment, the resampling takes place only if the reference sub-picture is among active pictures in any reference picture list.

In an embodiment there is exactly one coded sub-picture per any time instance or access unit. Consequently, conventional (de)coding operation and bitstream syntax can be used except the above-described implicit resampling. Such decoding operation suits e.g. adaptive resolution change as described above.

In an embodiment, resampling may be accompanied or replaced by any other operations for generating manipulated reference sub-picture, as described above. The identification of the reference sub-picture manipulation process identifies which operations are to be carried out when the reference sub-picture has a different resolution or format (e.g. chroma format or bit depth) than the current sub-picture.

Explicit Management of Manipulated Reference Sub-Pictures

In an embodiment, an encoder encodes in the bitstream and/or a decoder decodes from the bitstream a control operation to generate a manipulated reference sub-picture. In an embodiment, the control operation is included in the coded video data of the sub-picture that is used as a source for generating the manipulated reference sub-picture. In another embodiment, the control operation is included in the coded video data of the sub-picture that is using the manipulated reference sub-picture as a reference for prediction. In yet another embodiment, the control operation is included in the coded video data of any sub-picture at or subsequent to (in decoding order) the sub-picture used as a source for generating the manipulated reference sub-picture.

In an embodiment, the manipulated reference sub-picture is paired with the corresponding "source" reference sub-picture in its marking as "used for reference" or "unused for reference" (e.g. in a reference picture set). I.e., when a "source" reference sub-picture is marked as "unused for reference", the corresponding manipulated reference sub-picture is also marked as "unused for reference".

In an embodiment, an encoder encodes in the bitstream and/or a decoder decodes from the bitstream a control operation to mark a manipulated reference sub-picture as "used for reference" or "unused for reference". The control operation may, for example, be a specific reference picture set for manipulated reference sub-pictures only.

In an embodiment, a reference picture list is initialized to contain manipulated reference sub-pictures that are marked as "used for reference". In an embodiment, a reference picture list is initialized to contain manipulated reference sub-pictures that are indicated to be active references for the current sub-picture.

External Reference Sub-Picture

In an embodiment, the decoding process provides an interface for inputting an "external reference sub-picture". The reference sub-picture manipulation process may provide the manipulated reference sub-picture to the decoding process through the interface.

Within the decoding process, the external reference sub-picture may have pre-defined properties and/or may be inferred and/or properties may be provided through the interface. These properties may include but are not limited to one or more of the following:
- Picture order count (POC) or certain bits of POC, e.g. POC least significant bits (LSBs) and/or POC most significant bits (MSBs).

Marking as "used for short-term reference" or "used for long-term reference".

For example, it may be pre-defined that an external reference sub-picture is treated as a long-term reference picture and/or has picture order count equal to 0.

In an embodiment, an encoder encodes into or along the bitstream and/or a decoder decodes from or along the bitstream a control signal if an external reference sub-picture is to be obtained for decoding. The control signal may be included for example in a sequence parameter set, a picture parameter set, a header parameter set, a picture header, a sub-picture delimiter or header, and/or an image segment header (e.g. a tile group header). When included in a parameter set, the control signal may cause the decoding to obtain an external reference sub-picture when the parameter set is activated. The control signal may be specific to a sub-picture sequence (and may be accompanied by a sub-picture sequence identifier) or may apply to all sub-picture sequences that are decoded. When included in a header, the control signal may cause the decoding the obtain an external reference sub-picture e.g. when the header is decoded or at the start of decoding the spatiotemporal unit wherein the header is applied. For example, if the control signal is included in an image segment header (e.g. a tile group header), fetching of the external reference sub-picture may be carried out only for the first image segment header of a sub-picture.

In an embodiment, the external reference sub-picture may only be given for the first sub-picture of a coded sub-picture sequence that is independent of other coded sub-picture sequences. For example, in the example embodiments for adaptive resolution change, each manipulated reference sub-pictures may start a coded sub-picture sequence. If only one sub-picture per coded picture, access unit or time instance is in use, a manipulated reference sub-picture may start a coded video sequence.

In an embodiment, the external reference sub-picture is inferred to have properties that are the same as in the sub-pictures used as source for generating the external reference sub-picture.

In some embodiments, the marking of external reference sub-pictures (as used or unused for reference) is controlled synchronously with the sub-picture(s) used as input for the reference sub-picture manipulation.

In an embodiment, external reference sub-pictures are included in the initial reference picture lists like other reference sub-pictures.

External reference sub-pictures may be accompanied by an identifier (e.g. ExtRefId) that is passed through the interface or inferred. Memory management of the external reference sub-pictures (e.g. which ExtRefId indices are kept in the decoded picture buffer) may be encoded in or decoded from the bitstream or may be controlled through the interface.

Start of Sequence and/or End of Sequence Indication

According to an embodiment, an encoder encodes into a bitstream and/or a decoder decodes from a bitstream an end of sequence (EUS) syntax structure and/or a start of sequence (SOS) syntax structure comprising but not limited to one or more of the following:

Identifier of sub-picture sequence to which the EOS and/or SOS syntax structure concerns.
Identifiers of parameter set(s) that are activated by the SOS syntax structure.
Control signal specifying if decoding of the EOS and/or SOS syntax structure is to cause a reference sub-picture manipulation operation (e.g. by implicit resampling) and/or obtaining an external reference sub-picture. For example, a SOS syntax structure, when present, may imply an external In an embodiment, an end of sequence (EOS) syntax structure and/or a start of sequence (SOS) syntax structure is included in a NAL unit whose NAL unit type indicates the end of sequence and/or the start of sequence, respectively.

Start of Bitstream, Sequence, and Sub-Picture Sequence Indications

According to an embodiment, an encoder encodes into a bitstream and/or a decoder decodes from a bitstream a start-of-bitstream indication, a start-of-coded-video-sequence indication, and/or a start-of-sub-picture-sequence indication. The indication(s) may be included in and/or decoded from e.g. a parameter set syntax structure, a picture header, and/or a sub-picture delimiter. When present in a parameter set, the indication(s) may apply to the picture or sub-picture that activates the parameter set. When present in a picture header, a sub-picture delimiter, or similar syntax structure, the indication(s) may apply in the bitstream order, i.e. indicate that the syntax structure or the access unit or coded picture containing the syntax structure starts a bitstream, a coded video sequence, or a sub-picture sequence.

Property Indications

In an embodiment, bitstream or CVS properties are indicated in two levels, namely per sub-picture sequence excluding the generation of the manipulated reference sub-pictures and per sub-picture sequence including the generation of the manipulated reference sub-pictures. The properties may comprise but are not limited to a coding profile, a level, HRD parameters (e.g. CPB and/or DPB size), constraints that have been applied in encoding. Properties per sub-picture sequence excluding the generation of the manipulated reference sub-pictures may be indicated in a syntax structure that applies to the core decoding process, such as a sequence parameter set. Properties per sub-picture sequence including the generation of the manipulated reference sub-pictures may be indicated in a syntax structure that applies to the generation of the manipulated reference sub-pictures instead of or in addition to the core decoding process.

Reference sub-picture manipulation may happen outside the core decoding specification and may be specified e.g. in an application-specific standard or annex.

A second shell of video codec profile indications may be generated, e.g.: H.266 first shell profile=Main 10, second shell profile=sub-picture packing, or 360-degree geometry padding, or Point Cloud, or implicit adaptive resolution change.

In an embodiment, the encoder indicates, and/or the decoder decodes a bitstream property data structure including a first-shell profile indicator and a second-shell profile indicator, wherein the first-shell profile indicator indicates properties excluding reference sub-picture manipulation and the second-shell profile indicator indicates properties including reference sub-picture manipulation.

In an embodiment, bitstream or CVS properties are indicated collectively to all sub-picture sequences (i.e. all coded video data). The properties may comprise but are not limited to a coding profile, a level, HRD parameters (e.g. CPB and/or DPB size), constraints that have been applied in encoding. As with sub-picture sequence-specific property indications, separate set of properties may be indicated and/or decoded for sub-picture sequences excluding the generation of the manipulated reference sub-pictures; and for sub-picture sequences including the generation of the manipulated reference sub-pictures.

Generation of the Set of Manipulated Reference Sub-Picture by Unfolding Projection Surfaces In an embodiment, a manipulated reference sub-picture is generated by unfolding entire or partial projection surfaces onto a 2D plane. In some embodiments, the unfolding is performed through knowledge on the geometrical relations of the projection surfaces and knowledge on how the projection surfaces are mapped onto sub-pictures. In other embodiments, sub-picture packing is used for realizing the unfolding operation.

An example embodiment is described in relation to cubemap projection, but it needs to be understood that embodiments can be realized similarly for other projection formats. In the example embodiment, cube faces that are adjacent to the "main" cube face (subject to being predicted) are unfolded onto a 2D plane next to the "main" cube face. Let us assume that the "main" cube face is encoded or decoded as a sub-picture within the current access unit. The picture composition data may be authored by an encoder and/or decoded by a decoder to generate an output from the reconstructed sub-pictures corresponding to cube faces. It is remarked that the viewpoint for observing the cube may be in the middle of the cube and hence a cubemap may represent the inner surface of the cube.

The reconstructed sub-pictures of an access unit used as a reference for prediction are used in generating a manipulated reference sub-picture for the subject-to-being-predicted cube face of the current access unit by unfolding the cube faces of the cube and described as follows: The unfolded cube faces are adjacent to the subject-to-being-predicted cube face, i.e. share a common edge with the subject-to-being-predicted cube face. Subsequent to unfolding the picture area of the manipulated reference sub-picture may be cropped. In an embodiment, an encoder indicates information indicative of the cropping area in or along the bitstream and a decoder decodes information indicative of the cropping area from or along the bitstream. In another embodiment, an encoder and/or a decoder infers the cropping area, e.g. to be proportional to the maximum size of a prediction unit for inter prediction, which may be additionally appended proportionally to the maximum number of samples needed for interpolating samples at non-integer sample locations.

Subsequent or prior to cropping, the corners of the unfolded area may be handled e.g. in one of the following ways: the corners may be left unoccupied or the corners may be padded e.g. with the adjacent corner sample of the subject-to-being-predicted cube face.

The corners may be interpolated from the unfolded cube faces. For example, interpolation may be performed but is not limited to either of the following:
- A sample row and a sample column from the adjacent unfolded cube faces may be resealed to cover the corner area and blended (e.g. averaged).
- Interpolation along each line segment connecting the border sample of the sample row and the border sample of the sample column from the adjacent unfolded cube faces that have the same distance to the corner sample. The interpolation can be done as a weighted average proportional to the inverse of the distance to the border sample.
- Padding from the closest of the border samples of the sample row or the sample column of the adjacent unfolded cube faces.

Spatial relationship information may be used to indicate that the subject-to-being-predicted cube face in the current access unit corresponds to the central area of the manipulated reference sub-picture. An advantage of this arrangement is that motion vectors are allowed to refer to sample outside the central area of the manipulated reference sub-picture and that the picture content is approximately correct in those areas.

Generation of the Set of Manipulated Reference Sub-Picture by Unfolding Projection Surfaces and Sample-Line-Wise Resampling In an embodiment, a manipulated reference sub-picture is generated in two steps. First, entire or partial projection surfaces are unfolded onto a 2D plane as described in the previous embodiment. Second, since the unfolding may cause unoccupied sample locations in the manipulated reference sub-picture, the sample lines or columns of the unfolded projection surface, such as an entire or partial unfolded cube face, may be extended by resampling to cover up to 45 degree of the corner.

Rotation Compensation for 360° Video

In 360° video coding, the projection structure, such as the sphere, may be rotated prior to deriving the 2D picture. One reason for such rotation may be to adjust the 2D version of the content to suit coding tools better for improved rate-distortion performance. For example, only certain intra prediction directions may be available, and hence rotation could be applied to match the 2D version of the content with intra prediction directions. This may be done for example by computing localized gradients and statistically improve the match between the gradients and intra prediction directions by rotating the projection structure. However, there would be temporal inconsistency between the 2D pictures of the content generated with different rotation and hence conventional inter prediction between such 2D pictures is not likely to succeed well, causing a penalty in rate-distortion performance.

In an embodiment, a reference sub-picture is associated with a first rotation and a current sub-picture is associated with a second rotation. A manipulated reference sub-picture is generated wherein the essentially the second rotation is used. The reference sub-picture manipulation may for example comprise the following steps: First, the reference sub-picture may be projected onto a projection structure, such as a sphere, using the first rotation. The image data on the projection structure may be projected onto a manipulated reference sub-picture using the second rotation. For example, the second rotation may be applied to rotate the sphere image and the sphere image may then be projected onto a projection structure (e.g. a cube or a cylinder) which is then unfolded to form a 2D sub-picture.

Compensation for Non-Aligned Projection Surfaces a Point Cloud Video

As discussed above, point cloud sequences may be coded as video when point clouds are projected onto one or more projection surfaces. An encoder could adapt properties of the projection surfaces to the content in a time-varying manner. Properties of the projection surfaces may comprise but are not limited to one or more of the following: 3D location, 3D orientation, shape, size, projection format (e.g. ortographic projection or a geometric projection with a projection center), and sampling resolution. Thus, conventional inter prediction between patches might not succeed well if any property of the projection surface differs between a reference picture and a current picture being encoded or decoded. Thus, adapting properties of projection surfaces could cause a penalty in rate-distortion performance for coding a point cloud sequence even if it improved rate-distortion performance for a single time instance.

In an embodiment, reference sub-picture manipulation comprises inter-projection prediction. One or more patches of one or more sub-pictures from one projection (texture and geometry images) may be used as a source for generating a manipulated reference sub-picture comprising one or more reference patches. The manipulated reference sub-picture may essentially represent the properties of the projection surface(s) of a current sub-picture being encoded or decoded. In the reference sub-picture manipulation process, a point cloud may be generated from the reconstructed texture and geometry sub-pictures, using the properties of the projection surface(s) applying to the reconstructed texture and geometry sub-pictures. The point cloud may be projected onto a second set of projection surface(s) that may have the same or similar properties as the projection surfaces applying to the current texture sub-picture and/or the current geometry sub-picture being encoded or decoded, and the respective texture and geometry prediction pictures are formed from this projection.

Generalizations

In an embodiment, reference sub-picture manipulation is regarded as a part of decoded picture buffering rather than a process separate from the decoded picture buffering.

In an embodiment, reference sub-picture manipulation access sub-pictures from a first bitstream and a second bitstream to generate manipulated reference sub-picture(s). For example, the first bitstream may represent texture video of a first viewpoint, and the second bitstream may represent depth or geometry video for the first viewpoint, and the manipulated reference sub-picture may represent texture video for a second viewpoint.

Embodiments have been described above with reference to the term sub-picture. It needs to be understood that in some cases there is only one sub-picture per time instance or access unit, and thus embodiments could likewise be described with reference to the term picture instead of the term sub-picture.

The above described embodiments provide a mechanism and an architecture to use core video (de)coding process and bitstream format in a versatile manner for many video-based purposes, including video-based point cloud coding, patch-based volumetric video coding, and 360-degree video coding with multiple projection surfaces. Compression efficiency may be improved compared to plain 2D video coding by enabling sophisticated application-tailored prediction.

The above described embodiments are suitable for interfacing a single-layer 2D video codec with additional functionality.

A method according to an example comprises obtaining coded data of a sub-picture, the sub-picture belonging to a picture, and the sub-picture belonging to a sub-picture sequence. It is then determined whether the sub-picture would be used as a source for a manipulated reference sub-picture. If the determination indicates that the sub-picture would be used as a source for a manipulated reference sub-picture, that sub-picture is used as a basis for a manipulated reference sub-picture. In other words, the manipulated reference sub-picture is generated from the sub-picture to be used as a reference for a subsequent sub-picture of the sub-picture sequence.

The manipulation may comprise, for example, rotating the sub-picture, mirroring the sub-picture, resampling the sub-picture, positioning within the area of the manipulated reference sub-picture, overlaying over or blending with the samples already present within the indicated area of the manipulated reference sub-picture, or some other form of manipulation. It may also be possible to use more than one of the above mentioned and/or other manipulation principles to generate the manipulated reference sub-picture.

An apparatus according to an embodiment comprises at least one processor and at least one memory including computer program code, the memory and the computer program code configured to, with the at least one processor, cause the apparatus to perform at least the following:
  obtain coded data of a sub-picture, the sub-picture belonging to a picture, and the sub-picture belonging to a sub-picture sequence;
  determine whether to use the sub-picture as a source for a manipulated reference sub-picture;
  generate the manipulated reference sub-picture from the sub-picture to be used as a reference for a subsequent sub-picture of the sub-picture sequence, if the determining reveals that the sub-picture is to be used as the source for the manipulated reference sub-picture.

Figure 16:
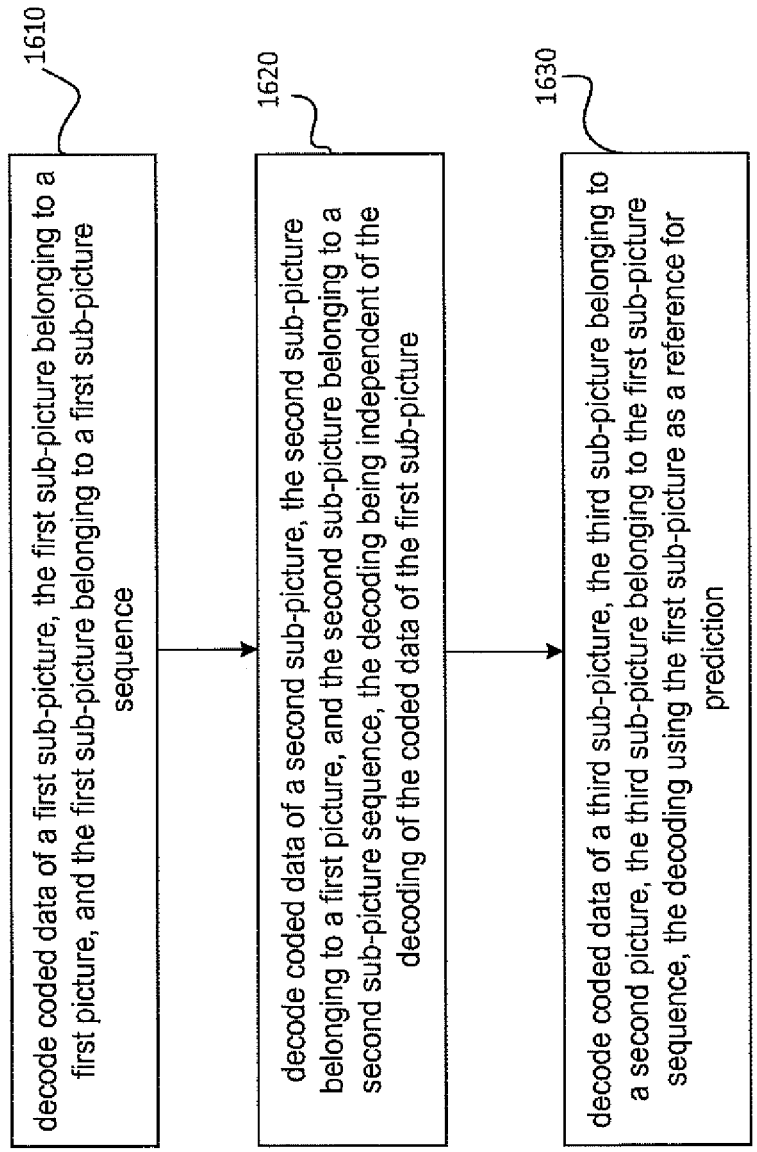
FIG. 16 is a flowchart illustrating a method according to an embodiment.

FIG. 16 is a flowchart illustrating a method according to an embodiment. A method comprises decoding 1610 coded data of a first sub-picture, the first sub-picture belonging to a first picture, and the first sub-picture belonging to a first sub-picture sequence; decoding 1620 coded data of a second sub-picture, the second sub-picture belonging to a first picture, and the second sub-picture belonging to a second sub-picture sequence, the decoding being independent of the decoding of the coded data of the first sub-picture; and decoding 1630 coded data of a third sub-picture, the third sub-picture belonging to a second picture, the third sub-picture belonging to the first sub-picture sequence, the decoding using the first sub-picture as a reference for prediction.

Figure 17:
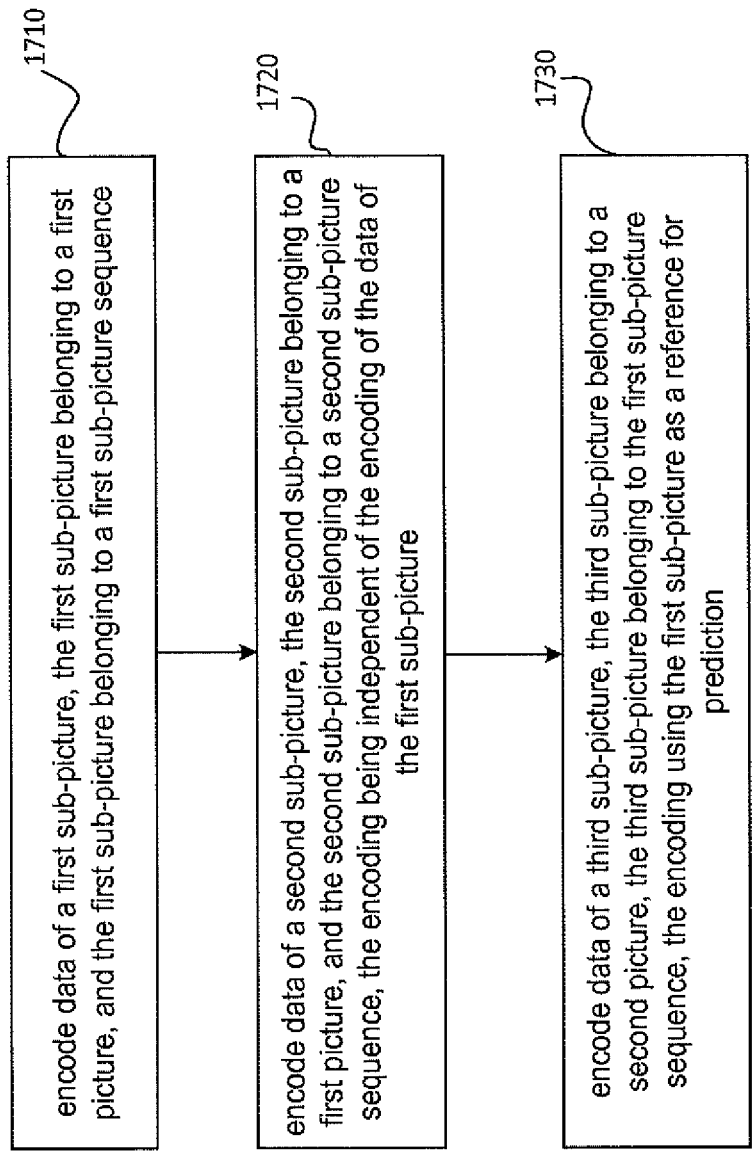
FIG. 17 is a flowchart illustrating a method according to another embodiment.

FIG. 17 is a flowchart illustrating a method according to another embodiment. A method comprises encoding 1710 data of a first sub-picture, the first sub-picture belonging to a first picture, and the first sub-picture belonging to a first sub-picture sequence; encoding 1720 data of a second sub-picture, the second sub-picture belonging to a first picture, and the second sub-picture belonging to a second sub-picture sequence, the encoding being independent of the encoding of the coded data of the first sub-picture; and encoding 1730 data of a third sub-picture, the third sub-picture belonging to a second picture, the third sub-picture belonging to the first sub-picture sequence, the encoding using the first sub-picture as a reference for prediction.

An apparatus according to an embodiment comprises means for decoding coded data of a first sub-picture, the first sub-picture belonging to a first picture, and the first sub-picture belonging to a first sub-picture sequence; means for decoding coded data of a second sub-picture, the second sub-picture belonging to a first picture, and the second sub-picture belonging to a second sub-picture sequence, the decoding being independent of the decoding of the coded data of the first sub-picture; and means for decoding coded data of a third sub-picture, the third sub-picture belonging to a second picture, the third sub-picture belonging to the first sub-picture sequence, the decoding using the first sub-picture as a reference for prediction. The means comprises at least one processor, and a memory including a computer program code, wherein the processor may further comprise processor circuitry. The memory and the computer program code are configured to, with the at least one processor, cause the apparatus to perform the method of FIG. 16 according to various embodiments.

An apparatus according to another embodiment comprises means for encoding data of a first sub-picture, the first sub-picture belonging to a first picture, and the first sub-picture belonging to a first sub-picture sequence; means for encoding data of a second sub-picture, the second sub-picture belonging to a first picture, and the second sub-picture belonging to a second sub-picture sequence, the encoding being independent of the encoding of the coded data of the first sub-picture; and means for encoding data of a third sub-picture, the third sub-picture belonging to a second picture, the third sub-picture belonging to the first sub-picture sequence, the encoding using the first sub-picture as a reference for prediction. The means comprises at least one processor, and a memory including a computer program code, wherein the processor may further comprise processor circuitry. The memory and the computer program code are configured to, with the at least one processor, cause the apparatus to perform the method of FIG. 17 according to various embodiments.

Figure 18:
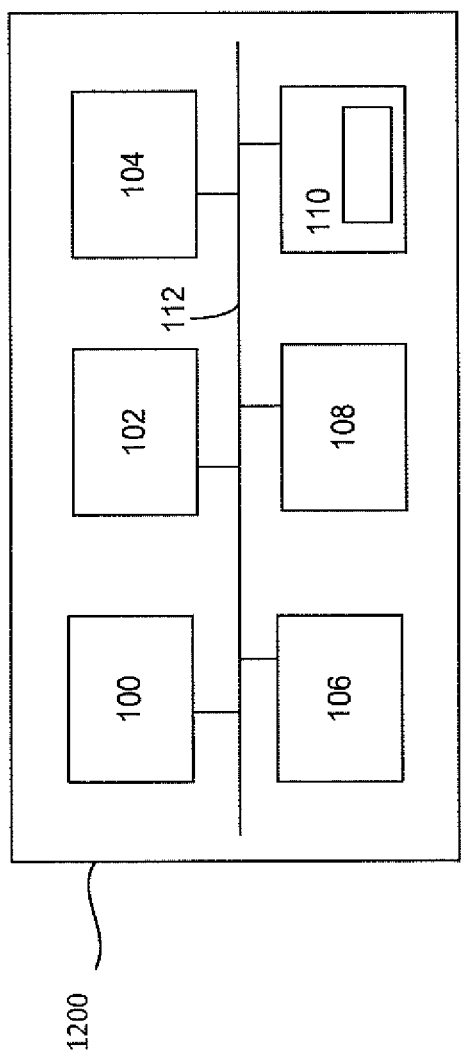
FIG. 18 shows an apparatus according to an embodiment.

An example of an apparatus, e.g. an apparatus for encoding and/or decoding, is illustrated in FIG. 18. The generalized structure of the apparatus will be explained in accordance with the functional blocks of the system. Several functionalities can be carried out with a single physical device, e.g. all calculation procedures can be performed in a single processor if desired. A data processing system of an apparatus according to an example of FIG. 18 comprises a main processing unit 100, a memory 102, a storage device 104, an input device 106, an output device 108, and a graphics subsystem 110, which are all connected to each other via a data bus 112.

The main processing unit 100 may be a conventional processing unit arranged to process data within the data processing system. The main processing unit 100 may comprise or be implemented as one or more processors or processor circuitry. The memory 102, the storage device 104, the input device 106, and the output device 108 may include conventional components as recognized by those skilled in the art. The memory 102 and storage device 104 store data in the data processing system 100. Computer program code resides in the memory 102 for implementing, for example, the methods according to embodiments. The input device 106 inputs data into the system while the output device 108 receives data from the data processing system and forwards the data, for example to a display. The data bus 112 is a conventional data bus and while shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment. The computer program code comprises one or more operational characteristics. Said operational characteristics are being defined through configuration by said computer based on the type of said processor, wherein a system is connectable to said processor by a bus, wherein a programmable operational characteristic of the system comprises obtaining coded data of a sub-picture, the sub-picture belonging to a picture, and the sub-picture belonging to a sub-picture sequence; determining whether to use the sub-picture as a source for a manipulated reference sub-picture; if the determining reveals that the sub-picture is to be used as the source for the manipulated reference sub-picture; the method further comprises generating the manipulated reference sub-picture from the sub-picture to be used as a reference for a subsequent sub-picture of the sub-picture sequence.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

The invention claimed is:

1. A method comprising:
   decoding coded data of a first sub-picture, the first sub-picture belonging to a first picture, and the first sub-picture belonging to a first sub-picture sequence;
   decoding coded data of a second sub-picture, the second sub-picture belonging to the first picture, and the second sub-picture belonging to a second sub-picture sequence, the decoding of the coded data of the second sub-picture being independent of the decoding of the coded data of the first sub-picture;
   decoding coded data of a third sub-picture, the third sub-picture belonging to a second picture, the third sub-picture belonging to the first sub-picture sequence, the decoding of the coded data of the third sub-picture using the first sub-picture as a reference for prediction;
   decoding coded data of a fourth sub-picture, the fourth sub-picture belonging to the second picture, the fourth sub-picture belonging to the second sub-picture sequence, the decoding of the coded data of the fourth sub-picture using the second sub-picture as a reference for prediction;
   decoding, with an apparatus, a first indication that a first spatial correspondence is applied in a wrap-around manner horizontally and/or vertically, wherein the apparatus is configured to wrap a first referenced sample location around horizontally or vertically to another side of the first sub-picture in response to the first referenced sample location being outside a boundary of the first sub-picture and being referenced in a decoding process;
   decoding, with the apparatus, a second indication that a second spatial correspondence is applied in a saturated manner horizontally and/or vertically, wherein the apparatus is configured to saturate a second referenced sample location to be within the second sub-picture in response to the second referenced sample location being outside a boundary of the second sub-picture and being referenced in the decoding process; and
   decode, from a parameter set in or along a bitstream, information on a mapping of video coding layer network abstraction layer units, in decoding order, to sub-pictures or sub-picture sequences, wherein the information on the mapping comprises mapping as a list of sub-picture sequence identifiers for the video coding layer network abstraction layer units, in decoding order, included in an access unit associated with the mapping.

2. A method for encoding a video sequence, the method comprising:
   encoding data of a first sub-picture, the first sub-picture belonging to a first picture, and the first sub-picture belonging to a first sub-picture sequence;
   encoding data of a second sub-picture, the second sub-picture belonging to the first picture, and the second sub-picture belonging a to second sub-picture sequence, the encoding of the data of the second sub-picture being independent of the encoding of the data of the first sub-picture;
   encoding data of a third sub-picture, the third sub-picture belonging to a second picture, the third sub-picture belonging to the first sub-picture sequence, the encoding of the data of the third sub-picture using the first sub-picture as a reference for prediction;
   encoding data of a fourth sub-picture, the fourth sub-picture belonging to the second picture, the fourth sub-picture belonging to the second sub-picture sequence, the encoding of the data of the fourth sub-picture using the second sub-picture as a reference for prediction;
   in response to a sub-picture covering an entire 360-degree picture and sub-picture sequences of the first picture and the second picture being present in a bitstream, encoding a first indication that a first spatial correspondence is applied in a wrap-around manner horizontally and/or vertically, wherein the first indication is configured to cause a first referenced sample location to be wrapped around horizontally or vertically to another side of the first sub-picture in response to the first referenced sample location being outside a boundary of the first sub-picture and being referenced in a decoding process;
   encoding a second indication that a second spatial correspondence is applied in a saturated manner horizontally and/or vertically, wherein the second indication is configured to cause a second referenced sample location to be saturated to be within the second sub-picture in response to the second referenced sample location being outside a boundary of the second sub-picture and being referenced in the decoding process; and
   encoding, to a parameter set in or along the bitstream, information on a mapping of video coding layer network abstraction layer units, in decoding order, to sub-pictures or sub-picture sequences, wherein the information on the mapping comprises mapping as a list of sub-picture sequence identifiers for the video coding layer network abstraction layer units, in decoding order, included in an access unit associated with the mapping.

3. An apparatus comprising:
   at least one processor; and
   at least one memory storing instructions that, when executed with the at least one processor, cause the apparatus at least to:
   decode coded data of a first sub-picture, the first sub-picture belonging to a first picture, and the first sub-picture belonging to a first sub-picture sequence;
   decode coded data of a second sub-picture, the second sub-picture belonging to the first picture, and the second sub-picture belonging to a second sub-picture sequence, the decoding of the coded data of the second sub-picture being independent of the decoding of the coded data of the first sub-picture;
   decode coded data of a third sub-picture, the third sub-picture belonging to a second picture, the third sub-picture belonging to the first sub-picture sequence, the decoding of the coded data of the third sub-picture using the first sub-picture as a reference for prediction;
   decode coded data of a fourth sub-picture, the fourth sub-picture belonging to the second picture, the fourth sub-picture belonging to the second sub-picture sequence, the decoding of the coded data of the fourth sub-picture using the second sub-picture as a reference for prediction;
   decode a first indication that a first spatial correspondence is applied in a wrap-around manner horizontally and/or vertically, wherein the apparatus is configured to wrap a first referenced sample location around horizontally or vertically to another side of the first sub-picture in response to the first referenced sample location being outside a boundary of the first sub-picture and being referenced in a decoding process;
   decode a second indication that a second spatial correspondence is applied in a saturated manner horizontally and/or vertically, wherein the apparatus is configured to saturate a second referenced sample location to be within the second sub-picture in response to the second referenced sample location being outside a boundary of the second sub-picture and being referenced in the decoding process; and
   decode, from a parameter set in or along a bitstream, information on a mapping of video coding layer network abstraction layer units, in decoding order, to sub-pictures or sub-picture sequences, wherein the information on the mapping comprises mapping as a list of sub-picture sequence identifiers for the video coding layer network abstraction layer units, in decoding order, included in an access unit associated with the mapping.

4. The apparatus according to claim 3, wherein the at least one memory stores instructions that, when executed with the at least one processor, cause the apparatus to:
   decode picture composition data separately from decoding the coded data of the first and second sub-pictures; and
   compose a first decoded picture on the basis of the picture composition data, the composing comprising positioning the decoded data of the first sub-picture and the decoded data of the second sub-picture onto the first decoded picture.

5. The apparatus according to claim 3, wherein at least one of the first, second, third, or fourth sub-picture comprises one of the following:
   a picture of a view of a multiview or stereoscopic video;
   a picture on a layer of a multi-layer video;
   a surface of a projection structure of 360-degree projection;
   a packed region as indicated with region-wise packing information;
   a part or patch of a point cloud projected onto a surface; or
   a region of interest.

6. The apparatus according to claim 3, wherein the at least one memory stores instructions that, when executed with the at least one processor, cause the apparatus to:

decode or infer information on properties relating to the bitstream or a coded video sequence, the properties being indicated for a sub-picture sequence or for all sub-picture sequences provided for decoding, the properties comprising, at least, one or more hypothetical reference decoder parameters.

7. The apparatus according to claim 3, wherein the at least one memory stores instructions that, when executed with the at least one processor, cause the apparatus to:
decode, from the bitstream, information indicative of one or more tile positions within a sub-picture.

8. The apparatus according to claim 7, wherein the at least one memory stores instructions that, when executed with the at least one processor, cause the apparatus to:
decode, from a slice header, information indicative of a tile position of a first tile, in decoding order, of a slice.

9. The apparatus according to claim 3, wherein the at least one memory stores instructions that, when executed with the at least one processor, cause the apparatus to:
decode, from the bitstream, information indicative of a sub-picture sequence identifier being associated with at least one of: one or more slices, or one or more video coding layer network abstraction layer units.

10. The apparatus according to claim 9, wherein the sub-picture sequence identifier is associated with one or more slices, wherein the at least one memory stores instructions that, when executed with the at least one processor, cause the apparatus to:
decode the sub-picture sequence identifier from a slice header contained in the one or more slices.

11. An apparatus comprising:
at least one processor; and
at least one memory storing instructions that, when executed with the at least one processor, cause the apparatus at least to:
encode data of a first sub-picture, the first sub-picture belonging to a first picture, and the first sub-picture belonging to a first sub-picture sequence;
encode data of a second sub-picture, the second sub-picture belonging to the first picture, and the second sub-picture belonging to a second sub-picture sequence, the encoding of the data of the second sub-picture being independent of the encoding of the data of the first sub-picture;
encode data of a third sub-picture, the third sub-picture belonging to a second picture, the third sub-picture belonging to the first sub-picture sequence, the encoding of the data of the third sub-picture using the first sub-picture as a reference for prediction;
encode data of a fourth sub-picture, the fourth sub-picture belonging to the second picture, the fourth sub-picture belonging to the second sub-picture sequence, the encoding of the data of the fourth sub-picture using the second sub-picture as a reference for prediction;
in response to a sub-picture covering an entire 360-degree picture and sub-picture sequences of the first picture and the second picture being present in a bitstream, encode a first indication that a first spatial correspondence is applied in a wrap-around manner horizontally and/or vertically, wherein the first indication is configured to cause a first referenced sample location to be wrapped around horizontally or vertically to another side of the first sub-picture in response to the first referenced sample location being outside a boundary of the first sub-picture and being referenced in a decoding process;
encode a second indication that a second spatial correspondence is applied in a saturated manner horizontally and/or vertically, wherein the second indication is configured to cause a second referenced sample location to be saturated to be within the second sub-picture in the second referenced sample response to the second reference sample location being outside a boundary of the second sub-picture and being referenced in the decoding process; and
encode, to a parameter set in or along the bitstream, information on a mapping of video coding layer network abstraction layer units, in decoding order, to sub-pictures or sub-picture sequences, wherein the information on the mapping comprises mapping as a list of sub-picture sequence identifiers for the video coding layer network abstraction layer units, in decoding order, included in an access unit associated with the mapping.

12. The apparatus according to claim 11, wherein the at least one memory stores instructions that, when executed with the at least one processor, cause the apparatus to:
encode picture composition data separately from encoding the data of the first and second sub-pictures; and
compose a first reconstructed picture on the basis of the picture composition data, the composing comprising positioning the first sub-picture and the second sub-picture onto the first reconstructed picture.

13. The apparatus according to claim 12, wherein the at least one memory stores instructions that, when executed with the at least one processor, cause the apparatus to:
generate a composited reference picture from the encoded data of the first and second sub-pictures using the picture composition data.

14. The apparatus according to claim 11, wherein the at least one memory stores instructions that, when executed with the at least one processor, cause the apparatus to:
encode, to the bitstream, information on properties relating to the bitstream or a coded video sequence, the properties being indicated for a sub-picture sequence or for all sub-picture sequences, the properties comprising, at least, one or more hypothetical reference decoder parameters.

15. The apparatus according to claim 11, wherein the at least one memory stores instructions that, when executed with the at least one processor, cause the apparatus to:
encode, to the bitstream, information indicative of one or more tile positions within a sub-picture.

16. The apparatus according to claim 15, wherein the at least one memory stores instructions that, when executed with the at least one processor, cause the apparatus to:
encode, into a slice header, information indicative of a tile position of a first tile, in decoding order, of a slice.

17. The apparatus according to claim 11, wherein the at least one memory stores instructions that, when executed with the at least one processor, cause the apparatus to:
encode, to the bitstream, information indicative of a sub-picture sequence identifier being associated with at least one of: one or more slices, or one or more video coding layer network abstraction layer units.

18. The apparatus according to claim 17, wherein the sub-picture sequence identifier is associated with one or more slices, wherein the at least one memory stores instructions that, when executed with the at least one processor, cause the apparatus to:
encode the sub-picture sequence identifier into a slice header contained in the one or more slices.

19. The apparatus according to claim 11, wherein the at least one memory stores instructions that, when executed with the at least one processor, cause the apparatus to:
encode said first indication that the first spatial correspondence is applied in the wrap-around manner in response to the sub-picture covering the entire 360-degree picture and sub-picture sequences of a plurality of views being present in the bitstream.

\* \* \* \* \*